United States Patent
Wagner et al.

(10) Patent No.: US 11,380,895 B2
(45) Date of Patent: Jul. 5, 2022

(54) METHODS AND SYSTEMS FOR THE PRODUCTION OF CRYSTALLINE FLAKE GRAPHITE FROM BIOMASS OR OTHER CARBONACEOUS MATERIALS

(71) Applicant: The George Washington University, Washington, DC (US)

(72) Inventors: Michael J. Wagner, Rockville, MD (US); Nathan A. Banek, Arlington, VA (US); Dustin T. Abele, Arlington, VA (US); Kevin R. McKenzie, Jr., Arlington, VA (US)

(73) Assignee: The George Washington University, Washington, DC (US)

( * ) Notice: Subject to any disclaimer, the term of this patent is extended or adjusted under 35 U.S.C. 154(b) by 96 days.

(21) Appl. No.: 16/497,253

(22) PCT Filed: Mar. 2, 2018

(86) PCT No.: PCT/US2018/020690
§ 371 (c)(1),
(2) Date: Sep. 24, 2019

(87) PCT Pub. No.: WO2018/186958
PCT Pub. Date: Oct. 11, 2018

(65) Prior Publication Data
US 2020/0381732 A1    Dec. 3, 2020

Related U.S. Application Data

(60) Provisional application No. 62/480,708, filed on Apr. 3, 2017, provisional application No. 62/543,515, filed on Aug. 10, 2017.

(51) Int. Cl.
*H01M 4/587* (2010.01)
*C01B 32/205* (2017.01)
(Continued)

(52) U.S. Cl.
CPC ........... *H01M 4/587* (2013.01); *B01J 19/121* (2013.01); *C01B 32/205* (2017.08);
(Continued)

(58) Field of Classification Search
CPC ........... H01M 4/587; H01M 2004/027; H01M 4/583; C01B 32/205; C01B 32/20;
(Continued)

(56) References Cited

U.S. PATENT DOCUMENTS

| 3,699,210 A | 10/1972 | Binning et al. |
| 6,022,518 A | 2/2000 | Yamazaki et al. |

(Continued)

FOREIGN PATENT DOCUMENTS

WO    WO 2016/133571    *    8/2016    ............. H01L 21/26

OTHER PUBLICATIONS

Herring, et al., A Novel Method for the Templated Synthesis of Homogeneous Samples of Hollow Carbon Nanospheres from Cellulose Chars, J. Am. Chem. Soc. 2003; 125: 9916-9917 with Supporting Information (Year: 2003).*

(Continued)

*Primary Examiner* — Daniel C. McCracken
(74) *Attorney, Agent, or Firm* — Blank Rome LLP

(57) ABSTRACT

High quality flake graphite is produced by methods that include mixing a carbon-containing feedstock with a catalyst to form a feedstock/catalyst mixture, or coating a catalyst with a carbon-containing feedstock, and subjecting the mixture or feedstock-coated catalyst to irradiation with a laser to convert the feedstock into flake graphite in the presence of the catalyst. In some instances, the feedstock is converted to a char by pyrolysis and the char is instead subjected to laser irradiation. The feedstock can be a biomass or a carbonaceous material. The catalyst can be an elemental metal, an alloy, or a combination thereof. In some instances, methods (Continued)

described herein have been found to produce high quality flake graphite in the form of potato shaped agglomerates.

20 Claims, 23 Drawing Sheets

(51) Int. Cl.
  *B01J 19/12* (2006.01)
  *H01M 4/02* (2006.01)
(52) U.S. Cl.
  CPC .... *B01J 2219/0892* (2013.01); *B01J 2219/12* (2013.01); *C01P 2002/72* (2013.01); *C01P 2002/82* (2013.01); *C01P 2002/88* (2013.01); *C01P 2002/89* (2013.01); *C01P 2004/03* (2013.01); *C01P 2004/04* (2013.01); *C01P 2006/40* (2013.01); *H01M 2004/027* (2013.01)
(58) Field of Classification Search
  CPC .............. B01J 19/121; B01J 2219/0892; B01J 2219/12; C01P 2002/72; C01P 2002/82; C01P 2002/88; C01P 2002/89; C01P 2004/03; C01P 2004/04; C01P 2006/40; Y02E 60/10; Y02P 20/145
  See application file for complete search history.

(56) References Cited

U.S. PATENT DOCUMENTS

| | | | | |
|---|---|---|---|---|
| 8,262,942 | B2* | 9/2012 | Wagner | B82Y 40/00 252/502 |
| 2004/0053050 | A1* | 3/2004 | Guerfi | H01M 50/109 204/290.15 |
| 2006/0137487 | A1* | 6/2006 | McKinnon | H01M 4/92 75/363 |
| 2011/0017493 | A1 | 1/2011 | Gibson et al. | |
| 2012/0021294 | A1 | 1/2012 | Zhamu et al. | |
| 2012/0213999 | A1 | 8/2012 | Ide et al. | |
| 2014/0234200 | A1* | 8/2014 | Tour | C01B 32/194 423/448 |
| 2014/0349473 | A1 | 11/2014 | Ishi et al. | |
| 2015/0064092 | A1* | 3/2015 | Noyes | B01J 23/745 423/304 |

OTHER PUBLICATIONS

Zaghib, et al., Purifcation process of natural graphite as anode for Li-ion batteries: chemical versus thermal, Journal of Power Sources 2003; 119-121: 8-15 (Year: 2003).*
"Avicel," accessed online at: https://www.pharma.dupont.com/pharmaceutical-brands/avicelr-for-solid-dose-forms.LiLrnl on Apr. 14, 2021 (Year: 2021).*
Oya, et al., Review Phenomena of catalytic graphitization, Journal of Materials Science 1982; 17: 309-322 (Year: 1982).*
Banek, et al., Sustainable Conversion of Lignocellulose to High-Purity, Highly Crystalline Flake Potato Graphite, ACS Sustainable Chem. Eng. 2018; 6: 13199-13207 (Year: 2018).*
Kay, et al., Three-Dimensional Surface Reconstruction and Panoramic Optical Mapping of Large Hearts, IEEE Transactions on Biomedical Engineering, 51:7:1219-1229.
Kim, et al., Materials for Multifunctional Balloon Catheters With Capabilities in Cardiac Electrophysiological Mapping and Ablation Therapy, Nature Materials, 2011, 10:316-323.
Kleber, et al., Basic Mechanisms of Cardiac Impulse Propagation and Associated Arrhythmias, Physiol. Rev., 2004, 84:431-488.
Sole, et al., The Role of Re-aggregation on the Performance of Electrochemically Exfoliated Many-layer Graphene for Li-ion Batteries, Journal of Electroanalytical Chemistry, 2015, 753:35-41.

Vispute, et al., Renewable Chemical Commodity Feedstocks from Integrated Catalytic Processing of Pyrolysis Oils, Science, Nov. 26, 2010, 330:1222-1227.
Hansen, et al., Atrial fibrillation driven by micro-anatomic intramural re-entry revealed by simultaneous sub-epicardial and sub-endocardial optical mapping in explanted human hearts, European Heart Journal, 2015, 36:2390-2401.
Schuessler, et al., Simultaneous Epicardial and Endocardial Activation Sequence Mapping in the Isolated Canine Right Atrium, downloaded from http://ahajournals.org 1993, 14 pages.
Ripplinger, et al., Mechanisms of Unpinning and Termination of Ventricular Tachycardia, Am J Physiol Heart Cir Physiol, 291:H192-H192.
International Search Report and Written Opinion for PCT/US2018/020680, dated May 2, 2018, 11 pages.
"Global Graphite Market will Reach US$17.56 billion in Terms of Value and 4.48 Million Tons in Terms of Volume, in 2020", Anti-Corrosion Methods and Materials, vol. 62, No. 4, https://www.emerald.com/insight/content/doi.org/10.1108/ACMM.12862daa.013.html; 2020; 5 pgs.
Guang-Hui Wang, et al., "Nitrogen-Doped Ordered Mesoporous Carbon Supported Bimetallic PtCo Nanoparticles for Upgrading of Biophenolics", Angew. Chem. Int. Ed, 2016, 55, pp. 8850-8855.
D. M. Alonso, et al., "increasing the Revenue from Lignocellulosic Biomass: Maximizing Feedstock Utilization", Science Advances, Applied Sciences & Engineering, vol. 3, 2017; 7 pgs.
A. W. Bhutto, et al., "Progress in the Production of Biomass-to-Liquid Biofuels to Decarbonize the Transport Sector—Prospects and Challenges", Royal Society of Chemistry, vol. 6, 2016, pp. 32140-32170.
D. Woolf, et al., "Sustainable Biochar to Mitigate Global Climate Change", https://www.ncbi.nlm.nih.gov/pmc/articles/PMC2964457; Jan. 17, 2020, 9 pgs.
H. Buqa, et al., "Behaviour of Highly Crystalline Graphites in Lithium-Ion Cells with Propylene Carbonate Containing Electrolytes", Journal of Power Sources, www.elsevier.com/locate/jpowsour; vol. 146, 2005, pp. 134-141.
R. S. Kalyoncu, "Natural Graphite", Kirk-Othmer Encyclopedia of Chemical Technology, 2015; pp. 1-21.
G. Zhao, et al., "Study on the Structural Characteristics of Graphitized Carbon Microcrystal Prepared from PI Film Using X-ray Diffraction Technique", Science in China (Series E): vol. 41, No. 1, Feb. 1998; 5 pgs.
Allessie, et al., Circus Movement in Rabbit Atrial Muscle as a Mechanism of Tachycardia, III. The "Leading Circle" Concept: A New Model of Circus Movement in Cardiac Tissue without the Involvement of an Anatomical Obstacle, Circulation Research, 1977, 41:1, pp. 9-18.
Xu, et al., 3D Multifunctional integumentary Membranes for Spatiotemporal Cardiac Measurements and Stimulation Across the Entire Epicardium, Nature Communications, 2013, vol. 5:3329: DOI: 10.10038/NCOMMS4329; www.nature.com/naturecommunications; 10 pages.
B. E. Warren, X-Ray Diffraction Study of Carbon Black, J. Chem. Phys., 1934, 2:9:551-555.
Baxter, et al., Visualizing Excitation Waves inside Cardiac Muscle Using Transillumination, Biophysical Journal, 2001, 80:516-530.
Gutbroad, et al., Patient-Specific Flexible and Stretchable Devices for Cardiac Diagnostics and Therapy, Prog Biophys Mol Biol, 2014, 115:0:244-251.
Bray, et al., Examination of Optical Depth Effects on Fluorescence Imaging of Cardiac Propagation, Biophysical Journal, 2003, 85:4134-4145.
Buqa, et al., Behavior of Highly Crystalline Graphites in Lithium-Ion Cells With Propylene Carbonate Containing Electrolytes, Journal of Power Sources, 2005, 146:134-141.
Caldwell, et al., Probing Field-Induced Tissue Polarization Using Transillumination Fluorescent Imaging, Biophysical Journal, 2010, 99:2058-2066.
Cancado, et al., General Equation for the Determination of the Crystalline Size La of Nanographite by Raman Spectroscopy, Applied Physics Letters, 2006, 88, pp. 163106-163106-3.

(56) References Cited

OTHER PUBLICATIONS

Cancado, et al., Measuring the Degree of Stacking Order in Graphite by Raman Spectroscopy; https://soar-ir.repo.nii.ac.jp/record/12662/files/lcgustavo Lc Raman.pdf; 2007, pp. 1-4.

Cheng, et al., Virtual Electrode-Induced Reexcitation a Mechanism of Defibrillation, American Heart Association, Inc.; Circulation Research; http://ahajournals.org, 1999, pp. 1056-1066.

Chung, et al., Automotive Lithium-Ion Battery (LIB) Supply Chain and U.S. Competitiveness Considerations, CEMAC, 2015, 41 pages.

De Bakker, et al, Reentry as a Cause of Ventricular Tachycardia in Patients with Chronic Ischemic Heart Disease: Electrophysiologic and Anatomic Correlation, Pathophysiology and Natural History Ventricular Arrythmia, 1988, 77:3:589-606.

Dunn, et al., Material and Energy Flows in the Production of Cathode and Anode Materials for Lithium Ion Batteries, Argonne National Laboratory, Sep. 2015, 56 pages.

Efimov, et al., Mapping Cardiac Pacemaker Circuits Methodological Puzzles of the Sinoatrial Node Optical Mapping, American Heart Association, Inc., Circulation Research; http://ahajournals.org; 2010, pp. 255-271.

Efimov, et al., Optical Imaging of the Heart, American Heart Association, Circulation Research; http://ahajournals.org; 2004, pp. 21-33.

Efimov, et al., Transmembrane Voltage Changes Produced by Real and Virtual Electrodes During Monophasic Defibrillation Shock Delivered by an Implantable Electrode, Medtronic; Journal of Cardiovascular Electrophysiology; vol. 8, No. 9, Sep. 1997, pp. 1031-1045.

Efimov, et al., Virtual electrode Polarization in the Far Field: Implications for External Defibrillation; Am J Physical Cir Physiol, 2000, 279, pp. H1055-H1070.

Efimov, et al., Virtual Electrode-induced Phase Singularity a Basic Mechanism of Defibrillation Failure, American Heart Association, Inc., 1998, pp. 918-925.

Fang, et al., Capacitively Coupled Arrays of Multiplexed Flexible Silicon Transistors for Long-Term Cardiac Electrophysiology; Nature Biomedical Engineering, 2017, 12 pages.

Fedorov, et al., Application of Blebbistatin as an Excitation-contraction Uncoupler for Electrophysiologic Study of Rat and Rabbit Hearts, Heart Rhythm Society, vol. 4, No. 5, May 2007, pp. 619-626.

Ferrari, Raman Spectroscopy of Graphene and Graphite: Disorder, Electron-phonon Coupling, Doping and Nonadiabetic Effects, ScienceDirect, Solid State Communication, 2007, 143:47-57.

Fishler, Syncytia! Heterogeneity as a Mechanism Underlying Cardiac Far-Field Stimulation During Defibrillation-Level Shocks; Journal of Cardiovascular Electrophysiology; vol. 9, No. 4, Apr. 1998, pp. 384-394.

Garrey, et al., The Nature of Fibrillary Contraction of the Heart—Its Relation to Tissue Mass Form, Downloaded from www. Physiology.org/journal/ajplegacy at George Washington Uni Med Ctr, 2020, 18 pages.

Chung, et al,. Stetchable, Multiplexed pH Sensors with Demonstrations on Rabbit and Human Hearts Undergoing Ischemia, Adv. Healthcare Mater., 2014, 3:59-68.

George Ralph Mines, On Dynamic Eauilibrium in the Heart, 1913; pp. 349-383.

Gliner, et al., The Defibrillation Success Rate Versus Energy Relationship: Part I—Curve Fitting and the Most Efficient Defibrillation Energy, PACE; vol. 13; Apr. 1990, pp. 425-431.

Gliner, et al., The Defibrillation Success Rate Versus Energy Relationship: Part II—Estimation with the "Bootstrap", PACE, Voi. 13; Mar. 1990, pp. 326-338.

Graphite Demand From Lithium Ion Batteries to More Than Treble in 4 Years, Benchmark Mineral Intelligence (BLOG), (<https://www.benchmarkmaterials>. Com/battery-supply-chain-blog), Jan. 17, 2020, 7 pages.

Gutbrod, et al., Quantification of the Transmural Dynamics of Atrial Fibrillation by Simultaneous Endocardial and Epicardial Optical Mapping in an Acute Sheep Model, Cir Arrhythmia Electrophsiol., 2015, 8:2:456-465.

H. Okamoto, The C—Fe (Carbon-Iron) System, ASM International, Phase Diagram Evaluations: Section III, Journal of Phase Equilibria, 1992, 13:5:543-565.

Hoffman, et al., Cellular Mechanisms for Cardiac Arrhythmias, Circulation Research, 1981, 49:1, 15 pages.

Kay, et al., Measuring Curvature and Velocity Vector Fields for Waves of Cardia Excitation in 2-D Media, IEEE Transactions on Biomedical Engineering, 2005, 52:1:50-63.

Kim, et al., Materials For Multifunctional Balloon Catheters With Capabilities in Cardiac Electroohysioiogical Mapring and Ablation Therapy, Nature Materials, 2011, 10:316-323.

Kim, et al., Epidermal Electronics, Science, 2011, 8 pages.

Kleber, et al., Basic Mechanisms of Cardiac Impulse Propagation and Associated Arrhythmias, Physiol. Rev., 2004, vol. 84; pp. 431-488.

Knisley, et al., Virtual Electrode Effects in Myocardial Fibers, Biophysical Journal, 1994, 66:719-728.

Koh, et al., Ultrathin Injectable Sensors of Temperature, Thermal Conductivity, and Heat Capacity for Cardiac Ablation Monitoring, Adv. Health Matter., 2017, 19 pages.

Lang, et al., Arrhythmogenic Remodeling of $\beta_2$ Versus $\beta_1$ Adrenergic Signaling in the Human Failing Heart: American Heart Association, Inc.; Ciro Arrhythm Electrophvsiol; Apr. 2015, pp. 409-419.

Laughner, et al., Processing and Analysis of Cardiac Optical Mapping Data Obtained with Potentiometric Dyes; Arn J Physiol Heart Cir Physiol; vol. 303; 2012, pp. H753-H765.

Lee, et al., Sustainability: The Capacity of Smokeless Biomass Pyrolysis for Energy Production, Global Carbon Capture and Sequestration, Energy & Environmental Science, 2010, 3:1695-1705.

Lehmann, et al., Biochar for Environmental Management and Technology, 2009, 438 pages.

Li, et al., Low Energy Multi-Stage Atrial Defibrillation Therapy Terminates Atrial Fibrillation with Less Energy than a Single Shock, Cir Arrhythmia Electrophsiol, 2011, 4:6:917-927.

Lou, et al., The role of Dynamic Instability and Wavelength in Arrhythmia Maintenance as Revealed by Panoramic Imaging With Blebbistatin vs. 2,3-Butanedione Monoxime, Am J Physiol Heart Cir Physiol, 2011,302:H262-H269.

Oya, et al., Review Phenomena of Catalytic Graphitization, Journal of Materials Science, 1982, 17:309-322.

Peter Whoriskey, In Your Phone, In Their Air, A trace of graphite is in consumer tech. In these Chinese villages, it's everywhere— (China Pollution Cased by Graphite Mining for Smartphone Battery); The Washington Post; Oct. 2, 2016, 31 pages.

Pimenta, et al., Studying Disorder in Graphite-Based Systems by Raman Spectroscopy, Physical Chemistry Chemical Physics, 2007, 9:1276-1291.

Ripplinger, et al., Panoramic Imaging Reveals Basic Mechanisms of Induction and Termination of Ventricular Tachycardia in Rabbit Heart with Chronic Infarction: Implications of Low Voltage Cardioversion, Heart Rhythm, 2009, 6:1:87-97.

Rogers, et al., Panoramic Optical Mapping Reveals Continuous Epicardial Reentry During Ventricular Fibrillation in the Isolated Swine Heart, Biophysical Journal, 2007, 92:1090-1095.

Sanders, et al., Spectral Analysis Identifies Sites of High-Frequency Activity Maintaining Atrial Fibrillation in Humans, American Heart Association, Inc.; Circulation; http://www.circulationaha.org; Aug. 9, 2005, pp. 789-797.

Sepulveda, et al., Current Injection Into a Two-Dimensional Anisotropic Bidomain, Biophys. J. Biophysical Society, 1989, 55:987-999.

Sobie, et al., A Generalized Activating Function for Predicting Virtual Electrode in Cardiac Tissue, Biophysical Journal, 1997, 73:1410-1423.

Sole, et al., The Role of Re-aggregation on the Performance of Electrochemically Exfoliated Many-layer Graphene for Li-ion Batteries, Journal of Electroanalvtical Chemistry, 2015, 753:35-41.

(56) References Cited

OTHER PUBLICATIONS

Trammell, et al., Analysis of Natural Graphite, Synthetic Graphite, and Thermosetting Resin Candidates for Use in Fuel Compact Matrix, OakRidge National Laboratory, 2009, 66 pages.
Tung, et al., Influence of Electrical Axis of Stimulation on Excitation of Cardiac Muscle Cells, Annual Conference of the IEEF Engineering in Medicine and Biology Society; Circulation Research; vol. 69, No. 3, Sep. 1991, pp. 722-730.
U.S. Department of Interior U.S Geological Survey, Mineral Commodity Summaries 2016, 205 pages.
Vispute, et al., Renewable Chemical Commodity Feedstocks from Integrated Catalytic. Processing of Pyrolysis Olis, Science. Nov. 26, 2010, 330:1222-1227.
Viventi, et al., A Conformal, Bio-Interfaced Class of Silicon Electronics for Mapping Cardiac Electrophysiology, Science Translational Medicine, 2010, 2:24, 11 pages.
Hansen, et al., Atriai fibrillation driven by micro-anatomic intramural re-entry revealed by simultaneous sub-epicardial and sub-endocardial optical mapping in explanted human hearts, European Heart Journal, 2015, 36:2390-2401.
Walton, et al., Dual Excitation Wavelength Epifluorescence Imaging of Transmural Electrophysiological Properties in Intact Hearts; Heart Rhythm Society: vol. 7, No. 12; Dec. 2010; pp. 1843-1849.
Wikswo, et al., Virtual Electrodes in Cardiac Tissue: A Common Mechanism for Anodal and Cathodal Stimulation, Biophysical Journal, 1995, 69:2195-2210.
Schuessler, et al., Simultaneous Epicardial and Endocardial Activation Sequence Mapping in the Isolated Canine Right Atrium; Circulation; vol. 88, No. 1; downloaded from http://ahajournals.org; Jul. 1993, pp. 250-263.
Xu, et al., Materials and Fractal Designs for 3D Multifunctional Integumentary Membranes with Capabilities in Cardiac Electrotherapy, Adv. Matter., 2015, 27:1731-1737.
Manoharan, et al., Comparing the Efficacy and Safety of a Novel Monophasic Waveform Delivered by the Passive Implantable Atrial Defibrillator With Biphasic Waveforms in Cardioversion of Atrial Fibrillation, American Heart Association, Inc., Circulation; http://www.circulationaha.org; Apr. 6, 2004, pp. 1686-1692.
Osswald, et al., Transvenous Single Lead Atrial Defibrillation:Efficacy and Risk of Ventricular Fibrillation in an Ischemic Canine Model; PACE; vol. 21; Mar. 1998, pp. 580-589.
Mark, et al., Quality of Life with Defibrillator Therapy or Amiodarone in Heart Failure, N Engl J Med., 2008, 359:10:999-1008.
Schron, et al., Quality of Life in the Antiarrhythmics Versus implantable Defibrillators Trial Impact of Therapy and influence of Adverse Symptoms and Defibrillator Shocks; Circulation; http://www.circulationaha.org; downloaded from http://ahajournals.org; Feb. 5, 2002, pp. 589-594.
Vollmann, et al., Inappropriate therapy and fatal proarrhythmia by an implantable cardioverter-defibrillator; Heart Rhythm Society; vol. 2, No. 3; Mar. 2005, pp. 307-309.
Yamazaki, et al., Heterogeneous atrial wall thickness and stretch promote scroll waves anchoring during atrial fibrillation, Cardiovascular Research, 2012, 94:48-57.
Lopshire, et al., Sudden Cardiac Death—Better Understanding of Risks, Mechanisms, and Treatment, American Heart Association, Inc.; Circulation; http://www.circulationaha.org; vol. 114; Sep. 12, 2006, pp. 1134-1136.
Lou, et al., Transmural Heterogeneity and Remodeling of Ventricular Excitation-Contraction Coupling in Human Heart Failure, American Heart Association, Inc.; Circulation; http://circ.ahajournals.org; May 3, 2011, pp. 1881-1890.
Holzem, et al., Reduced Response to IKR Blockade and Altered hERG1a/1b Stoichiometry in Human Heart Failure, J Mol Cell Cardiol, 2016, 96:82-92.
Conen, et al., Gender Differences in Appropriate Shocks and Mortality among Patients with Primary Prophylactic Implantable Cardioverter-Defibrillators: Systematic Review and Meta-Analysis, PLOS One, 2016, 15 pages.
Tompkins, et al., Sex Differences in Device Therapies tor Ventricular Arrhythmias or Death in the Multicenter Automatic Defibrillator Implantation Trial With Cardiac Resynchronization Therapy (MADIT-CRT) Trial; Journal of Cardiovascular Electrophysiology, vol. 26, No. 8, Aug. 2015, pp. 862-871.
Odening, et al., How do sex hormones modify arrhythmogenesis in long-QT syndrome?—Sex hormone effects on arrhythmogenic substrate and triggered activity; Heart Rhythm, Nov. 2014; vol. 11, No. 11, pp. 2107-2115.
Efimov, et al., Multiscale Imaging of the Human Heart: Building the Foundation for Human Systems Physiology and Translational Medicine; 32nd Annual International Conference of the IEEE EMBS Buenos Aires, Argentina, Aug. 31-Sep. 4, 2010; IEEE; pp. 5177-5180.
Janardhan, et al, A Novel Low-Energy Electrotherapy That Terminates Ventricular Tachycardia With Lower Energy than a Biphasic Shock When Anti-Tachycardia Pacing Fails, J Am Coll Cardiol, 2012, 11:60:23:2393-2398.
Tardos, et al, Sex Differences in Cardiac Electrophysiology and Clinical Arrhythmias: Epidemiology, Therapeutics, and Mechanisms, Canadian Journal of Cardiology, 2014, 30:783-792.
Janardhan, et al., Multistage Electrotherapy Delivered Through Chronically-Implanted Leads Terminates Atrial Fibrillation With Lower Energy Than a Single Biphasic Shock, J Am Coll Cardiol, 2014, 63:1:40-48.
Li, et al., Multiple Monophasic Shocks Improve Electrotherapy of Ventricular Tachycardia in a Rabbit Model of Chronic Infarction, Heart Rhythm, 2009, 17 pages.
Suenari, et al., Gender Differences in the Clinical Characteristics and Atrioventricular Nodal Conduction Properties in Patients with Atrioventricular Nodal Reentrant Tachycardia; Journal of Cardiovascular Electrophysiology; vol. 21, No. 10, Oct. 2010, pp. 1114-1119.
Kurokawa, et al., Sex hormonal regulation of cardiac ion channels in drug-induced QT syndromes; Pharmacol Ther.; Dec. 2016; vol. 168; 23-28.doi:10.1016/j.pharmthera.2016.09.004; pp. 1-14.
T. D. Burchell, "Carbon Materials for Advanced Technologies", Elsevier Science Ltd., 1999, pp. 1-33.
N. A. Banek, "Sustainable Conversion of Lignocellulose to High-Purity, Highly Crystalline Flake Potato Graphite", ACS Sustainable Chemistry & Engineering, vol. 6, 2018, pp. 13199-13207.
B.C. Wang, et al., "More Spherical Large Fullerenes and Multi-Layer Fullerene Cages", Journal of Molecular Structure (Theochem), vol. 540, 2001, pp. 171-176.
J. D. Bernal, "The Structure of Graphite", Proceedings of the Royal Society, rspa.royalsocietypubiishing.org; Oct. 12, 2012, 26 pgs.
M. Inagaki, "Advanced Carbon Materials", Handbook of Advanced Ceramics, http://dx.doi.org/10.1016/8976-0-12-385469-8-00002-2, Chapter 2.1, 2013, 36 pgs.
D. D. L. Chung, "Review Graphite", Journal of Materials Science, vol. 37, 2002, pp. 1475-1489.
H. O. Pierson, "Handbook of Carbon, Graphite, Diamond and Fullerene—Properties, Processing and Applications", Noyes Publications, 2013, pp. 1-84 and 371-388.
A. Nieto-marquez, et al., "Carbon Nanospheres: Synthesis, Physicochemical Properties and Applications", Journal of Materials Chemistry, www.rsc.org/materials, 2011, vol. 21, pp. 1664-1672.

* cited by examiner

| Element | Concentration [ ppm wt ] | Element | Concentration [ ppm wt ] |
|---|---|---|---|
| Li | 0.08 | Pd | < 0.1 |
| Be | < 0.05 | Ag | < 0.1 |
| B | 9.1 | Cd | < 0.5 |
| C | Matrix | In | Binder |
| N | - | Sn | < 0.5 |
| O | - | Sb | < 0.1 |
| F | =< 100 | Te | < 0.5 |
| Na | 76 | I | =< 10 |
| Mg | 2.8 | Cs | < 0.5 |
| Al | 2.3 | Ba | 1.4 |
| Si | 67 | La | =< 1 |
| P | 0.62 | Ce | < 0.5 |
| S | 3.5 | Pr | < 0.5 |
| Cl | 130 | Nd | < 0.05 |
| K | 2.6 | Sm | < 0.05 |
| Ca | 13 | Eu | < 0.05 |
| Sc | < 0.05 | Gd | < 0.05 |
| Ti | 0.34 | Tb | < 0.05 |
| V | < 0.05 | Dy | < 0.05 |
| Cr | < 0.5 | Ho | < 0.05 |
| Mn | 0.43 | Er | < 0.05 |
| Fe | 210 | Tm | < 0.05 |
| Co | 0.14 | Yb | < 0.05 |
| Ni | 3.5 | Lu | < 0.05 |
| Cu | 2.2 | Hf | < 0.05 |
| Zn | < 0.5 | Ta | < 100 |
| Ga | < 0.5 | W | < 0.05 |
| Ge | < 0.1 | Re | < 0.05 |
| As | =< 1 | Os | < 0.05 |
| Se | < 0.5 | Ir | < 0.05 |
| Br | < 0.5 | Pt | < 0.1 |
| Rb | < 0.1 | Au | < 0.5 |
| Sr | 0.72 | Hg | < 0.5 |
| Y | < 0.05 | Tl | < 0.05 |
| Zr | < 0.1 | Pb | < 0.1 |
| Nb | < 0.1 | Bi | < 0.05 |
| Mo | < 0.1 | Th | < 0.05 |
| Ru | < 0.5 | U | < 0.05 |
| Rh | < 0.1 | | |

FIG. 31

METHODS AND SYSTEMS FOR THE PRODUCTION OF CRYSTALLINE FLAKE GRAPHITE FROM BIOMASS OR OTHER CARBONACEOUS MATERIALS

CROSS-REFERENCE TO RELATED APPLICATIONS

This application is a national phase of International Patent Application No. PCT/US2018/020690 filed Mar. 2, 2018, which claims the benefit of U.S. Provisional Application No. 62/480,708, filed Apr. 3, 2017, and U.S. Provisional Application No. 62/543,515, filed Aug. 10, 2017, the contents of which are incorporated by reference herein in their entirety.

GOVERNMENT RIGHTS

This invention was made with government support under National Reconnaissance Office, Grant No. NR0000-14-C-0335, Award No. CCNS21309F. The government has certain rights in the invention.

FIELD OF THE INVENTION

The present invention relates to the synthesis of high purity crystalline flake graphite from low-cost biomass (or other carbonaceous) starting materials. More specifically, the present invention relates to the synthesis of high purity crystalline flake graphite from low-cost biomass (or other carbonaceous) starting materials via laser irradiation. The present invention also relates to the conversion of low-cost biomass (or other carbonaceous materials) to pyrolysis-oil, pyrolysis-gas and char, and the subsequent, or concurrent, conversion of char to high purity crystalline flake graphite via laser irradiation.

BACKGROUND OF THE DISCLOSURE

The market for graphite, classified as a "strategic and critical mineral" by the US and EU, is expected to reach 4.48 million tons and $17.56 billion by 2020. Graphite is consumed in numerous industries and applications including steel making, batteries, refractories, lubricants, foundry facings, brake linings, pencils, graphite foils for use in fuel cells, laptop computers, valve packings and gaskets, and graphite electrodes for use in, for example aluminum smelting. Graphite is also used as a starting material for the production of graphene, graphene oxide and reduced graphene oxide.

Graphite is an allotropic form of crystalline carbon. Graphite consists of $sp^2$ bonded carbon atoms densely arranged in parallel-stacked layers. Each layer is made of hexagonally arranged $sp^2$ carbon atoms in planar condensed ring systems. An individual layer of graphite is referred to as graphene. The layers are stacked parallel to each other in a three-dimensional crystalline long-range order. There are two allotropic forms, distinguished by their stacking arrangements, hexagonal and rhombohedral. Graphite is grey to black in colour, opaque, and usually has a metallic lustre; sometimes it exhibits a dull earthy lustre. Graphite occurs naturally in metamorphic rocks and is a soft mineral (with a Mohs hardness of 1 to 2) that exhibits perfect basal (one-plane) cleavage. Graphite is flexible but not elastic, has a melting point of 3,927° C., and is highly refractory (i.e. it is stable and retains its strength at high temperatures). Graphite has very high electrical, and thermal conductivity compared to other non-metals and is chemically inert. All these properties combined make graphite desirable for many industrial applications.

Graphite can be natural or synthetic and both have industrial uses. Natural graphite is mined by both open pit and underground methods. Graphite usually needs beneficiation. This may be carried out by hand-picking the pieces of gangue (rock) and hand-screening the product or by crushing the rock and floating out the graphite. Beneficiation by flotation encounters the difficulty that graphite is very soft and "marks" (coats) the particles of gangue. This makes the "marked" gangue particles float off with the graphite, yielding impure concentrate. There are two ways of obtaining a commercial concentrate or product: 1) repeated regrinding and floating (up to seven times) to purify the concentrate, or 2) by acid leaching (dissolving) the gangue with hydrofluoric acid (for a silicate gangue) or hydrochloric acid (for a carbonate gangue). In milling, the incoming graphite products and concentrates can be ground before being classified (sized or screened), with the coarser flake size fractions (below 8 mesh, 8-20 mesh, 20-50 mesh) carefully preserved, and then the carbon contents are determined. Some standard blends can be prepared from the different fractions, each with a certain flake size distribution and carbon content. Custom blends can also be made for individual customers who want a certain flake size distribution and carbon content. If flake size is unimportant, the concentrate can be ground more freely. Environmental impacts from graphite mills consist of air pollution including fine particulate exposure of workers and nearby residents, soil contamination from powder spillages leading to heavy metal contamination of soil, and water contamination from the corrosive chemicals and heavy metals leached during purification.

Synthetic graphite can be manufactured by the conversion of calcined petroleum coke. Specifically, calcined petroleum coke and coal tar pitch are mixed at elevated temperatures and subsequently subjected to temperatures in excess of 2800° C. in the absence of oxygen to promote graphitization. The total process time for graphitization can be as long as 2-3 weeks. The heating cycle is typically rapid, with the graphitization temperature being reached in a few days. However, cool down time is slow and it can take up to two weeks until the furnace is cool enough to unload.

Natural graphite is generally classified as either amorphous, flake, or vein/lump. Amorphous graphite is the lowest quality and most abundant. Amorphous refers to its very small crystal size and not to a lack of crystal structure. Amorphous is used for lower value graphite products and is the lowest priced graphite. Amorphous graphite also has the lowest carbon content, ranging from 25-80 wt %. Flake or crystalline flake graphite is less common and higher quality than amorphous, with a carbon content of about 80-98 wt %. Vein or lump graphite is the rarest, most valuable, and highest quality type of natural graphite, with a carbon content of 90-99 wt %. It occurs in veins along intrusive contacts in solid lumps, and it is only commercially mined in Sri Lanka. Due to the rarity of vein or lump graphite, and the intensive market needs for high quality graphite, flake graphite offers the best value for applications and industries that require graphite with qualities superior to that of amorphous graphite.

Anode active material in lithium ion batteries is generally made from flake graphite that has been purified to very high purity (99.9+%), micronized and processed to form shaped agglomerates of flakes, generally referred to as "spherical" or "potato" graphite. Potato-shaped graphite has been shown to be a very promising form of graphite due to the ease with which it is fabricated into an electrode. Zaghi, K. et al., Journal of Power Sources, 119-121, pp. 8-15, 2003. The high tap-density of potato-shaped graphite allows for better control of electrode porosity. Furthermore, the use of potato-shaped graphite decreases the surface area and enables higher volumetric density, allowing for better battery capacity and efficiency. However, purification, micronization and shaping incurs significant energy and time investment, up to 70% material loss and the use of highly corrosive and environmentally detrimental chemicals such as hydrofluoric acid.

BRIEF DESCRIPTION OF THE DRAWINGS

FIG. 31 is a table showing elemental analysis, of graphite produced in Example 13, by Glow Discharge Mass Spectrometry (GDMS);

DETAILED DESCRIPTION

Figure 1:
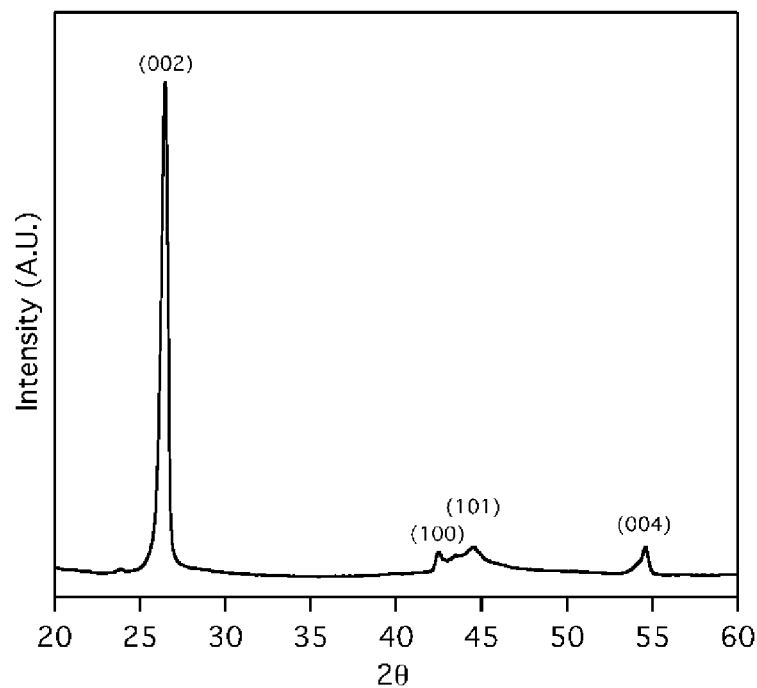
FIG. 1 is a powder X-ray diffraction (PXRD) profile of graphite (d-spacing 0.3360 nm) produced in Example 1.

The following description of the embodiments is merely exemplary in nature and is in no way intended to limit the subject matter of the present disclosure, their application, or uses.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The present invention relates to the synthesis of high purity crystalline flake graphite from low-cost biomass (or other carbonaceous) starting materials. More specifically, the present invention relates to the synthesis of high purity crystalline flake graphite from low-cost biomass (or other carbonaceous) starting materials via laser irradiation. In some instances, the present invention relates to the conversion of low-cost biomass (or other carbonaceous materials) to pyrolysis-oil, pyrolysis-gas (syngas) and char (biochar or carbonaceous char), and the subsequent conversion of char to high purity crystalline flake graphite via laser irradiation.

Methods according to various aspects of the present disclosure produce high purity, highly crystalline synthetic flake graphite from any suitable biomass or carbonaceous feedstock such as agricultural, industrial/municipal waste or energy crops. In some instances, a suitable biomass feedstock can be, but is not limited to, lignin, lignocellulose, microcrystalline cellulose, wood flour or sawdust, dehydrated agricultural products such corn stover (i.e., cobs, stalks and leaves), dehydrated food waste, dehydrated livestock feces, miscanthus, switchgrass, hemp, poplar, willow, sorghum, sugarcane, bamboo, agave, alfalfa, grains (for example, barley, corn, oats rye, wheat), algae, oil palm, or any combination of the foregoing. Other graphitizable and non-graphitizable carbonaceous materials can also be used as feedstocks for flake graphite formation including artificial and natural polymers, plastics, peat, coal, pitch, coke, carbon blacks, activated carbons, mesophase carbons, charcoal, or any combination of the foregoing. Any combination of the above materials, biomass or otherwise, could be used as well.

Previously, as illustrated by U.S. Pat. No. 8,262,942 and U.S. Patent Application Publication No. 2006/0137487, others have attempted to form graphite from biomass feedstocks by heating the biomass feedstock to about 1300° C. in the presence of transition metal salts such as iron (III) nitrate, nickel nitrate, chromium nitrate, chromium chloride, manganous nitrate, cobaltous nitrate and nickel chloride. The use of such transition metal salts did not result in the production of graphite, but instead formed hollow carbon nanospheres.

Unlike previous methods which utilize metal salts, catalysts used in accordance with the present disclosure are metals in their elemental state or an alloy. The catalyst used can be any suitable elemental metal, combination of metals, alloy, combination of alloys, or combination of alloy(s) and metal(s). In some instances, the elemental metal can be any one of iron (Fe), cobalt (Co) and nickel (Ni). In other instances, the elemental metal can be any one of titanium (Ti), zirconium (Zr) or hafnium (Hf). In other instances, the elemental metal can be any one of vanadium (V), chromium (Cr), molybdenum (Mo) or tungsten (W). In yet other instances, the elemental metal can be any one of ruthenium (Ru), rhenium (Rh), palladium (PD) or platinum (Pt). In yet other instances, the elemental metal can be any one of copper (Cu), silver (Ag) or gold (Au). In yet other instances the elemental metal can be zinc (Zn) or cadmium (Cd). In yet other instances, the elemental metal can be any one of aluminum (Al), gallium (Ga), indium (In), tin (Sn) or lead (Pb).

In some instances, the alloy is a steel. In some instances, the alloy can be a bronze or a brass. In some instances, the alloy be an aluminum alloy having one or more of calcium, cerium, copper, germanium, gold, indium, iron, magnesium, nickel, platinum, silicon, thorium and zinc. In some instances, the alloy can be an arsenic alloy having one or more of antimony, cobalt, copper, indium, iron, manganese, nickel, tin and zinc. In some instances, the alloy can be a beryllium-copper alloy. In some instance, the alloy can be a copper alloy having one or more of nickel, silver, tin and zinc. In some instances, the alloy can be an iron alloy having one or more of antimony, gadolinium, molybdenum, niobium, silicon, tin, yttrium and zirconium. In some instances, the alloy can be a nickel alloy having one or more of antimony, chromium, iron thorium, tin, titanium, tungsten, vanadium, and zinc. In some instances, the alloy can be a cobalt alloy having one or more of chromium, tungsten, nickel, molybdenum and titanium.

The catalyst can be in the form of a powder, grains, spheres, flakes, or any other suitable shape. In instances where the catalyst is in the form of a powder, grains or spheres, each individual elemental metal unit (e.g. individual particle, grain, sphere) may have a diameter on the micrometer to millimeter scale ranging from 500 to 3.5 mesh, or larger. In some instances, the catalyst used can be in the form of a foil, a sheet, a plate or any other suitable solid form having any suitable surface dimensions based on the desired scale of methods used in accordance with the present disclosure.

The laser used for irradiating the biomass or carbonaceous feedstock can be any laser capable of decomposing the biomass/carbonaceous feedstock to form graphite precursors and to at least partially melt the catalyst. In accordance with various aspects of the present disclosure, the laser used can be any one of an ultraviolet (UV) emitting laser such as, for example, an excimer laser (uses reactive gases such as chlorine and fluorine mixed with inert gases such as argon, krypton, or xenon), an infrared (IR) emitting laser such as, for example, a solid state ruby or neodymium-YAG (yttrium aluminum garnet) laser, and a gas laser such as, for example, a helium laser, a helium-neon laser and CO laser or a $CO_2$ laser, a fiber laser, a dye laser, a semiconductor laser, a hydrogen fluoride laser, a deuterium fluoride laser, a chemical oxygen-iodine (COIL) laser, an all gas-phase iodine laser (Agil), a NdCrYAG laser, a Er:YAG laser, a holmium YAG (Ho:YAG) laser, and a gas dynamic laser. In some instances, the laser is a continuous wave laser. In other instances, the laser is a single pulsed (commonly known as a long pulse or normal mode) laser. In yet other instances, the laser can be a single pulsed Q-switched laser. In yet other instances, the laser can be a repetitively pulsed or scanning laser. In yet other instances, the laser can be a mode locked laser. Lasers used in accordance with various aspects of the present disclosure can have a continuous or pulsed wave power ranging from 1 watt to several megawatts and emit radiation at wavelengths ranging from 10 nanometers to 15 micrometers.

In accordance with various aspects of the present disclosure, high purity, highly crystalline synthetic flake graphite can be produced using the following method. First, the biomass and/or carbonaceous feedstock is combined with the catalyst one o, to form a feedstock/catalyst mixture. Optionally, the mixture can then be ground, milled or pulverized. In some instances, the mixture can be ground, milled or pulverized or otherwise formed into a powder. The size of granules within a formed powder is not particularly limiting. The powder can range from very fine to very coarse. In some instances, the powder can comprise mesh size granules ranging from, for example, 500 U.S. mesh or lower to 3.5 U.S. mesh or higher. In some instances, the powder can comprise granules having diameters of about 2 mm or larger. In some instances, the powder can comprise granules having diameters of about 2.5 µm or smaller. In some instances, the feedstock/catalyst mixture has a feedstock to catalyst ratio ranging from about 3:1 to about 4:1 by weight. In other instances, the feedstock/catalyst mixture has a feedstock to catalyst ratio ranging from about 4:3 to about 4:1 by weight. In yet other instances, the feedstock/catalyst mixture has a feedstock to catalyst ratio ranging from about 0.5:1 to about 10:1 by weight, alternatively from about 0.75:1 to about 9:1 by weight, alternatively from about 1:1 to about 8:1 by weight, alternatively from about 5:4 to about 7:1 by weight, alternatively from about 4:3 to about 6:1 by weight, alternatively from about 3:2 to about 5:1 by weight, and alternatively from about 2.5:1 to about 4.5:1 by weight.

The feedstock/catalyst mixture, which can be in powder form, is then subjected to laser irradiation. While not being bound to any particular theory, it is believed that the laser heats the feedstock/catalyst mixture to a molten state, decomposing the feedstock into graphite precursors, such as polyaromatics, and the graphite precursors are absorbed onto the melted metal catalyst. The melted metal catalyst then initiates the precipitation and growth of graphite thereon. The formed graphite is then chemically or physically separated from unreacted (or non-irradiated) portions of the mixture and purified.

In accordance with various aspects of the present disclosure, high purity, highly crystalline synthetic flake graphite can also be produced using the following method. First, the biomass and/or carbonaceous feedstock is combined with the catalyst, to form a feedstock/catalyst mixture. Optionally, the mixture can then be ground, milled or pulverized. In some instances, the mixture can be ground, milled or pulverized or otherwise formed into a powder to provide better homogeneity. In some instances, the powder can comprise mesh size granules ranging from, for example, 500 U.S. mesh or lower to 3.5 U.S. mesh or higher. In some instances, the powder can comprise granules having diameters of about 2 mm or larger. In some instances, the powder can comprise granules having diameters of about 2.5 µm or smaller. In some instances, the mixture has a feedstock to catalyst ratio ranging from about 3:1 to about 4:1 by weight. In other instances, the mixture has a feedstock to catalyst ratio ranging from about 4:3 to about 4:1 by weight. In yet other instances, the mixture has a feedstock to catalyst ratio ranging from about 0.5:1 to about 10:1 by weight, alternatively from about 0.75:1 to about 9:1 by weight, alternatively from about 1:1 to about 8:1 by weight, alternatively from about 5:4 to about 7:1 by weight, alternatively from about 4:3 to about 6:1 by weight, alternatively from about 3:2 to about 5:1 by weight, and alternatively from about 2.5:1 to about 4.5:1 by weight. The feedstock/catalyst mixture is then compressed or otherwise processed (for example, by extrusion) into a solid form. The solid form can take any suitable size and substantially two-dimensional or three-dimensional regular or irregular shape. Non-limiting examples of two-dimensional solid form shapes are a board, a sheet, a plate, and a disc. Non-limiting examples of three-dimensional solid form shapes can be a pellet, a rod, a cylinder, a cuboid, a triangular prism, a pyramid, a sphere, and an ovoid.

The solid form of feedstock/catalyst mixture is then subjected to laser irradiation. The laser heats the solid form of feedstock/catalyst mixture, melting the catalyst and decomposing the feedstock into graphite precursors, such as polyaromatics, and the graphite precursors are absorbed onto the melted catalyst. The melted catalyst then initiates the precipitation and growth of graphite thereon. The formed graphite is then chemically or physically separated from unreacted (or non-irradiated) portions of the solid form and optionally purified. In some instances the laser can be immobile and the solid form can be rotated or translated along an axis (or one or more axes) thereof and/or rastered relative to the laser. That is, the solid form (and any underlying thermally stable substrate if present) can be rotated around a first axis and/or moved along a second axis (preferably, orthogonal to the first axis) or one or more axes relative to the laser such that the laser irradiates one or more sides of the solid form from top to bottom in lines from side to side. In other instances, the solid form (and any underlying thermally stable substrate) is immobile and the laser is configured to move. In such instances, the laser moves to irradiate the solid form from side to side in lines from top to bottom. In other instances, the solid form (and any underlying thermally stable substrate) and the laser both move relative to one another, such as, for instance, the simultaneous translation (and or rotation) of the solid form and laser movement from side to side. Alternatively, the solid form, particularly if in a three-dimensional and/or powder form, can be made to pass through the laser light by pouring, blowing, pushing, pulling or other suitable method to cause its translation and or rotation.

In accordance with various aspects of the present disclosure, high purity, highly crystalline synthetic flake graphite can also be produced using the following method. First, the biomass and/or carbonaceous feedstock is combined with the catalyst, to form a feedstock/catalyst mixture. Optionally, the mixture can then be ground, milled or pulverized. In some instances, the mixture can be ground, milled or pulverized or otherwise formed into a powder to provide better homogeneity. The size of granules within the powder is not particularly limiting. The powder can range from very fine to very coarse. In some instances, the powder can comprise mesh size granules ranging from, for example, 500 U.S. mesh or lower to 3.5 U.S. mesh or higher. In some instances, the powder can comprise granules having diameters of about 2 mm or larger. In some instances, the powder can comprise granules having diameters of about 2.5 µm or smaller. In some instances, the mixture has a feedstock to catalyst ratio ranging from about 3:1 to about 4:1 by weight. In other instances, the mixture has a feedstock to catalyst ratio ranging from about 4:3 to about 4:1 by weight. In yet other instances, the mixture has a feedstock to catalyst ratio ranging from about 0.5:1 to about 10:1 by weight, alternatively from about 0.75:1 to about 9:1 by weight, alternatively from about 1:1 to about 8:1 by weight, alternatively from about 5:4 to about 7:1 by weight, alternatively from about 4:3 to about 6:1 by weight, alternatively from about 3:2 to about 5:1 by weight, and alternatively from about 2.5:1 to about 4.5:1 by weight.

The mixture is then formed into a sheet or layer on a thermally stable substrate. The mixture can be compressed on a thermally stable substrate to form a sheet or layer using any suitable means known in the art such as, for example, industrial sheet press or roller press assemblies. Alternatively, the mixture can be deposited on a thermally stable substrate to form a sheet or layer using any suitable means known in the art such as, for example, coating as a slurry, spraying or by extrusion.

The sheet or layer is then subjected to laser irradiation. While not being bound to any particular theory, it is believed that the laser heats the sheet or layer of feedstock/catalyst mixture, melting the catalyst and decomposing the feedstock into graphite precursors, such as polyaromatics, and the graphite precursors are absorbed onto the melted catalyst. The melted catalyst then initiates the precipitation and growth of graphite thereon. The formed graphite is then chemically or physically separated from unreacted (or non-irradiated) portions of the sheet or layer and optionally purified. In some instances the laser can be immobile and the sheet or layer can be rastered relative to the laser. That is, the sheet or layer (and any underlying thermally stable substrate) can be moved relative to the laser such that the laser irradiates the sheet or layer from side to side in lines from top to bottom. In other instances, the sheet or layer (and any underlying thermally stable substrate) is immobile and the laser is configured to move. In such instances, the laser moves to irradiate the immobile sheet or layer from side to side in lines from top to bottom. In other instances, the sheet or layer (and the underlying thermally stable substrate) and the laser both move relative to one another, such as, for instance, the simultaneous translation (and or rotation) of the sheet or layer and laser movement from side to side.

In accordance with various aspects of the present disclosure, high purity, highly crystalline synthetic flake graphite can also be produced using the following method. First, the biomass and/or carbonaceous feedstock is coated onto the catalyst, to form a sheet or layer of feedstock on the catalyst. Optionally, the carbonaceous material feedstock can be ground, milled or pulverized prior to coating. Optionally, the carbonaceous material feedstock can be ground, milled or pulverized into a powder prior to coating to provide better homogeneity. The catalyst can be any suitable size and substantially two-dimensional or three-dimensional regular or irregular shape. Non-limiting examples of two-dimensional solid form shapes are a board, a sheet, a plate, or a disc. Non-limiting examples of three-dimensional solid form shapes area pellet, a rod, a cylinder, a cuboid, a triangular prism, a pyramid, a sphere, and an ovoid. The feedstock can be deposited on the catalyst to form a sheet or layer using any suitable means known in the art such as, for example, coating as a slurry, spraying or by extrusion. Optionally, the feedstock-coated catalyst can be compressed to compress the feedstock, forming the feedstock into a compressed sheet or layer on the catalyst. Compression of the feedstock-coated catalyst can be accomplished using any suitable means known in the art such as, for example, an industrial sheet press or a roller press assembly.

The feedstock-coated catalyst is then subjected to laser irradiation. While not being bound to any particular theory, it is believed that the laser heats the feedstock-coated catalyst, melts the surface of the catalyst and decomposes the feedstock into graphite precursors, such as polyaromatics, and the graphite precursors are absorbed onto a surface of the melted catalyst. The surface of the melted catalyst onto which the graphite precursors are absorbed then initiates the precipitation and growth of graphite thereon. The formed graphite is then chemically or physically separated from unreacted (or non-irradiated) portions of the feedstock sheet or layer and optionally purified. In some instances, the laser can be immobile and the feedstock-coated catalyst can be rastered relative to the laser. That is, the feedstock-coated catalyst (and any underlying thermally stable substrate) can be moved relative to the laser such that the laser irradiates the sheet or layer from side to side in lines from top to bottom. In other instances, the feedstock-coated catalyst (and any underlying thermally stable substrate) is immobile and the laser is configured to move. In such instances, the laser moves to irradiate the immobile feedstock-coated catalyst from side to side in lines from top to bottom. In other instances, the feedstock-coated catalyst (and the underlying thermally stable substrate) and the laser both move relative to one another, such as, for instance, the simultaneous translation (and/or rotation) of the feedstock-coated catalyst and laser movement from side to side.

In accordance with various aspects of the present disclosure, high purity, highly crystalline synthetic flake graphite can also be produced using the following method. First, the biomass and/or carbonaceous feedstock is combined with the catalyst, to form a feedstock/catalyst mixture. Optionally, the mixture can be ground, milled or pulverized. Optionally, the mixture can be ground, milled or pulverized into a powder to provide better homogeneity. The size of granules within the powder is not particularly limiting. The powder can range from very fine to very coarse. In some instances, the powder can comprise mesh size granules ranging from, for example, 500 U.S. mesh or lower to 3.5 U.S. mesh or higher. In some instances, the powder can comprise granules having diameters of about 2 mm or larger. In some instances, the powder can comprise granules having diameters of about 2.5 µm or smaller. In some instances, the mixture has a feedstock to catalyst ratio ranging from about 3:1 to about 4:1 by weight. In other instances, the mixture has a feedstock to catalyst ratio ranging from about 4:3 to about 4:1 by weight. In yet other instances, the mixture has a feedstock to catalyst ratio ranging from about 0.5:1 to about 10:1 by weight, alternatively from about 0.75:1 to about 9:1 by weight, alternatively from about 1:1 to about 8:1 by weight, alternatively from about 5:4 to about 7:1 by weight, alternatively from about 4:3 to about 6:1 by weight, alternatively from about 3:2 to about 5:1 by weight, and alternatively from about 2.5:1 to about 4.5:1 by weight.

The feedstock/catalyst mixture is then subjected to pyrolysis (e.g., slow or fast pyrolysis) to convert the mixture to a catalyst-containing char, pyrolysis-oil and pyrolysis-gas (syngas). Pyrolysis can be performed at a temperature ranging from about 200 to about 1500° C., alternatively from about 200 to about 1200° C., alternatively from about 250 to about 1000° C., and alternatively about 400 to about 1000° C. The pyrolysis-oil and pyrolysis-gas are then removed as waste or saved for use in other applications. The catalyst-containing char is then subjected to laser irradiation. While not being bound to any particular theory, it is believed that the laser heats the catalyst-containing char to a molten state, decomposing carbon-containing constituents of the catalyst-containing char into graphite precursors, such as polyaromatics, and the graphite precursors are absorbed onto the melted catalyst. It is further believed that the melted catalyst then initiates the precipitation and growth of graphite thereon. The formed graphite is then chemically or physically separated from unreacted (or non-irradiated) portions of the biochar and optionally purified.

In accordance with various aspects of the present disclosure, high purity, highly crystalline synthetic flake graphite can also be produced using the following method. First, the biomass and/or carbonaceous feedstock is combined with the catalyst, to form a feedstock/catalyst mixture. Optionally, the mixture can be ground, milled or pulverized. Optionally, the mixture can be ground, milled or pulverized into a powder to provide better homogeneity. The size of granules within the powder is not particularly limiting. The powder can range from very fine to very coarse. In some instances, the powder can comprise mesh size granules ranging from, for example, 500 U.S. mesh or lower to 3.5 U.S. mesh or higher. In some instances, the powder can comprise granules having diameters of about 2 mm or larger. In some instances, the powder can comprise granules having diameters of about 2.5 μm or smaller. In some instances, the mixture has a feedstock to catalyst ratio ranging from about 3:1 to about 4:1 by weight. In other instances, the powder has a feedstock to catalyst ratio ranging from about 4:3 to about 4:1 by weight. In yet other instances, the mixture has a feedstock to catalyst ratio ranging from about 0.5:1 to about 10:1 by weight, alternatively from about 0.75:1 to about 9:1 by weight, alternatively from about 1:1 to about 8:1 by weight, alternatively from about 5:4 to about 7:1 by weight, alternatively from about 4:3 to about 6:1 by weight, alternatively from about 3:2 to about 5:1 by weight, and alternatively from about 2.5:1 to about 4.5:1 by weight.

The feedstock/catalyst mixture is then compressed or otherwise processed (for example, by extrusion) into a solid form. The solid form can take any suitable size and substantially two-dimensional or three-dimensional regular or irregular shape. Non-limiting examples of two-dimensional solid form shapes can be a board, a sheet, a plate, and a disc. Non-limiting examples of three-dimensional solid form shapes can be a pellet, a rod, a cylinder, a cuboid, a triangular prism, a pyramid, a sphere, and an ovoid. The solid form is then subjected to pyrolysis (e.g., slow or fast pyrolysis) to convert the solid form to a catalyst-containing char, pyrolysis-oil and pyrolysis-gas. Pyrolysis can be performed at a temperature ranging from about 200 to about 1500° C., alternatively from about 200 to about 1200° C., alternatively from about 250 to about 1000° C., and alternatively about 400 to about 1000° C. The pyrolysis-oil and pyrolysis-gas are then removed as waste or saved for use in other applications. The catalyst-containing char is then subjected to laser irradiation. While not being bound to any particular theory, it is believed that the laser heats the catalyst-containing char to a molten state, decomposing carbon-containing constituents of the catalyst-containing char into graphite precursors, such as polyaromatics, and the graphite precursors are absorbed onto the melted catalyst. It is further believed that the melted catalyst then initiates the precipitation and growth of graphite thereon. The formed graphite is then chemically or physically separated from unreacted (or non-irradiated) portions of the char and optionally purified. In some instances the laser can be immobile and the catalyst-containing char can be rotated or translated along an axis thereof and/or rastered relative to the laser. That is, the char (and any underlying thermally stable substrate) can be rotated around a first axis and/or moved along a second axis (preferably, orthogonal to the first axis) relative to the laser such that the laser irradiates one or more sides of the char from top to bottom in lines from side to side. In other instances, the char (and any underlying thermally stable substrate) is immobile and the laser is configured to move. In such instances, the laser moves to irradiate the immobile char from side to side in lines from top to bottom. Alternatively, the char, particularly if in a three-dimensional or powder form, can be made to pass through the laser light by pouring, blowing, pushing or other suitable method to cause its translation and or rotation.

In accordance with various aspects of the present disclosure, high purity, highly crystalline synthetic flake graphite can also be produced using the following method. First, the biomass and/or carbonaceous feedstock is combined with the catalyst, to form a feedstock/catalyst mixture. Optionally, the mixture can be ground, milled or pulverized. Optionally, the mixture can be ground, milled or pulverized into a powder to provide better homogeneity. The size of granules within the powder is not particularly limiting. The powder can range from very fine to very coarse. In some instances, the powder can comprise mesh size granules ranging from, for example, 500 U.S. mesh or lower to 3.5 U.S. mesh or higher. In some instances, the powder can comprise granules having diameters of about 2 mm or larger. In some instances, the powder can comprise granules having diameters of about 2.5 μm or smaller. In some instances, the mixture has a feedstock to catalyst ratio ranging from about 3:1 to about 4:1 by weight. In other instances, the mixture has a feedstock to catalyst ratio ranging from about 4:3 to about 4:1 by weight. In yet other instances, the mixture has a feedstock to catalyst ratio ranging from about 0.5:1 to about 10:1 by weight, alternatively from about 0.75:1 to about 9:1 by weight, alternatively from about 1:1 to about 8:1 by weight, alternatively from about 5:4 to about 7:1 by weight, alternatively from about 4:3 to about 6:1 by weight, alternatively from about 3:2 to about 5:1 by weight, and alternatively from about 2.5:1 to about 4.5:1 by weight.

The feedstock/catalyst mixture is then formed into a sheet or layer on a thermally stable substrate. The mixture can be compressed on the thermally stable substrate to form a sheet or layer using any suitable means known in the art such as, for example, an industrial sheet press or a roller press assembly. Alternatively, the mixture can be deposited on the thermally stable substrate to form a sheet or layer using any suitable means known in the art such as, for example, coating as a slurry, spraying or by extrusion. The sheet or layer is then subjected to pyrolysis (e.g., slow or fast pyrolysis) to convert the mixture to a catalyst-containing char, pyrolysis-oil and pyrolysis-gas. Pyrolysis can be performed at a temperature ranging from about 200 to about 1500° C., alternatively from about 200 to about 1200° C., alternatively from about 250 to about 1000° C., and alternatively about 400 to about 1000° C. The pyrolysis-oil and pyrolysis-gas are then removed as waste or saved for use in other applications. The sheet or layer, now comprising catalyst-containing char, is then subjected to laser irradiation. While not being bound to any particular theory, it is believed that the laser heats the catalyst-containing char to a molten state, decomposing carbon-containing constituents of the catalyst-containing char into graphite precursors, such as polyaromatics, and the graphite precursors are absorbed onto the melted catalyst. It is further believed that the melted catalyst then initiates the precipitation and growth of graphite thereon. The formed graphite is then chemically or physically separated from unreacted (or non-irradiated) portions of the sheet or layer and optionally purified. In some instances the laser can be immobile and the sheet or layer can be rastered relative to the laser. That is, the sheet or layer (and the underlying thermally stable substrate) can be moved relative to the laser such that the laser irradiates the sheet or layer from side to side in lines from top to bottom. In other instances, the sheet or layer (and the underlying thermally stable substrate) is immobile and the laser is configured to move. In such instances, the laser moves to irradiate the immobile compressed sheet or layer from side to side in lines from top to bottom. Alternatively, the char can be removed from the substrate by using any suitable means known to one of ordinary skill in the art such as, for example, doctor blade or air knife, and made to pass through the laser light by pouring, blowing, pushing or other suitable method to cause its translation and or rotation.

In accordance with various aspects of the present disclosure, high purity, highly crystalline synthetic flake graphite can also be produced using the following method. First, the biomass and/or carbonaceous feedstock is coated onto the catalyst, to form a sheet or layer of feedstock on the catalyst. Optionally, the feedstock can be ground, milled or pulverized. Optionally, the feedstock can be ground, milled or pulverized into a powder prior to coating to provide better homogeneity. The size of granules within the powder is not particularly limiting. The powder can range from very fine to very coarse. The catalyst can be any suitable size and substantially two-dimensional or three-dimensional regular or irregular shape. Non-limiting examples of two-dimensional solid form shapes can be a board, a sheet, a plate, and a disc. Non-limiting examples of three-dimensional solid form shapes can be a pellet, a rod, a cylinder, a cuboid, a triangular prism, a pyramid, a sphere, and an ovoid. A sheet or layer of the feedstock can be deposited on the catalyst using any suitable means known in the art such as, for example, coating as a slurry, spraying or by extrusion. Optionally, the feedstock-coated catalyst can be compressed to compress the feedstock, forming the feedstock into a compressed sheet or layer on the catalyst. Compression of the feedstock-coated catalyst can be accomplished using any suitable means known in the art such as, for example, an industrial sheet press or a roller press assembly.

The feedstock-coated catalyst is then subjected to pyrolysis (e.g., slow or fast pyrolysis) to convert the feedstock to a char layer on the catalyst, pyrolysis-oil and pyrolysis-gas. That is, the feedstock-coated catalyst is converted to a char-coated catalyst via pyrolysis. Pyrolysis can be performed at a temperature ranging from about 200 to about 1500° C., alternatively from about 200 to about 1200° C., alternatively from about 250 to about 1000° C., and alternatively about 400 to about 1000° C. The pyrolysis-oil and pyrolysis-gas are then removed as waste or saved for use in other applications. The char-coated catalyst is then subjected to laser irradiation. The laser heats the char-coated catalyst, melts the surface of the catalyst and decomposes the char into graphite precursors, such as polyaromatics, and the graphite precursors are absorbed onto the surface melted catalyst. The surface of the melted catalyst then initiates the precipitation and growth of graphite thereon. The formed graphite is then chemically or physically separated from unreacted (or non-irradiated) portions of the sheet or layer and optionally purified. In some instances the laser can be immobile and the char-coated catalyst can be rastered relative to the laser. That is, the char-coated catalyst (and any underlying thermally stable substrate) can be moved relative to the laser such that the laser irradiates the sheet or layer from side to side in lines from top to bottom. In other instances, the char-coated catalyst (and any underlying thermally stable substrate) is immobile and the laser is configured to move. In such instances, the laser moves to irradiate the immobile char-coated catalyst from side to side in lines from top to bottom. In other instances, the char-coated catalyst (and the underlying thermally stable substrate) and the laser both move relative to one another, such as, for instance, the simultaneous translation (and or rotation) of the sheet or layer and laser movement from side to side.

Sheet/layer or solid form formation of the feedstock, catalyst and/or feedstock/catalyst mixture, in accordance with various aspects of the present disclosure can be accomplished using and assembly known in the art using pressures ranging from about 100 pounds per square inch (psi) to about 150,000 psi or any arbitrary upper limit pressure, alternatively from about 1,000 to about 135,000 psi, from about 5,000 to about 120,000 psi, alternatively from about 5,000 to about 100,000 psi, alternatively from about 5,000 to about 90,000 psi, alternatively from about 10,000 to about 90,000 psi, and alternatively from about 20,000 to about 90,000 psi.

When laser irradiation is performed on a two-dimensional solid form such as a sheet or layer, rastering procedures in accordance with various aspects of the present disclosure can be performed any rate (unit of distance/unit of time) suitable for graphite formation. It will be readily appreciated that the rate of rastering will control the amount time any particular portion of the sheet or layer will be subjected to laser irradiation and that the amount of laser irradiation will affect the final graphite yield.

When laser irradiation is performed on a three dimensional solid form such as a pellet, rod, cylinder, a cuboid, a triangular prism, a pyramid, a sphere, and an ovoid, rotation and rastering procedures in accordance with various aspects of the present disclosure can be performed any rates (unit of distance/unit of time) suitable for graphite formation. It will be readily appreciated that the rates of rotation and rastering will control the amount time any particular portion of the solid form will be subjected to laser irradiation and that the amount of laser irradiation will affect the final graphite yield.

As discussed above in accordance with various aspects of the present disclosure, the formed graphite is chemically or physically separated from unreacted (or non-irradiated) portions of the powder of char and optionally purified. Such processes include, but are not limited to sieving, abrasion, magnetic separation, floatation, milling, oxidation with $HNO_3$, washing with HCl followed by heating in air, or any combination of the foregoing. To ensure no metal precipitates (for example, precipitates of the metal catalyst) remain in the final product, a wash with an acidic solution (for example, 1 M HCl) can be performed followed by $H_2O$ neutralization.

The energy content in the pyrolysis-oil and pyrolysis-gas produced by one or more of the above methods would be more than sufficient to meet the energy requirements of the pyrolysis-oil, pyrolysis-gas and graphite production and, in all probability, excess pyrolysis-oil and pyrolysis-gas would be produced as co-products. The process is carbon net negative when using biomass starting material, energy from net zero fuel (bio-oil and syngas) would be used to transform bio-mass grown from atmospheric $CO_2$ and sequestering it in a highly valuable and extremely stable material.

As discussed above, the biomass (or other carbonaceous material) feedstock for the production of the graphite (and co-produced pyrolysis-oil and pyrolysis-gas) can be from any number of inexpensive sources. Methods in accordance with various aspects of the present disclosure may be extremely economically competitive, producing graphite of such high quality that it is as pure and as highly ordered as natural and synthetic flake graphite, which can cost $10,000 to $30,000 per ton, but will cost a small fraction of that to produce. For instance, sawdust is valued at ~$40/ton. Using methods of the present disclosure, it would take 8 tons ($320) of sawdust to produce more than 1 ton of battery grade (or better) graphite. This is less than the price of the feedstock required for synthetic graphite (~1 ton calcined needle petcoke at ~$450-500/ton+~¼ ton pitch at ~$400/ton for each ton graphite produced), and the methods of the present disclosure do not carry the high energy expense and long reaction time of current synthetic graphite production. Using alternative carbonaceous feedstocks, such as lignite ($20/ton), or municipal or other waste, may further reduce the price. Assuming transportation, depreciation, labor and other miscellaneous expenses are similar to those of current synthetic graphite, graphite made by the methods disclosed herein is considerably cheaper to produce and deliver to end users.

EXAMPLES

In the Examples below, a Firestar t60 (Synrad Inc.) $CO_2$ laser and RF-600 power supply were used for the conversion of biomass to crystalline flake graphite. Powder X-ray diffraction (PXRD) data was obtained using a Rigaku Miniflex+ diffractometer with Cu Kα radiation. Raman spectra were acquired with a Horiba LabRAM HR Evolution Raman microscope equipped with a 532 nm wavelength diode laser. Transmission electron microscopy (TEM) micrographs were obtained using a Talos 200X (FEI) transmission electron microscope and elemental analysis was obtained in STEM operational mode with its Super-X Energy Dispersive Spectroscopy (EDS) detector. Scanning electron microscopy (SEM) micrographs were obtained using a Teneo LV scanning electron microscope (FEI) with its in-lens secondary electron detector and elemental analysis performed with its EDS detector (EDAX) using 20 kV accelerating voltage. Surface area was determined using the BET method from nitrogen adsorption isotherms obtained with a Tri-Star 3000 (Micrometrics). One of the three sample measurement ports of the Tri-Star was equipped with an empty sample tube with which the saturation vapor pressure ($P_0$) of $N_2$ was measured concurrently with each measurement of the equilibrium vapor pressure (P) over the sample. Isotherm adsorption data was recorded from 0.05 to 0.3 $P_0/P$.

Electrode Preparation. Anodes were prepared by mixing 90-180 mg of graphite product material with 4-10 mg of carbon black (Super C45, TIMCAL America Inc.), 40-100 µL of ethanol (200 proof, Pharmco-Aaper) and 100-400 µL of 2.5-5% Li-polyacrylate binder solution prepared by dissolving poly(acrylic acid) (1000 kDa, Polysciences) in deionized water and neutralizing with LiOH (95%, Strem). Mixing was performed with a ball mill (Pulverisette 23 MiniMill, Fritsch GmbH) using a stainless steel cup (10 mL) and six stainless steel balls (5 mm diameter) at 50 Hz for 15 min to form a slurry. The slurry was cast onto copper foil (0.127 mm, 99.9%, Alfa Aesar) and dried under vacuum at 150° C. for 2 h. Round electrodes (16 mm diameter) were cut from the resulting sheet using a die cutting press (MSK-T-07 Precision Disc Cutter, MTI Inc.). The areal mass of the electrodes were 1-3 mg/cm².

Electrochemical Testing. Coin cells (CR2016, MTI Inc.) containing active material and Li metal (99.9%, MTI Inc.) electrodes separated by a polypropylene porous membrane (Celgard 3401) and 1 M $LiPF_6$ in EC:DMC (ethylene carbonate:dimethyl carbonate, 1:1 v/v) mixture (battery grade, <15 ppm $H_2O$ content, Sigma Aldrich) with 10% FEC (fluoroethylene carbonate, >99%, Solvay) by volume electrolyte were assembled in an Ar filled dry box (<0.1 ppm $O_2$ and $H_2O$). Galvanostatic cycling was performed using an Arbin BT-2000. Cells were cycled at constant current between open circuit voltage to a cutoff potential ranging from 5 mV to 20 mV then under reverse current to 1.5 V vs. $Li/Li^+$. The cells were rested for 15 min between discharge and charge.

Thermogravimetric Analysis (TGA). TGA was performed with a Perkin Elmer Pyris 1 TGA. The thermograms obtained from samples produced in the examples below were found to have nearly identical weight loss onset temperature as high-grade synthetic graphite and 100% weight loss in all cases, indicating extremely high (near 100%) purity.

Ashing. Porcelain crucibles and lids (23 mL, Fisher) were heated in air at 900° C. for 5 h, rinsed with deionized water and dried at 120° C. for 1 hour, then stored in a desiccator too cool to room temperature prior to performing any experiments. All weight measurements were performed on an Ohaus Analytical Plus 250D (rated precision of 0.02 mg, and linearity of 0.03 mg). Measurement precision was determined to be 0.03 mg by calculating the standard deviation of the mass of a 20 mg standard measured 10 times in a room temperature, dry tared crucible, allowing for the balance to return to 0.00000 g following each measurement. Mass reproducibility was determined to be within the measured precision by recording the mass of empty crucibles before and after heating at a ramp rate of 10°/min to 900° C., holding at that temperature for 5 h, removing from the furnace and cooling to room temperature in a desiccator.

For each ash determination, graphite (300 mg) was loaded into a room temperature, dry, pre-weighed crucible and its mass determined. The crucible was then equipped with a lid and placed in a muffle furnace (Barnstead Thermolyne 1500), heated at a ramp rate of 10° C./min to 900° C., held at that temperature for 5 h, removed and cooled to room temperature in a desiccator prior to measuring its final mass. Sample ash content was determined as the difference between the mass of the crucible prior to and after the heating procedure. The ashing experiments showed that samples produced in the Examples below had purities of 99.9% or greater.

Elemental Analysis. C, H, and N (PerkinElmer 2400 Series II CHNS/O Analyzer) and O (Thermo Finnigan FlashEA™ Elemental Analyzer) analysis of biochar was performed by Galbraith Laboratories, Inc. Full scan trace impurity elemental analysis of graphite was performed using Glow Discharge Mass Spectrometry (GDMS) by EAG Laboratories.

Example 1

Microcrystalline cellulose (8 g, Avicel PH-105 NF, FMC BioPolymer) and Ni powder (2 g, 99.5% 100 mesh, Strem) were loaded into a hardened steel cup (80 mL, Fritsch GmbH) with ten balls (1 cm diameter) at 300 rpm for 30 min using a planetary mill (Pulverisette 6, Fritsch GmbH). The resulting powder was divided evenly and pressed at 5 tons of force into two 20 mm diameter pellets (10.8 mm thick) and a ¼" hole drilled in their center with a drill press, resulting in a final mass of 3.8 g per pellet. The pellets were then heated under $N_2$ gas (30 mL/min) from room temperature to 400° C. at a 10° C./min ramp rate and held for a total heating time of 30 min, during which time pyrolysis-oil and pyrolysis-gas was evolved and the pellet mass was reduced to 1.45 g. After cooling, the charred pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and maintained at 0.5 torr with flowing He.

The pellets were then irradiated through an anti-reflective coated ZnSe window (Design Research Optics) by a 2 mm diameter 10.4 μm laser beam (Firestar t60, Synrad Inc., 95% power) while rotating at 1.2 rev/min for one full rotation. The surface of the pellets exposed to the laser was removed by gentle abrasion and the resulting powder was ground in a tempered steel cup (80 mL) with ten balls (1 cm diameter) at 100 rpm for 5 min.

The ground powder was then purified by oxidation with $HNO_3$ or washing with HCl followed by heating in air. The raw product (400 mg) was dispersed in 40 mL of either concentrated $HNO_3$ or a 50:50 v/v % concentrated HCl/water solution and ramped from room temperature to 190° C. in 10 min and held at 190° C. for an additional 20 min using a MARS 5 Digestion Microwave System (CEM Corp.). The solution was diluted with 300 mL of deionized water, the product was collected by vacuum filtration (1 micron polyester, GVS Life Sciences), and then repeatedly washed with deionized water until a neutral pH was obtained followed by 1 M NaOH wash and $H_2O$ neutralization. To ensure no metal precipitates remained in the product a wash with 10 v/v % HCl solution was performed followed by $H_2O$ neutralization. The final masses of the purified products after drying under vacuum were 104 mg and 160 mg for the $HNO_3$ and HCl treated material, respectively. The product treated with HCl was additionally oxidized in air at 450° C. for 2 hours with a final product mass of 110 mg.

Figure 2:
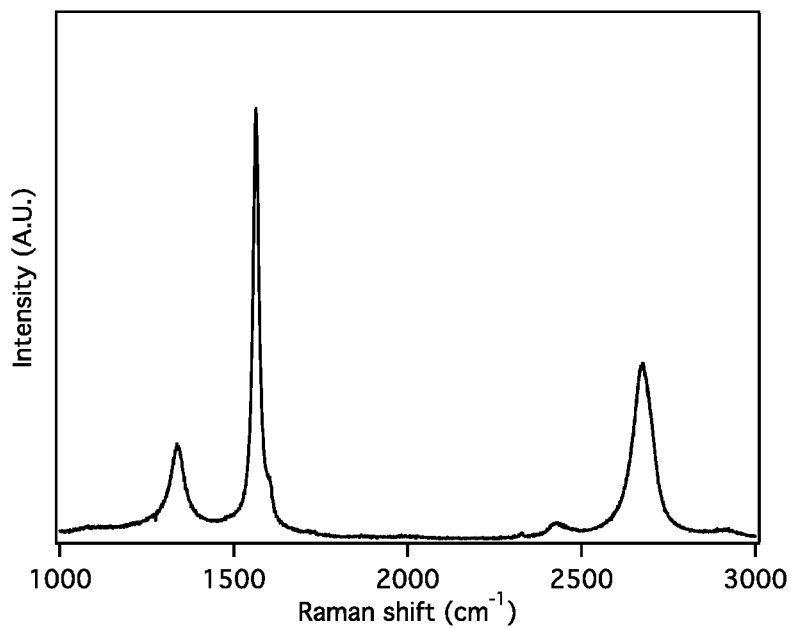
FIG. 2 is a Raman spectrum of graphite produced in Example 1.

FIG. 1 is a PXRD profile of graphite (d-spacing 0.3360 nm) produced in Example 1. As shown, the produced graphite exhibits reflections with corresponding Miller indices of (002), (100), (101), and (004) indicative of crystalline graphite. FIG. 2 is a Raman spectrum of graphite produced in Example 1. As shown, the graphite produced in Example 1 exhibits a D band at about 1350 $cm^{-1}$, which are present in all polyaromatic hydrocarbons, a G band at about 1580 $cm^{-1}$, indicative of the bond stretching of all pairs of $sp^2$ atoms (here carbon atoms), and a 2D band (sometimes referred to as a G' band) at about 2700 $cm^{-1}$ indicative of graphene stacking.

Figure 3:
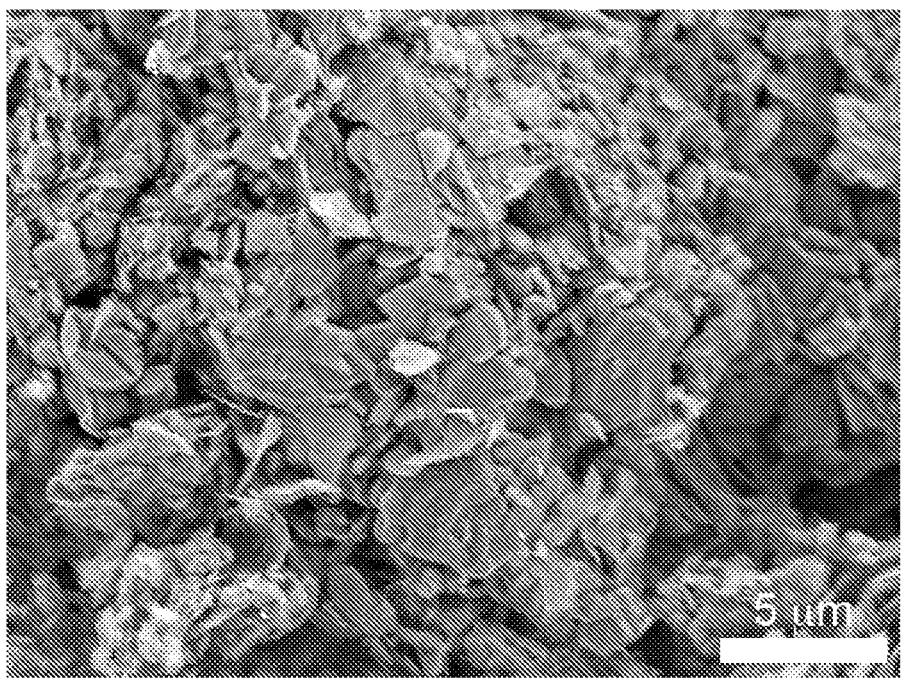
FIG. 3 is an scanning electron microscope (SEM) micrograph of the graphite produced in Example 1.
Figure 4:
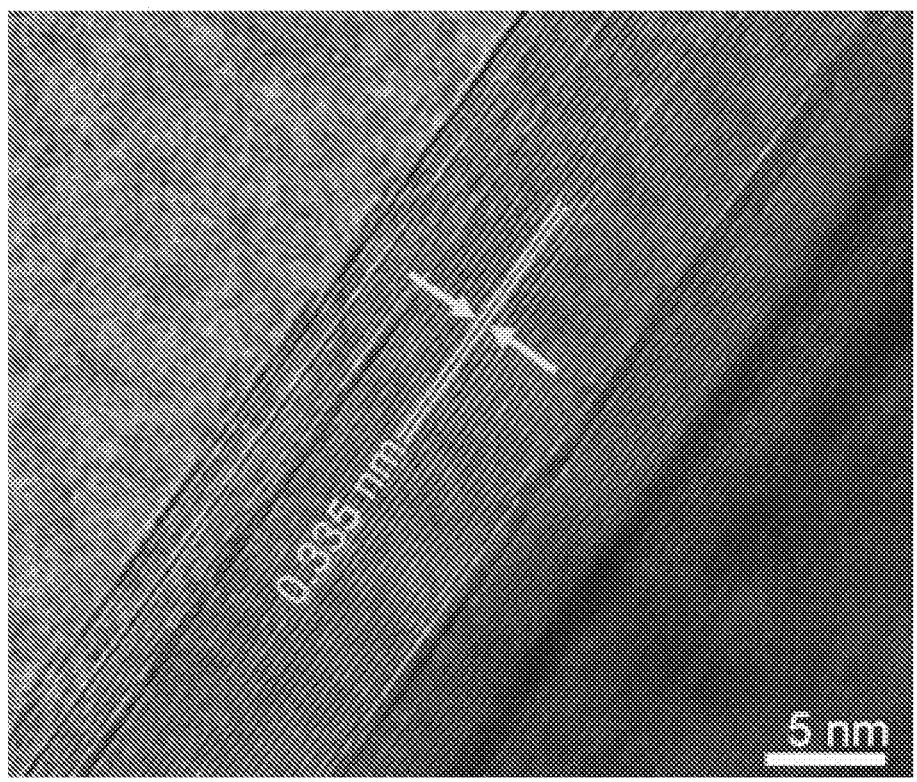
FIG. 4 is a transmission electron microscope (TEM) micrograph of the lattice of the graphite produced in Example 1.

FIG. 3 is an SEM micrograph of the graphite produced in Example 1. As can be seen, the morphology of the graphite produced can be physically described as flake in "potato" shaped agglomerates. FIG. 4 is a TEM micrograph of the lattice of the graphite produced in Example 1. As shown in FIG. 4, the spacing between individual graphene layers of the graphite is about 0.335 nm.

Figure 5:
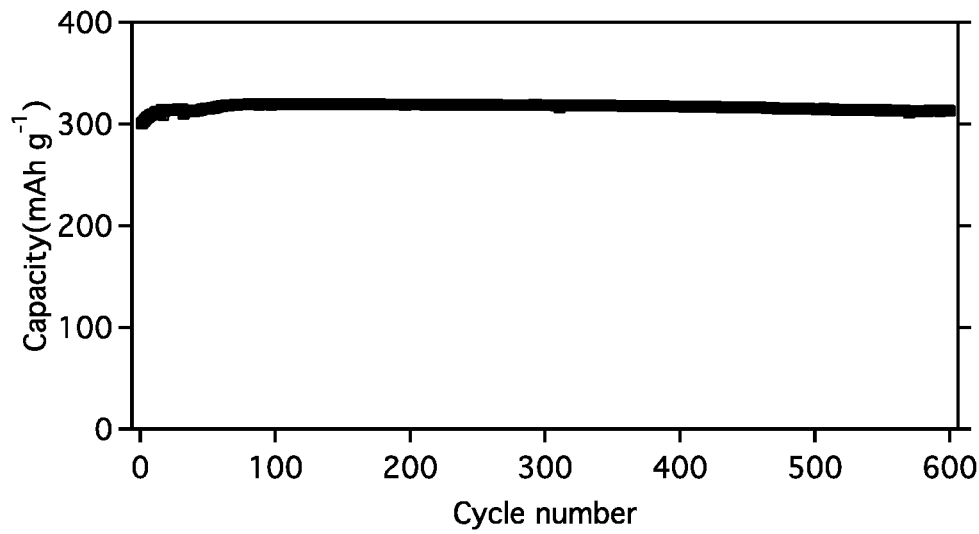
FIG. 5 is a graphical display of the charge capacity of graphite produced in Example 1 over multiple cycles, cycled at a C/4 constant current charge and discharge rate.
Figure 6:
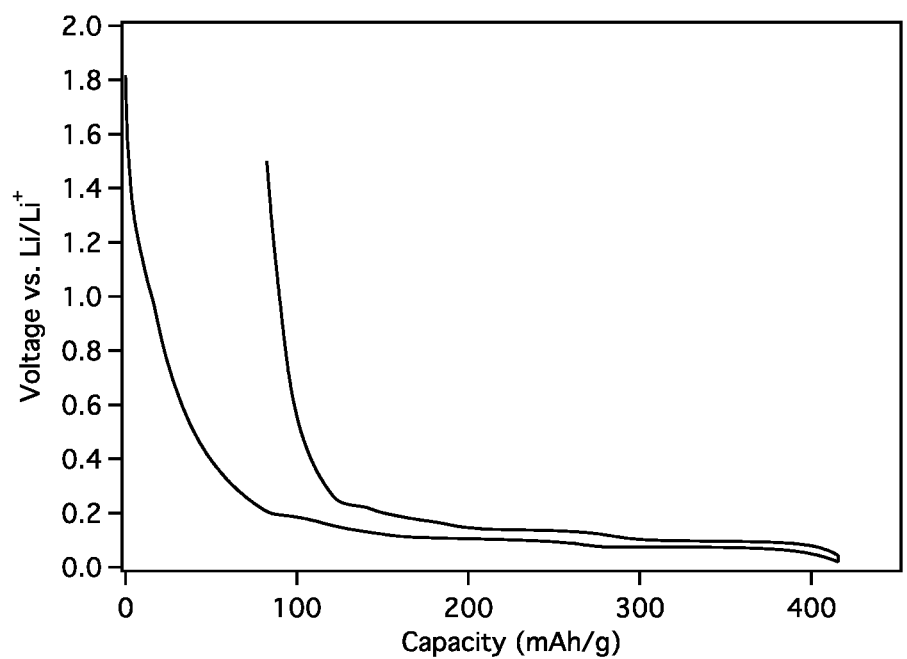
FIG. 6 is a graphical display of a first galvanostatic cycle of graphite produced from Example 1, cycled at a C/20 constant current charge and discharge rate.

FIG. 5 is a graphical display of the charge capacity of the graphite produced in Example 1 over multiple cycles, cycled at a C/4 (a charge rate in amps of one-fourth the overall capacity in amp-hours) constant current charge and discharge rate. As can be seen, the graphite holds a nearly constant charge capacity of about 310 mAh/g for over 600 cycles. FIG. 6 is a graphical display of a first galvanostatic cycle of the graphite produced from Example 1, cycled at a C/20 constant current charge and discharge rate, showing the low voltage plateaus typical of graphite lithiation staging.

Example 2

Microcrystalline cellulose (8 g, Avicel PH-105 NF, FMC BioPolymer) and −22 mesh Fe powder (2 g, 99.998%, Alfa product number 10621) were loaded into a hardened steel cup (80 mL, Fritsch GmbH) with ten balls (1 cm diameter) at 300 rpm for 30 min using a planetary mill (Pulverisette 6, Fritsch GmbH). The resulting powder was divided evenly and pressed at 5 tons of force into two 20 mm diameter pellets (10.8 mm thick) and a ¼" hole drilled in their center with a drill press. The pellets were then heated under $N_2$ gas (30 mL/min) from room temperature to 400° C. at a 10° C./min ramp rate and held for a total heating time of 30 min, during which time pyrolysis-oil and pyrolysis-gas was evolved and the pellet mass was reduced. After cooling, the charred pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and maintained at 0.5 torr with flowing He.

The pellets were then irradiated through an anti-reflective coated ZnSe window (Design Research Optics) by a 2 mm diameter 10.4 μm laser beam (Firestar t60, Synrad Inc., 95% power) while rotating at 1.2 rev/min for one full rotation. The surface of the pellets exposed to the laser was removed by gentle abrasion and the resulting powder was ground in a tempered steel cup (80 mL) with ten balls (1 cm diameter) at 100 rpm for 5 min.

The ground powder was then purified by oxidation with $HNO_3$. The raw product was dispersed in 40 mL of concentrated $HNO_3$ and ramped from room temperature to 190° C. in 10 min and held at 190° C. for an additional 20 min using a MARS 5 Digestion Microwave System (CEM Corp.). The solution was diluted with 300 mL of deionized water, the product was collected by vacuum filtration (1 micron polyester, GVS Life Sciences), and then repeatedly washed with deionized water until a neutral pH was obtained followed by 1 M NaOH wash and $H_2O$ neutralization. To ensure no metal precipitates remained in the product a wash with 10 v/v % HCl solution was performed followed by $H_2O$ neutralization.

Figure 7:
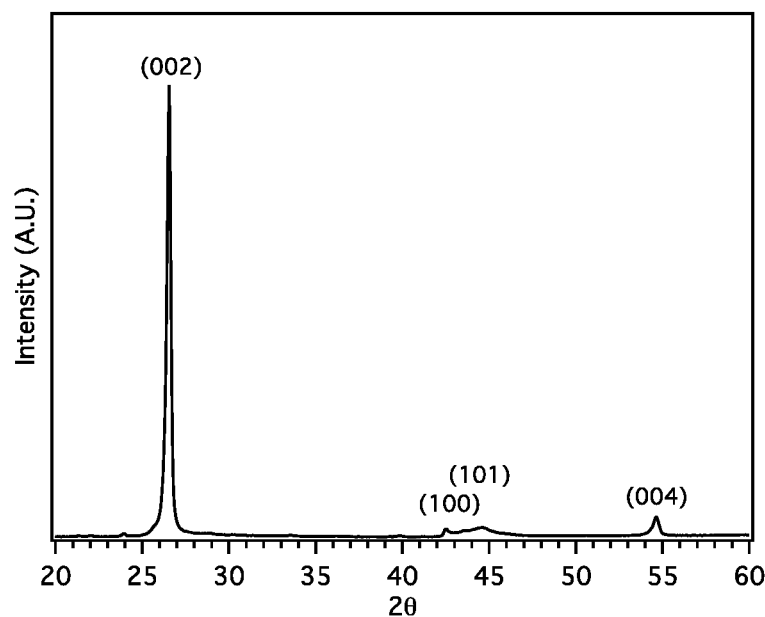
FIG. 7 is a PXRD profile of graphite (d-spacing 0.3356 nm) produced in Example 2.

FIG. 7 is a PXRD profile of graphite (d-spacing 0.3356 nm) produced in Example 2. As shown, the produced graphite exhibits reflections with corresponding Miller indices of (002), (100), (101), and (004) indicative of crystalline graphite.

Example 3

Microcrystalline cellulose (8 g, Avicel PH-105 NF, FMC BioPolymer) and Co powder (2 g, 99.8% 100 mesh, Strem) were loaded into a hardened steel cup (80 mL, Fritsch GmbH) with ten balls (1 cm diameter) at 300 rpm for 30 min using a planetary mill (Pulverisette 6, Fritsch GmbH). The resulting powder was divided evenly and pressed at 5 tons of force into two 20 mm diameter pellets (10.8 mm thick) and a ¼" hole drilled in their center with a drill press. The pellets were then heated under $N_2$ gas (30 mL/min) from room temperature to 400° C. at a 10° C./min ramp rate and held for a total heating time of 30 min. After cooling, the charred pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and maintained at 0.5 torr with flowing He.

The pellets were then irradiated through an anti-reflective coated ZnSe window (Design Research Optics) by a 2 mm diameter 10.4 μm laser beam (Firestar t60, Synrad Inc., 95% power) while rotating at 1.2 rev/min for one full rotation. The surface of the pellets exposed to the laser was removed by gentle abrasion and the resulting powder was ground in a tempered steel cup (80 mL) with ten balls (1 cm diameter) at 100 rpm for 5 min.

The ground powder was then purified by oxidation with $HNO_3$. The raw product was dispersed in 40 mL of concentrated $HNO_3$ and ramped from room temperature to 190° C. in 10 min and held at 190° C. for an additional 20 min using a MARS 5 Digestion Microwave System (CEM Corp.). The solution was diluted with 300 mL of deionized water, the product was collected by vacuum filtration (1 micron polyester, GVS Life Sciences), and then repeatedly washed with deionized water until a neutral pH was obtained followed by 1 M NaOH wash and $H_2O$ neutralization. To ensure no metal precipitates remained in the product a wash with 10 v/v % HCl solution was performed followed by $H_2O$ neutralization.

Figure 8:
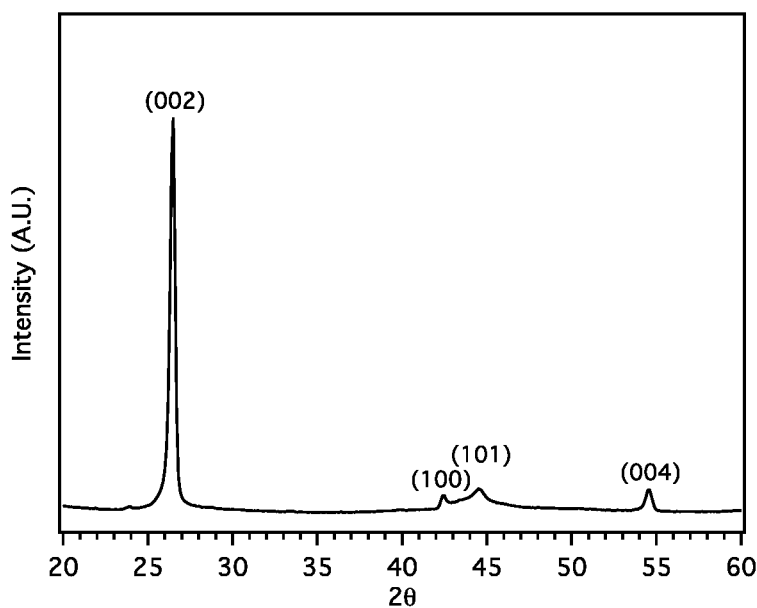
FIG. 8 is a PXRD profile of graphite (d-spacing 0.3360 nm) produced in Example 3.
Figure 9:
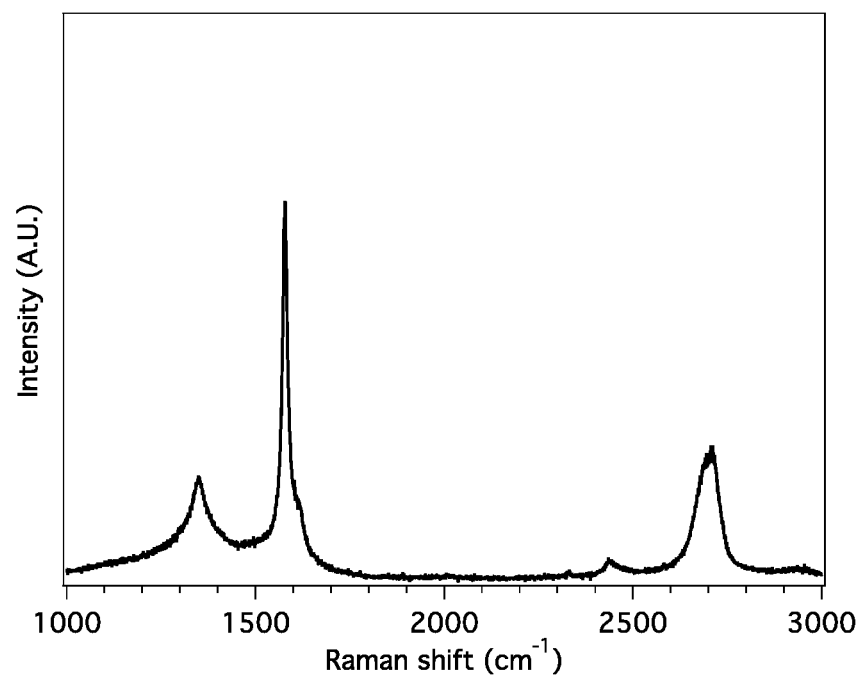
FIG. 9 is a Raman spectrum of graphite produced in Example 3.

FIG. 8 is a PXRD profile of graphite (d-spacing 0.3360 nm) produced in Example 3. As shown, the produced graphite exhibits reflections with corresponding Miller indices of (002), (100), (101), and (004) indicative of crystalline graphite. FIG. 9 is a Raman spectrum of graphite produced in Example 3. As shown, the graphite produced in Example 3 exhibits a D band at about 1350 $cm^{-1}$, a G band at about 1580 $cm^{-1}$ and a 2D band at about 2700 $cm^{-1}$.

Figure 10:
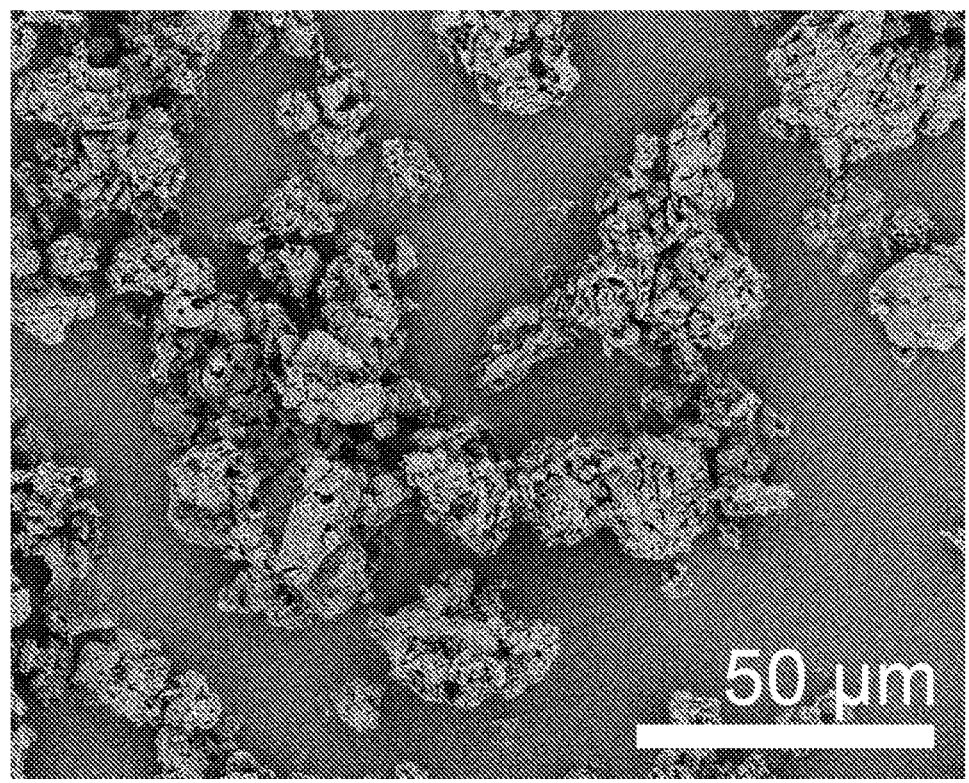
FIG. 10 is an SEM micrograph of graphite produced in Example 3.

FIG. 10 is an SEM micrograph of the graphite produced in Example 3. As can be seen, the morphology of the graphite produced can be physically described as flake in "potato" shaped agglomerates.

Figure 11:
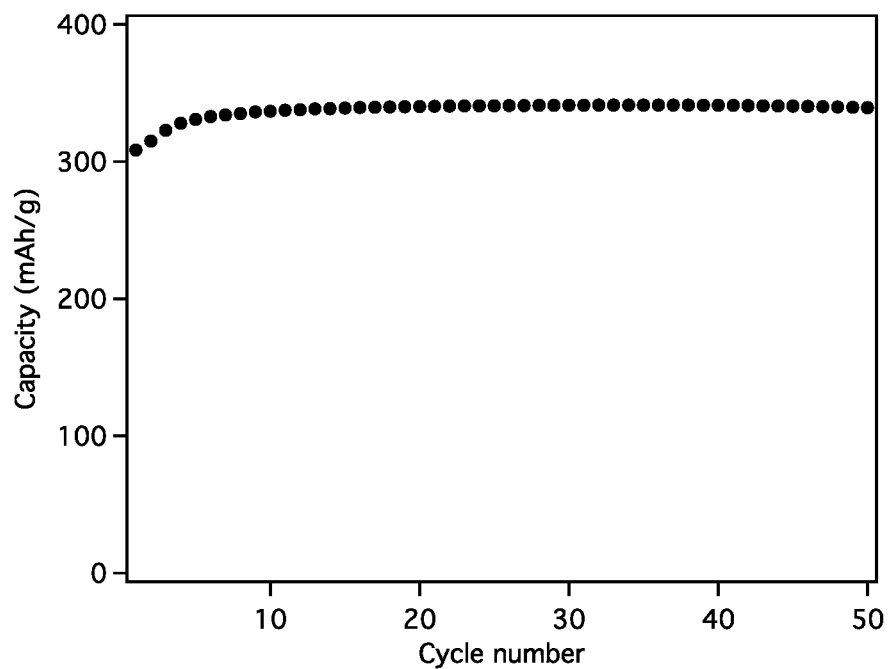
FIG. 11 is a graphical display of the charge capacity of graphite produced in Example 3 over multiple cycles, cycled at a C/4 constant current charge and discharge rate.

FIG. 11 is a graphical display of the charge capacity of the graphite produced in Example 3 over multiple cycles, cycled at a C/4 constant current charge and discharge rate. As can be seen, the graphite holds a nearly constant charge capacity of about 340 mAh/g for over 50 cycles.

Example 4

Microcrystalline cellulose (8 g, Avicel PH-105 NF, FMC BioPolymer) and Co powder (2 g, 99.8% 100 mesh, Strem) were loaded into a hardened steel cup (80 mL, Fritsch GmbH) with ten balls (1 cm diameter) at 300 rpm for 30 min using a planetary mill (Pulverisette 6, Fritsch GmbH). The resulting powder was divided evenly and pressed at 12 tons of force into two 20 mm diameter pellets (10.8 mm thick) and a ¼" hole drilled in their center with a drill press. The pellets were then heated under $N_2$ gas (30 mL/min) from room temperature to 400° C. at a 10° C./min ramp rate and held for a total heating time of 30 min. After cooling, the charred pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and maintained at 0.5 torr with flowing He.

The pellets were then irradiated through an anti-reflective coated ZnSe window (Design Research Optics) by a 2 mm diameter 10.4 μm laser beam (Firestar t60, Synrad Inc., 95% power) while rotating at 1.2 rev/min for one full rotation. The surface of the pellets exposed to the laser was removed by gentle abrasion and the resulting powder was ground in a tempered steel cup (80 mL) with ten balls (1 cm diameter) at 100 rpm for 5 min.

The ground powder was then purified by oxidation with $HNO_3$. The raw product was dispersed in 40 mL of concentrated $HNO_3$ and ramped from room temperature to 190° C. in 10 min and held at 190° C. for an additional 20 min using a MARS 5 Digestion Microwave System (CEM Corp.). The solution was diluted with 300 mL of deionized water, the product was collected by vacuum filtration (1 micron polyester, GVS Life Sciences), and then repeatedly washed with deionized water until a neutral pH was obtained followed by 1 M NaOH wash and $H_2O$ neutralization. To ensure no metal precipitates remained in the product a wash with 10 v/v % HCl solution was performed followed by $H_2O$ neutralization.

Figure 12:
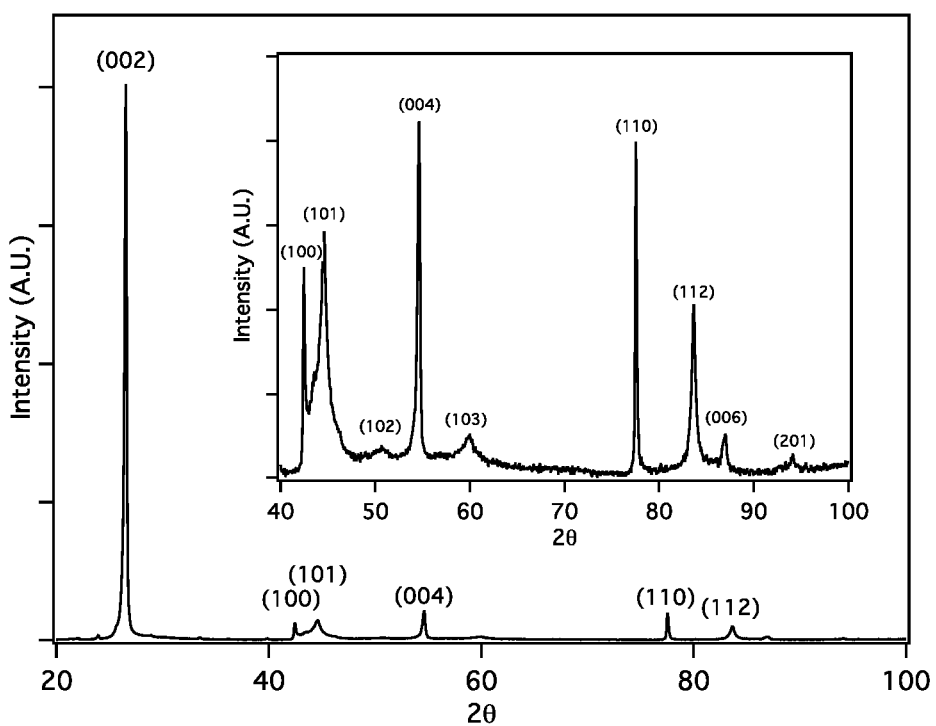
FIG. 12 is a PXRD profile of graphite (d-spacing 0.3355 nm) produced in Example 4.

FIG. 12 is a PXRD profile of graphite (d-spacing 0.3355 nm) produced in Example 4. The inset of FIG. 12 is an expanded view of the 40-100 degrees 2θ region of the profile to more clearly show low intensity reflections. As shown, the produced graphite exhibits reflections with corresponding Miller indices of (002), (100), (101), (004), (110), and (112) indicative of crystalline graphite. Additional reflections with Miller indices of (102), (103), (006) and (201) indicative of crystalline are shown in the inset.

Figure 13:
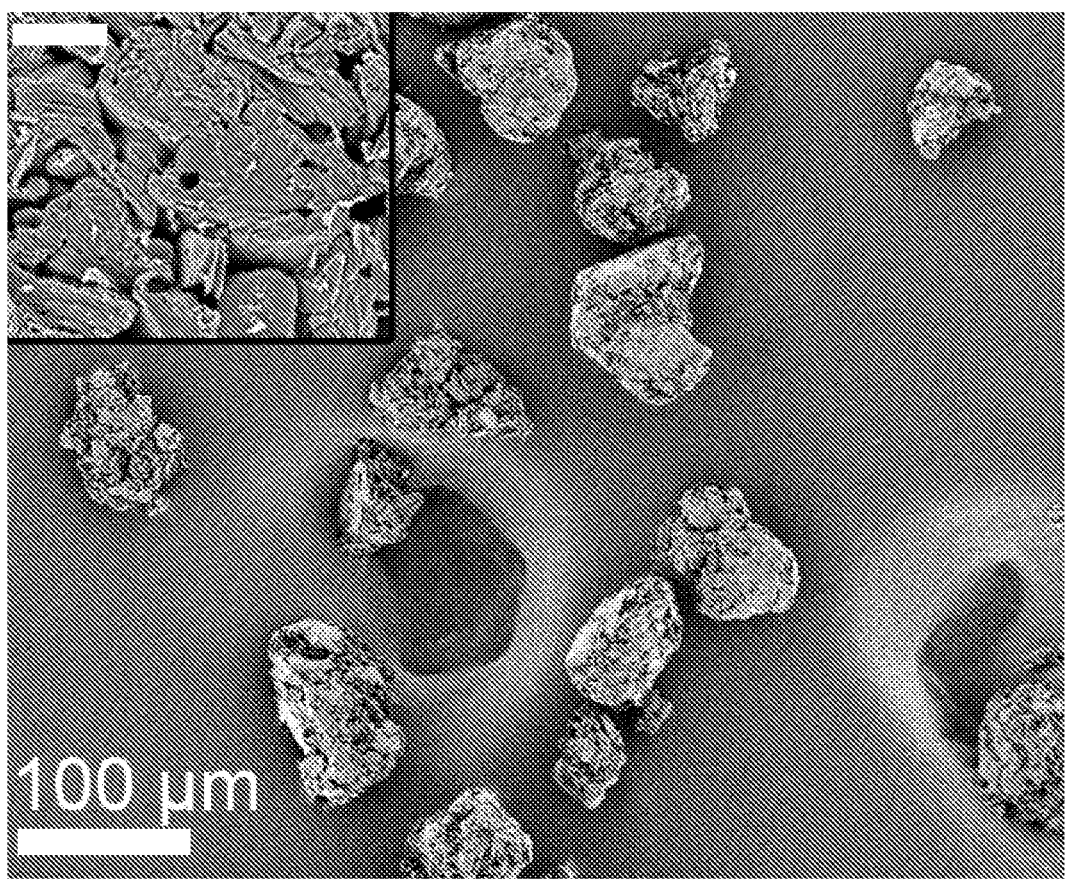
FIG. 13 is an SEM micrograph of the graphite produced in Example 4.

FIG. 13 is an SEM micrograph of the graphite produced in Example 4. The inset of FIG. 13 is a high magnification micrograph (1 micron scale bar). As can be seen, the graphite produced can be physically described as flake in potato shaped agglomerates with lengths ranging from about 50 to about 110 μm. The inset shows the high density of the potato structure.

Figure 14:
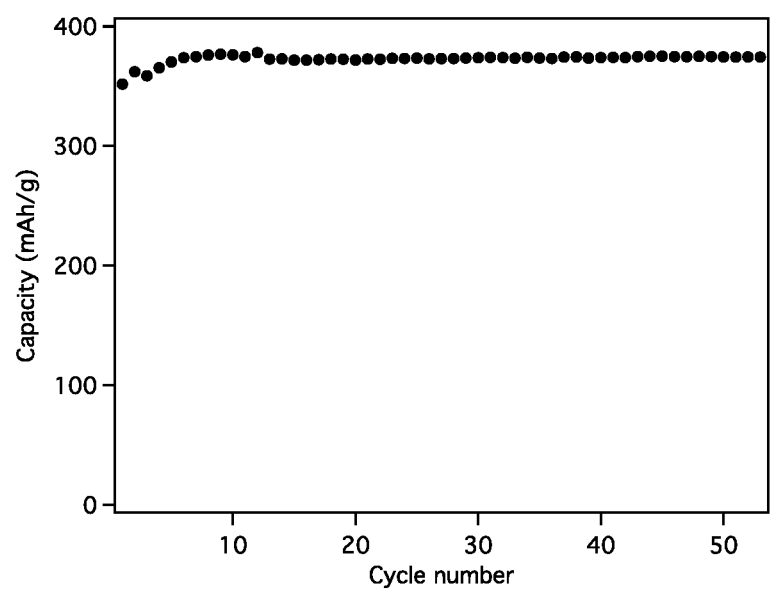
FIG. 14 is a graphical display of the charge capacity of graphite produced in Example 4 over multiple cycles, cycled at a C/2 constant current charge and discharge rate.

FIG. 14 is a graphical display of the charge capacity of the graphite produced in Example 4 over multiple cycles, cycled at a C/2 constant current charge and discharge rate. As can be seen, the graphite holds a nearly constant charge capacity of about 370 mAh/g for over 50 cycles.

Example 5

Wood flour sawdust (8 g, System Three Resin, Inc) and Co powder (2 g, 99.8% 100 mesh, Strem) were loaded into a hardened steel cup (80 mL, Fritsch GmbH) with ten balls (1 cm diameter) at 300 rpm for 30 min using a planetary mill (Pulverisette 6, Fritsch GmbH). The resulting powder was divided evenly and pressed at 12 tons of force into two 20 mm diameter pellets (10.8 mm) and a ¼" hole drilled in their center with a drill press, resulting in a final mass of 3.7 g per pellet. The pellets were then heated under $N_2$ gas (30 mL/min) from room temperature to 400° C. at a 10° C./min ramp rate and held for a total heating time of 30 min, during which time pyrolysis-oil and pyrolysis-gas was evolved and the pellet mass was reduced to 1.5 g. After cooling, the charred pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and maintained at 0.5 torr with flowing He. The pellets were then irradiated through an anti-reflective coated ZnSe window (Design Research Optics) by a 2 mm diameter 10.4 μm laser beam (Firestar t60, Synrad Inc., 95% power) while rotating at 1.2 rev/min for one full rotation. The pellets, in their entirety, were ground in a tempered steel cup (80 mL) with ten balls (1 cm diameter) at 100 rpm for 5 min. Purification was performed by oxidation with $HNO_3$. The raw product (400 mg) was dispersed in 40 mL of concentrated $HNO_3$ and ramped from room temperature to 190° C. in 10 min and held at 190° C. for an additional 20 min using a MARS 5 Digestion Microwave System (CEM Corp.). The solution was diluted with 300 mL of deionized water, the product was collected by vacuum filtration (1 micron polyester, GVS Life Sciences), and then repeatedly washed with deionized water until a neutral pH was obtained followed by 1 M NaOH wash and $H_2O$ neutralization. To ensure no metal precipitates remained in the product, a d powder was 21%.

Figure 15:
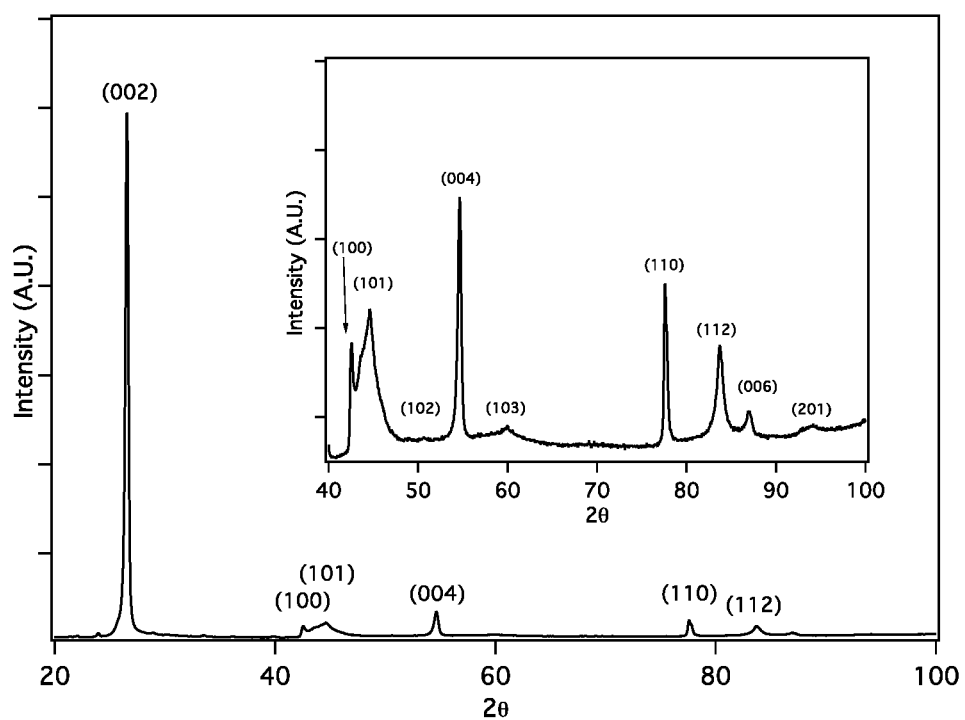
FIG. 15 is a PXRD profile of graphite (d-spacing 0.3356 nm) produced in Example 5.

FIG. 15 is a PXRD profile of graphite (d-spacing 0.3356 nm) produced in Example 5. The inset of FIG. 15 is an expanded view of the 40-100 degrees 2θ region of the profile to more clearly show low intensity reflections. As shown, the produced graphite exhibits reflections with corresponding Miller indices of (002), (100), (101), (004), (110), and (112) indicative of crystalline graphite. Additional reflections with Miller indices of (102), (103), (006) and (201) indicative of crystalline are shown in the inset.

Example 6

Alkaline lignin (8 g, TCI America) and Fe powder (2 g, −22 mesh, 99.998% Alfa Aesar) were loaded into a hardened steel cup (80 mL, Fritsch GmbH) with ten balls (1 cm diameter) at 300 rpm for 30 min using a planetary mill (Pulverisette 6, Fritsch GmbH). The resulting powder was divided evenly and pressed at 5 tons of force into two 20 mm diameter pellets (10.8 mm thick) and a ¼" hole drilled in their center with a drill press. The pellets were then heated under $N_2$ gas (30 mL/min) from room temperature to 600° C. at a 10° C./min ramp rate and held for a total heating time of 30 min. After cooling, the charred pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and maintained at 0.5 torr with flowing He.

The pellets were then irradiated through an anti-reflective coated ZnSe window (Design Research Optics) by a 2 mm diameter 10.4 μm laser beam (Firestar t60, Synrad Inc., 95% power) while rotating at 1.2 rev/min for one full rotation. The surface of the pellets exposed to the laser was removed by gentle abrasion and the resulting powder was ground in a tempered steel cup (80 mL) with ten balls (1 cm diameter) at 100 rpm for 5 min.

The ground powder was then purified by oxidation with $HNO_3$. The raw product was dispersed in 40 mL of concentrated $HNO_3$ and ramped from room temperature to 190° C. in 10 min and held at 190° C. for an additional 20 min using a MARS 5 Digestion Microwave System (CEM Corp.). The solution was diluted with 300 mL of deionized water, the product was collected by vacuum filtration (1 micron polyester, GVS Life Sciences), and then repeatedly washed with deionized water until a neutral pH was obtained followed by 1 M NaOH wash and $H_2O$ neutralization. To ensure no metal precipitates remained in the product a wash with 10 v/v % HCl solution was performed followed by $H_2O$ neutralization.

Figure 16:
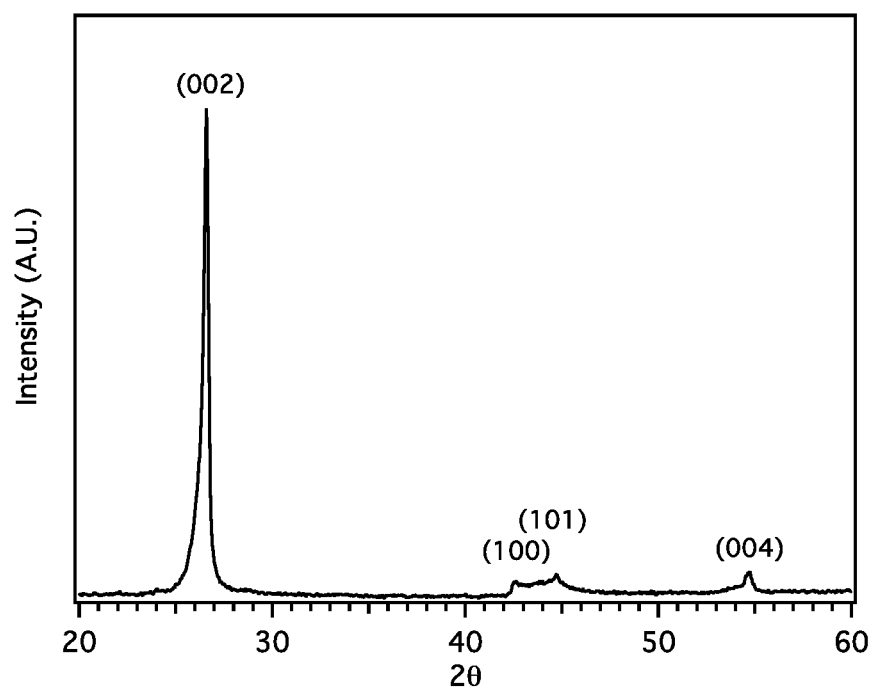
FIG. 16 is a PXRD profile of graphite (d-spacing 0.3359 nm) produced in Example 6.

FIG. 16 is a PXRD profile of graphite (d-spacing 0.3359 nm) produced in Example 6. As shown, the produced graphite exhibits reflections with corresponding Miller indices of (002), (100), (101) and (004) indicative of crystalline graphite.

Example 7

Corn cob (8 g, local grocer, dehydrated at 120° C. for 2 hours then finely ground with a blade equipped spice grinder) and Ni powder (2 g, 99.5% 100 mesh, Strem) were loaded into a hardened steel cup (80 mL, Fritsch GmbH) with ten balls (1 cm diameter) at 300 rpm for 30 min using a planetary mill (Pulverisette 6, Fritsch GmbH). The resulting powder was divided evenly and pressed at 5 tons of force into two 20 mm diameter pellets (10.8 mm thick) and a ¼" hole drilled in their center with a drill press. The pellets were then heated under $N_2$ gas (30 mL/min) from room temperature to 400° C. at a 10° C./min ramp rate and held for a total heating time of 30 min. After cooling, the charred pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and maintained at 0.5 torr with flowing He.

The pellets were then irradiated through an anti-reflective coated ZnSe window (Design Research Optics) by a 2 mm diameter 10.4 μm laser beam (Firestar t60, Synrad Inc., 95% power) while rotating at 1.2 rev/min for one full rotation. The surface of the pellets exposed to the laser was removed by gentle abrasion and the resulting powder was ground, in a tempered steel cup (80 mL) with ten balls (1 cm diameter) at 100 rpm for 5 min.

The ground powder was then purified by oxidation with $HNO_3$. The raw product was dispersed in 40 mL of concentrated $HNO_3$ and ramped from room temperature to 190° C. in 10 min and held at 190° C. for an additional 20 min using a MARS 5 Digestion Microwave System (CEM Corp.). The solution was diluted with 300 mL of deionized water, the product was collected by vacuum filtration (1 micron polyester, GVS Life Sciences), and then repeatedly washed with deionized water until a neutral pH was obtained followed by 1 M NaOH wash and $H_2O$ neutralization. To ensure no metal precipitates remained in the product a wash with 10 v/v % HCl solution was performed followed by $H_2O$ neutralization.

Figure 17:
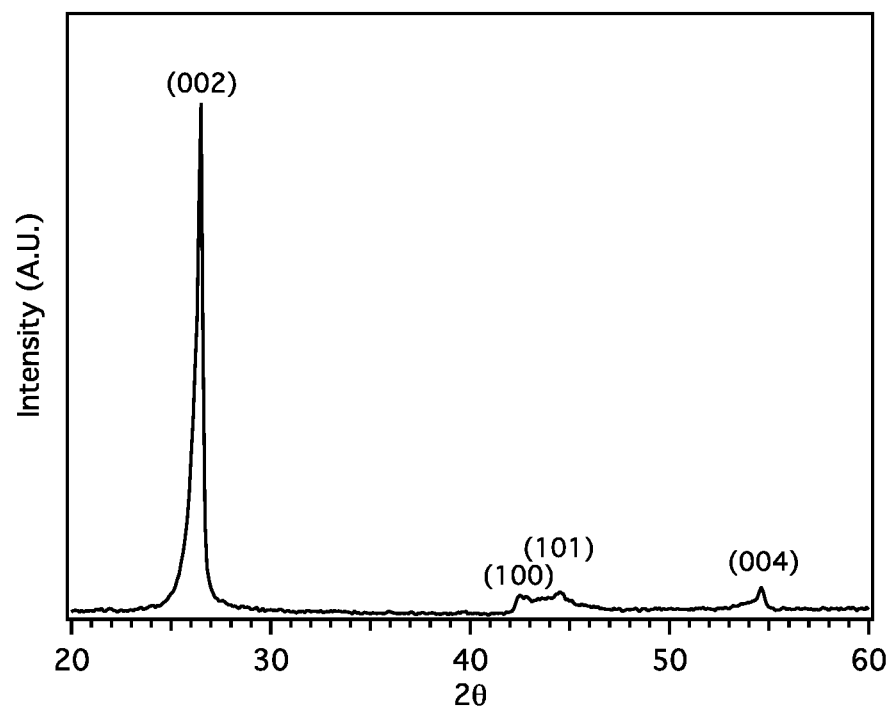
FIG. 17 is a PXRD profile of graphite (d-spacing 0.3362 nm) produced in Example 7.

FIG. 17 is a PXRD profile of graphite (d-spacing 0.3362 nm) produced in Example 7. As shown, the produced graphite exhibits reflections with corresponding Miller indices of (002), (100), (101), and (004) indicative of crystalline graphite.

Example 8

Microcrystalline cellulose (8 g, Avicel PH-105 NF, FMC BioPolymer) and uncoated steel spheres (2 g, 0.6 mm diameter, SuperMagneticMan.com product number SS006) were loaded into a hardened steel cup (80 mL, Fritsch GmbH) with ten balls (1 cm diameter) at 300 rpm for 30 min using a planetary mill (Pulverisette 6, Fritsch GmbH). The resulting powder was divided evenly and pressed at 5 tons of force into two 20 mm diameter pellets (10.8 mm thick) and a ¼" hole drilled in their center with a drill press. The pellets were then heated under $N_2$ gas (30 mL/min) from room temperature to 400° C. at a 10° C./min ramp rate and held for a total heating time of 30 min, during which time pyrolysis-oil and pyrolysis-gas was evolved and the pellet mass was reduced. After cooling, the charred pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and maintained at 0.5 torr with flowing He.

The pellets were then irradiated through an anti-reflective coated ZnSe window (Design Research Optics) by a 2 mm diameter 10.4 μm laser beam (Firestar t60, Synrad Inc., 95% power) while rotating at 1.2 rev/min for one full rotation. The surface of the pellets exposed to the laser was removed by gentle abrasion and the resulting powder was ground in a tempered steel cup (80 mL) with ten balls (1 cm diameter) at 100 rpm for 5 min.

The ground powder was then purified by oxidation with $HNO_3$. The raw product was dispersed in 40 mL of concentrated $HNO_3$ and ramped from room temperature to 190° C. in 10 min and held at 190° C. for an additional 20 min using a MARS 5 Digestion Microwave System (CEM Corp.). The solution was diluted with 300 mL of deionized water, the product was collected by vacuum filtration (1 micron polyester, GVS Life Sciences), and then repeatedly washed with deionized water until a neutral pH was obtained followed by 1 M NaOH wash and $H_2O$ neutralization. To ensure no metal precipitates remained in the product a wash with 10 v/v % HCl solution was performed followed by $H_2O$ neutralization.

Figure 18:
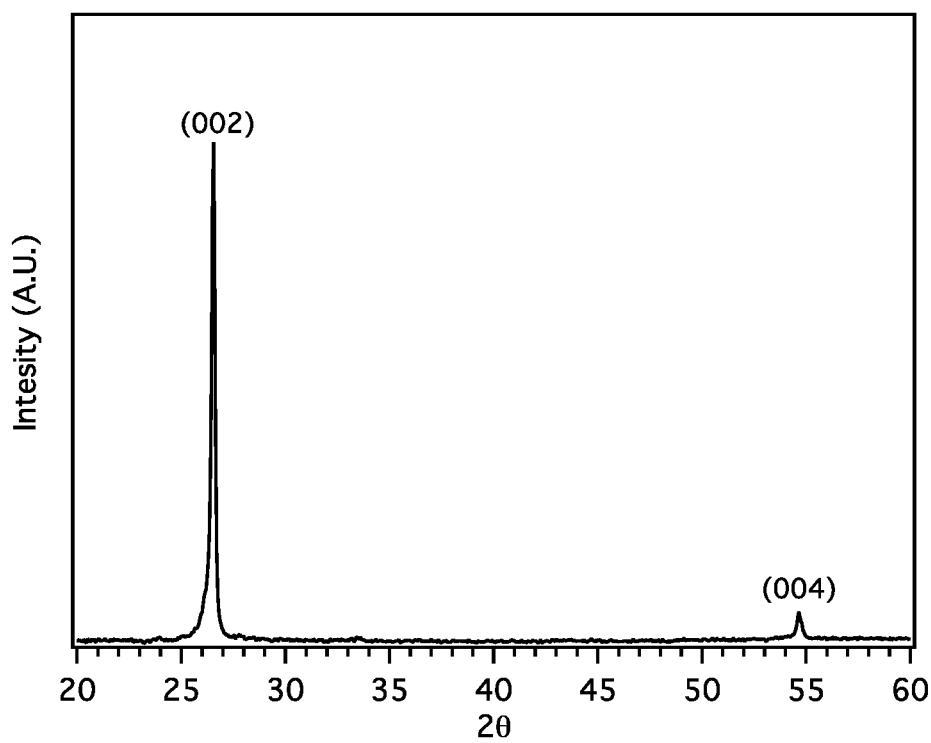
FIG. 18 is a PXRD profile of graphite (d-spacing 0.3354 nm) produced in Example 8.

FIG. 18 is a PXRD profile of graphite (d-spacing 0.3354 nm) produced in Example 8. As shown, the produced graphite exhibits reflections with corresponding Miller indices of (002) and (004) indicative of crystalline graphite.

Figure 19:
FIG. 19 is an SEM micrograph of graphite produced in Example 8 (scale bar=50 µm)
Figure 20:
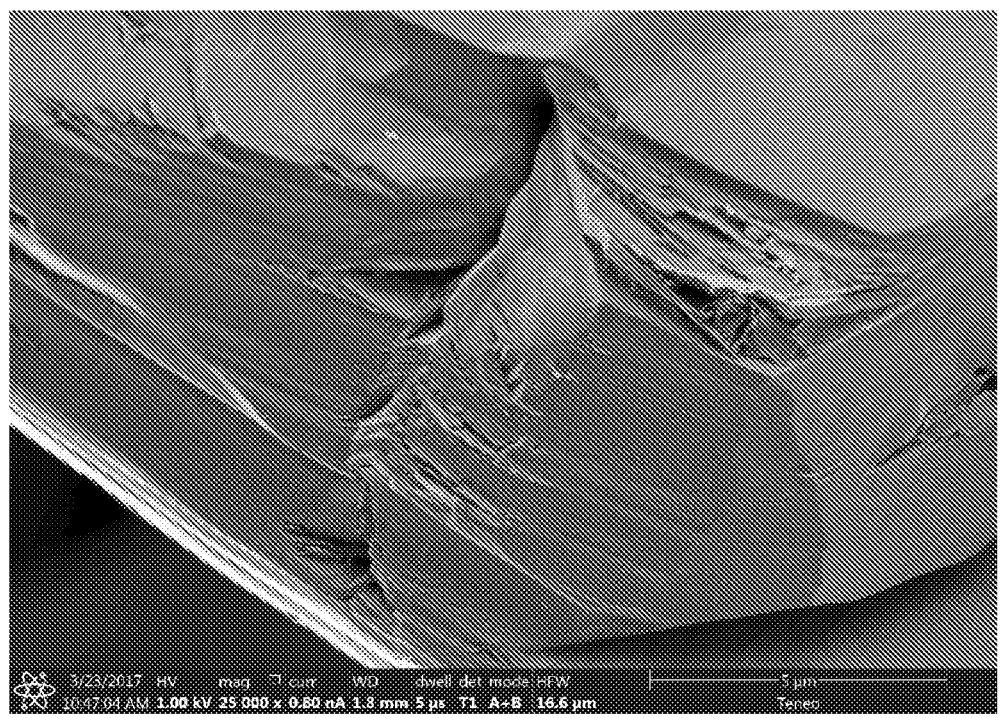
FIG. 20 is an SEM micrograph of graphite produced in Example 8 (scale bar=5 µm)

FIGS. 19 and 20 are SEM micrographs of the graphite produced in Example 8, having scale bars of 50 μm and 5 μm, respectively. As can be seen, the graphite produced can be physically described as flakes, a large percentage of which have thicknesses and widths in excess of 5 and 50 μm, respectively.

Examples 9-12

Microcrystalline cellulose (8 g, Avicel PH-105 NF, FMC BioPolymer) and Co powder (2 g, 99.8% 100 mesh, Strem) were loaded into a hardened steel cup (80 mL, Fritsch GmbH) with ten balls (1 cm diameter) at 300 rpm for 30 min using a planetary mill (Pulverisette 6, Fritsch GmbH). The resulting powder was divided evenly and pressed at 8065 psi (Example 9), 24,194 psi (Example 10), 38,710 psi (Example 11) or 72,000 psi (Example 12) of force into two 20 mm diameter pellets (10.8 mm thick) and a ¼" hole drilled in their center with a drill press. The pellets were then heated under $N_2$ gas (30 mL/min) from room temperature to 400° C. at a 10° C./min ramp rate and held for a total heating time of 30 min. After cooling, the charred pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and maintained at 0.5 torr with flowing He.

The pellets were then irradiated through an anti-reflective coated ZnSe window (Design Research Optics) by a 2 mm diameter 10.4 μm laser beam (Firestar t60, Synrad Inc., 95% power) while rotating at 1.2 rev/min for one full rotation. The surface of the pellets exposed to the laser was removed by gentle abrasion and the resulting powder was ground in a tempered steel cup (80 mL) with ten balls (1 cm diameter) at 100 rpm for 5 min.

The ground powder was then purified by oxidation with $HNO_3$. The raw product was dispersed in 40 mL of concentrated $HNO_3$ and ramped from room temperature to 190° C. in 10 min and held at 190° C. for an additional 20 min using a MARS 5 Digestion Microwave System (CEM Corp.). The solution was diluted with 300 mL of deionized water, the product was collected by vacuum filtration (1 micron polyester, GVS Life Sciences), and then repeatedly washed with deionized water until a neutral pH was obtained followed by 1 M NaOH wash and $H_2O$ neutralization. To ensure no metal precipitates remained in the product a wash with 10% HCl solution was performed followed by $H_2O$ neutralization.

Figure 21:
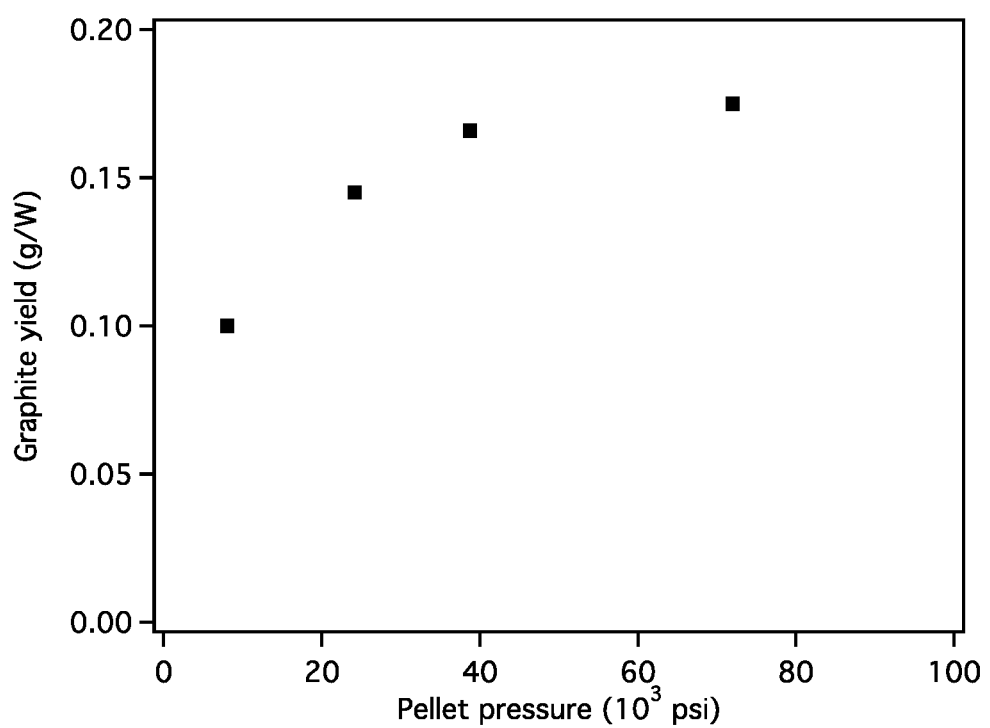
FIG. 21 is a graphical display of graphite yield (in grams per watt (g/W) laser power) as a function of pellet formation pressure in Examples 9-12.

FIG. 21 is a graphical display of purified graphite yield (in grams per watt (g/W) laser power) as a function of pellet formation pressure. As can be seen, graphite yield increases with increasing pellet formation pressure in a logarithmic fashion.

Example 13

Hardwood Sawdust (6.0 g, CrossRoad Sales LLC) and –100 mesh Fe powder (2 g, 99%, Strem product number 93-2663, passed through 325 mesh sieve before use) were loaded into a hardened steel cup (80 mL, Fritsch GmbH) with six balls (hardened steel, 1 cm diameter, 10:1 ball to powder mass ratio) and milled at 300 rpm for 30 min using a planetary mill (Pulverisette 6, Fritsch GmbH). The resulting powder was pressed (10.89 tons, Carver 3851 benchtop laboratory press) to form 20 mm diameter pellets. A $^{21}/_{64}$" hole was then drilled in the center of each pellet with a drill press and they were heated under $N_2$ gas (30 mL/min) from room temperature to 600° C. at a 30° C./min ramp rate and held for a total heating time of 30 min. While the heating temperature has a significant effect on the product distribution (pyrolysis-oil/syngas/char), varying the temperature in the range of 400-600° C. appeared to have little or no effect on the synthesis described here, other than the obvious dependence of yield dependence on the proportion of char produced and mass loss of the char during laser exposure due to higher proportion of volatile material in char produced at lower temperatures. The heating under inert atmosphere resulted in the evolution of pyrolysis-oil and pyrolysis-gas and transformed the biomass to biochar. After charring at 600° C., 40% of the original pellet mass remained (80% of sawdust mass lost) as black pellets containing bio-char (37.5 wt. %) and Fe (62.5 wt. %). After cooling, the biochar/Fe pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and then maintained at 0.5 torr with flowing inert gas. Each pellet was then irradiated through an anti-reflective coated ZnSe window (Design Research Optics) by a 2 mm diameter 10.4 μm laser beam (Firestar t60, Synrad Inc., 95% power) while rotating at a linear velocity of 1.63 mm/s (1.2 rev/min) for one full rotation, resulting in a 2.78% pellet mass loss. Finally, the material exposed to the laser was removed by cutting and the resulting powder was lightly ground by hand in an agate mortar and pestle.

The raw product was treated in refluxing 50 v/v % HCl for 1 hour, filtered and washed with deionized $H_2O$, followed by microwave digestion, heating from room temperature to 210° C. in 10 min and held for an additional 40 min in $HNO_3$:HCl:$H_2O$ (1:1:2 v/v) solution (ACS Grade, 68-70% $HNO_3$ and 36.5-38% HCl, VWR Scientific) using a XP-1500+ Teflon vessel and MARS 5 Digestion Microwave System (CEM Corp.). Note that while microwave digestion is convenient, recovery, grinding and treating for an additional hour in refluxing 50 v/v % HCl was also effective. After cooling to room temperature, the mixture was diluted with of deionized water and the solid product collected by vacuum filtration (1 μm polyester, GVS LifeSciences). The product was then washed with additional deionized water until a neutral pH was obtained, rinsed with 1 M NaOH (>97% Fisher Scientific) followed by deionized water neutralization, rinsed with a 10 v/v % HCl solution followed by deionized water neutralization and finally dried under vacuum. It should be noted that the iron could also be magnetically separated from the graphite, allowing its reuse and limiting the need for leaching, but is not as convenient as refluxing on the small laboratory scale.

Silicon is commonly found in lower purity iron and some inexpensive biomass waste products, presenting itself as silica in the final product that is not removed by the purification methods described above. The removal of silica from natural graphite is extremely difficult as it is deeply embedded in the graphite, requiring multiple grinding, floatation and treatment with caustic agents (including HF), with consequential loss (up to 70 wt %) of graphite as waste and significant environmental impact. In contrast, the silicon presents itself in the graphite synthesized by the method of the present disclosure as surface silica and can be removed by digesting in 2 M NaOH solution for 40 minutes at 210° C.

Example 14

Hardwood Sawdust (6.0 g, CrossRoad Sales LLC) and uncoated steel spheres (2 g, 0.6 mm diameter, SuperMagneticMan.com product number SS006) were loaded into a hardened steel cup (80 mL, Fritsch GmbH) with six balls (hardened steel, 1 cm diameter, 10:1 ball to powder mass ratio) and milled at 300 rpm for 30 min using a planetary mill (Pulverisette 6, Fritsch GmbH). The resulting powder was pressed (10.89 t, Carver 3851 benchtop laboratory press) to form 20 mm diameter pellets. A $^{21}\!/\!_{64}$" hole was then drilled in the center of each pellet with a drill press and they were heated under $N_2$ gas (30 mL/min) from room temperature to 600° C. at a 30° C./min ramp rate and held for a total heating time of 30 min. While the heating temperature has a significant effect on the product distribution (pyrolysis-oil/syngas/char), varying the temperature in the range of 400-600° C. appeared to have little or no effect on the synthesis described here, other than the obvious dependence of yield dependence on the proportion of char produced and mass loss of the char during laser exposure due to higher proportion of volatile material in char produced at lower temperatures. The heating under inert atmosphere resulted in the evolution of pyrolysis-oil and pyrolysis-gas and transformed the biomass to biochar. After cooling, the biochar/Fe pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and then maintained at 0.5 torr with flowing inert gas. Each pellet was then irradiated through an anti-reflective coated ZnSe window (Design Research Optics) by a 2 mm diameter 10.4 μm laser beam (Firestar t60, Synrad Inc., 95% power) while rotating at a linear velocity of 1.63 mm/s (1.2 rev/min) for one full rotation. Finally, the material exposed to the laser was removed by cutting and the resulting powder was lightly ground by hand in an agate mortar and pestle.

The raw product was treated in refluxing 50 v/v % HCl for 1 hour, filtered and washed with deionized $H_2O$, followed by microwave digestion, heating from room temperature to 210° C. in 10 min and held for an additional 40 min in $HNO_3$:HCl:$H_2O$ (1:1:2 v/v) solution (ACS Grade, 68-70% $HNO_3$ and 36.5-38% HCl, VWR Scientific) using a XP-1500+ Teflon vessel and MARS 5 Digestion Microwave System (CEM Corp.). After cooling to room temperature, the mixture was diluted with of deionized water and the solid product collected by vacuum filtration (1 μm polyester, GVS LifeSciences). The product was then washed with additional deionized water until a neutral pH was obtained, rinsed with 1 M NaOH (>97% Fisher Scientific) followed by deionized water neutralization, rinsed with a 10 v/v % HCl solution followed by deionized water neutralization and finally dried under vacuum.

Example 15

Hardwood Sawdust (6.0 g, CrossRoad Sales LLC) and 1-2 mm Fe granules (2 g, 99.98%, Alfa Aesar product number 39708) were loaded into a hardened steel cup (80 mL, Fritsch GmbH) with six balls (hardened steel, 1 cm diameter, 10:1 ball to powder mass ratio) and milled at 300 rpm for 30 min using a planetary mill (Pulverisette 6, Fritsch GmbH). The resulting powder was pressed (10.89 t, Carver 3851 benchtop laboratory press) to form 20 mm diameter pellets. A $^{21}\!/\!_{64}$" hole was then drilled in the center of each pellet with a drill press and they were heated under $N_2$ gas (30 mL/min) from room temperature to 600° C. at a 30° C./min ramp rate and held for a total heating time of 30 min. While the heating temperature has a significant effect on the product distribution (pyrolysis-oil/syngas/char), varying the temperature in the range of 400-600° C. appeared to have little or no effect on the synthesis described here, other than the obvious dependence of yield dependence on the proportion of char produced and mass loss of the char during laser exposure due to higher proportion of volatile material in char produced at lower temperatures. The heating under inert atmosphere resulted in the evolution of pyrolysis-oil and pyrolysis-gas and transformed the biomass to biochar. After cooling, the biochar/Fe pellets were skewered on a ¼" diameter stainless steel rod which was then placed vertically into a stainless steel 4-way cross, feed through the top flange equipped with an Ultra-Torr™ vacuum fitting (Swagelok) and secured to a stepper motor (STM-23, Applied Motion Products). The chamber was evacuated chamber to $10^{-3}$ torr and then maintained at 0.5 torr with flowing inert gas. Each pellet was then irradiated through an anti-reflective coated ZnSe window (Design Research Optics) by a 2 mm diameter 10.4 μm laser beam (Firestar t60, Synrad Inc., 95% power) while rotating at a linear velocity of 1.63 mm/s (1.2 rev/min) for one full rotation. Finally, the material exposed to the laser was removed by cutting and the resulting powder was lightly ground by hand in an agate mortar and pestle.

The raw product was treated in refluxing 50 v/v % HCl for 1 hour, filtered and washed with deionized $H_2O$, followed by microwave digestion, heating from room temperature to 210° C. in 10 min and held for an additional 40 min in HNO$_3$:HCl:H$_2$O (1:1:2 v/v) solution (ACS Grade, 68-70% HNO$_3$ and 36.5-38% HCl, VWR Scientific) using a XP-1500+ Teflon vessel and MARS 5 Digestion Microwave System (CEM Corp.). After cooling to room temperature, the mixture was diluted with of deionized water and the solid product collected by vacuum filtration (1 μm polyester, GVS LifeSciences). The product was then washed with additional deionized water until a neutral pH was obtained, rinsed with 1 M NaOH (>97% Fisher Scientific) followed by deionized water neutralization, rinsed with a 10 v/v % HCl solution followed by deionized water neutralization and finally dried under vacuum.

Results and Discussion—Examples 13-15

Figure 22:
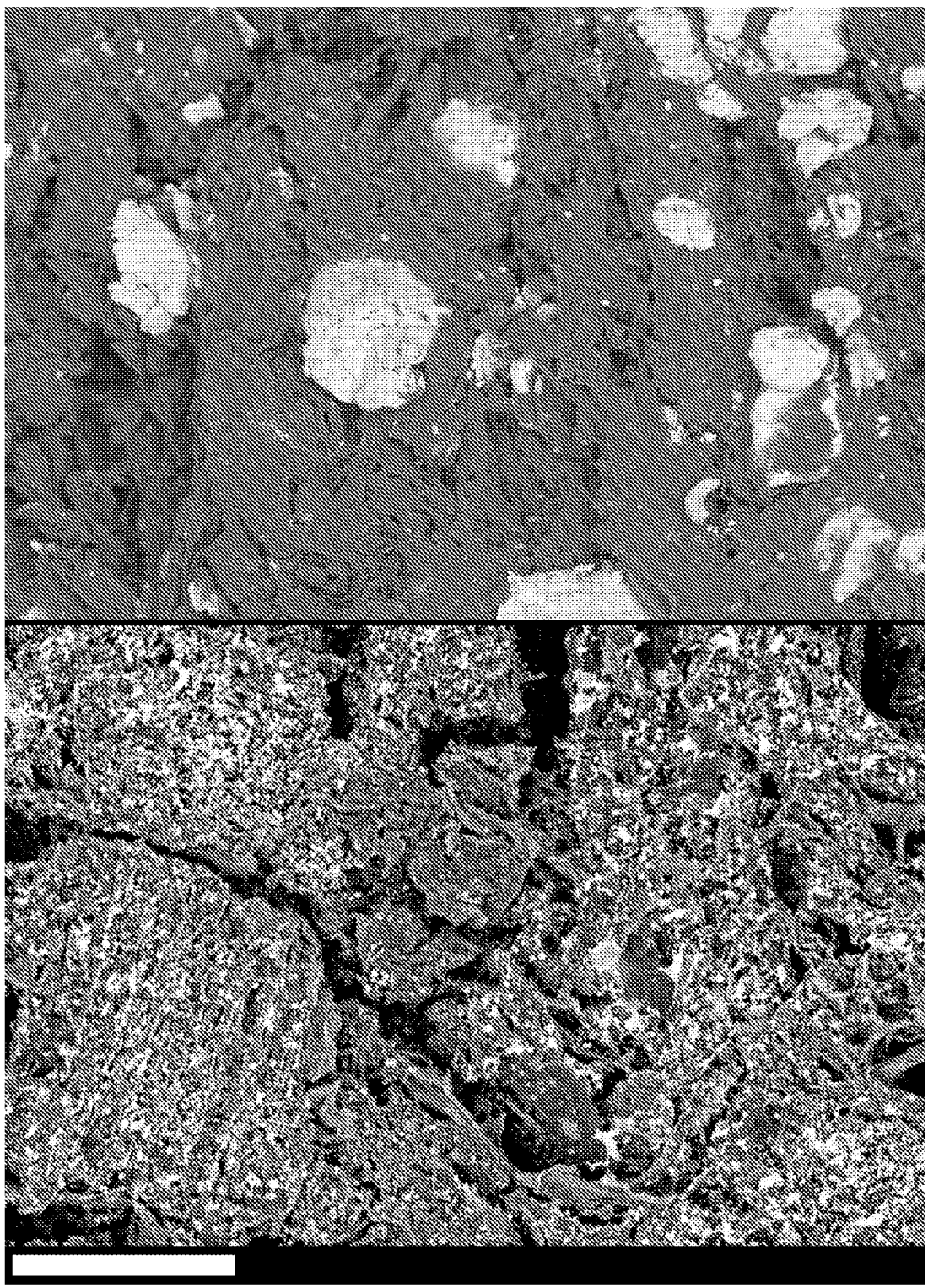
FIG. 22 shows SEM micrographs of the surface of the metal catalyst-containing biochar pellet formed in Example 13 before (top) and after (bottom) laser irradiation (scale bar=25 µm)
Figure 23:
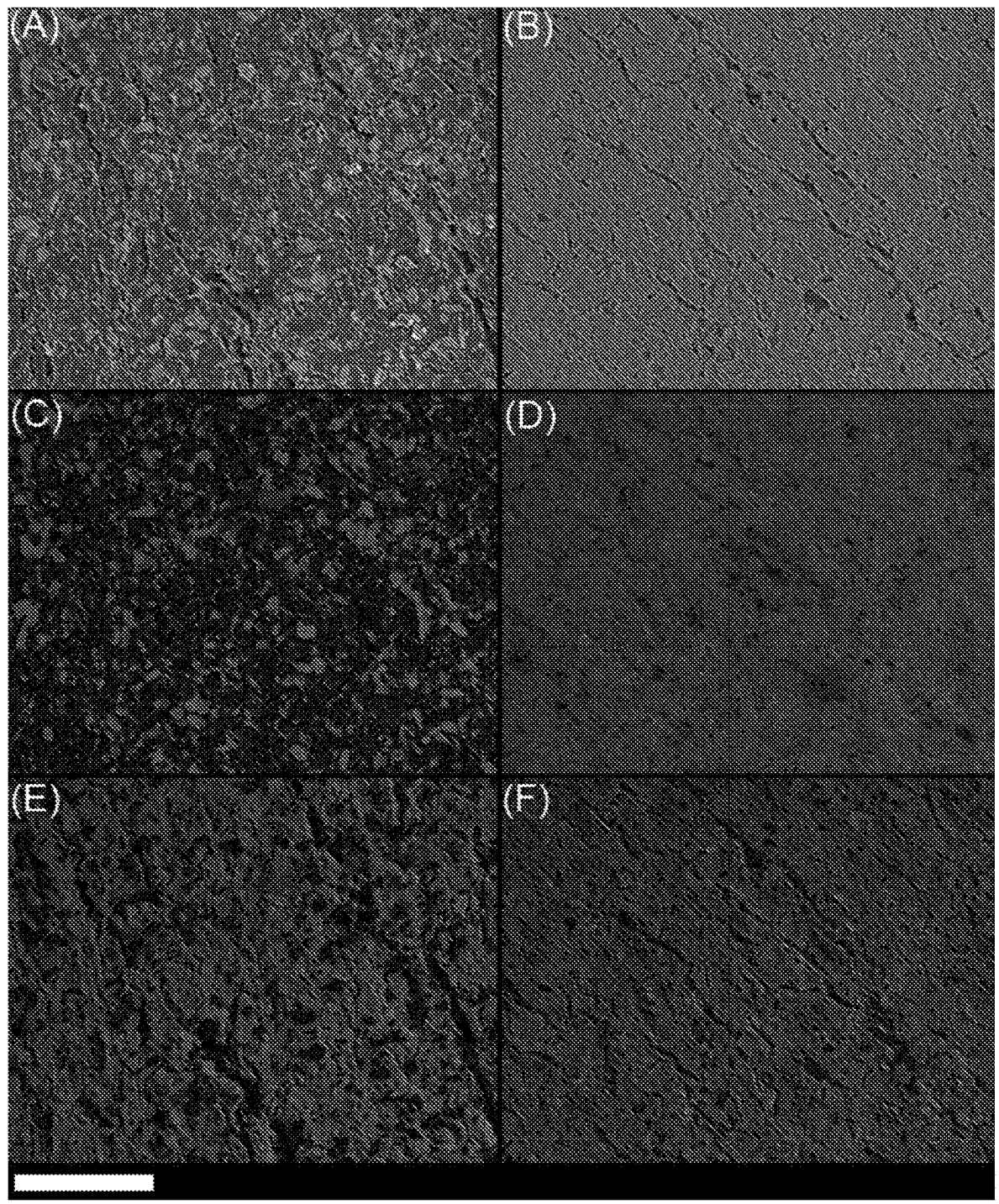
FIG. 23 shows SEM micrographs of the metal catalyst-containing biochar pellet of Example 13 before (A) and after (B) laser irradiation, energy-dispersive X-ray spectroscopy (EDX) elemental maps of Fe before (C) and after (D) laser irradiation, and C maps before (E) and after (F) laser irradiation (scale bar=500 µm)

The method of producing graphite of the present disclosure is a two-step process, pyrolysis of biomass to produce pyrolysis-oil, pyrolysis-gas and biochar followed by the photocatalytic conversion of biochar to flake graphite. FIG. 22 shows SEM micrographs of the surface of the biochar pellet formed in Example 13 before (top) and after (bottom) laser irradiation (scale bar=25 μm). The biochar consisted of Fe particles (~1-5 μm in diameter when made with −325 mesh Fe) embedded in a carbonaceous matrix observed as high contrast particles by SEM using a backscatter detector (FIG. 22, top). Exposing the char to the laser resulted in a bright orange glow and the material appeared grey in color upon cooling. The Fe particles are significantly smaller, irregularly shaped and more homogeneously distributed in the pellet after exposure to the laser (FIG. 22, bottom), consistent with the Fe having been in a molten, mobile state. FIG. 23 shows SEM micrographs of the biochar/Fe pellet of Example 13 before (A) and after (B) laser irradiation, EDX elemental maps of Fe before (C) and after (D) laser irradiation, and C maps before (E) and after (F) laser irradiation (scale bar=500 μm).

Figure 24:
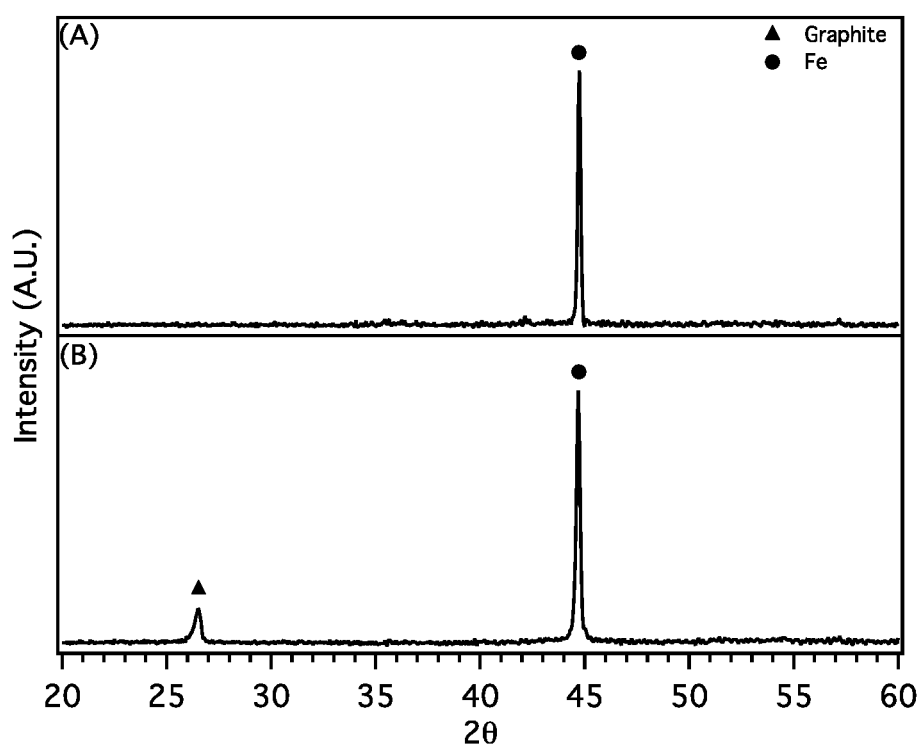
FIG. 24 shows XRD profiles of a metal catalyst-containing biochar before (top) and after (bottom) laser irradiation.

No evidence of graphite in the biochar of Example 13 was found in XRD patterns prior to laser irradiation (FIG. 24, top). Cutting into the material after exposure to the laser resulted in a surface with a highly lustrous metallic sheen typical of graphite. XRD patterns of the material after laser irradiation show a sharp peak consistent with the graphite (002) reflection (FIG. 24, bottom), with no evidence of Fe carbide formation. XRD patterns of biochar that has been exposed to the laser in the absence of the metal catalyst do not show any evidence of graphite, or any other crystalline phase, formation.

SEM images of the purified graphite made in Example 13 reveals 10-30 μm diameter agglomerates of thin plate-like material consistent with agglomerates of flake graphite (FIG. 25(A)). The plates are ~5 μm wide and ~50 nm thick, with a significant fraction of the material smaller fragments. EDX spectra of the material show only carbon with no signal above background for any other element. The graphite of Example 13 exhibits a BET surface area of 10.3(1) m$^2$/g and a pore volume of 0.0508 cm$^3$/g, which is significantly lower than the values of 17.6(1) m$^2$/g and 0.0546 cm$^3$/g for a similar size flake commercial synthetic graphite (Imerys Timrex® SFG-6, d90 5.5-7.5 μm), indicating that the agglomerates are tightly packed.

Figure 25:
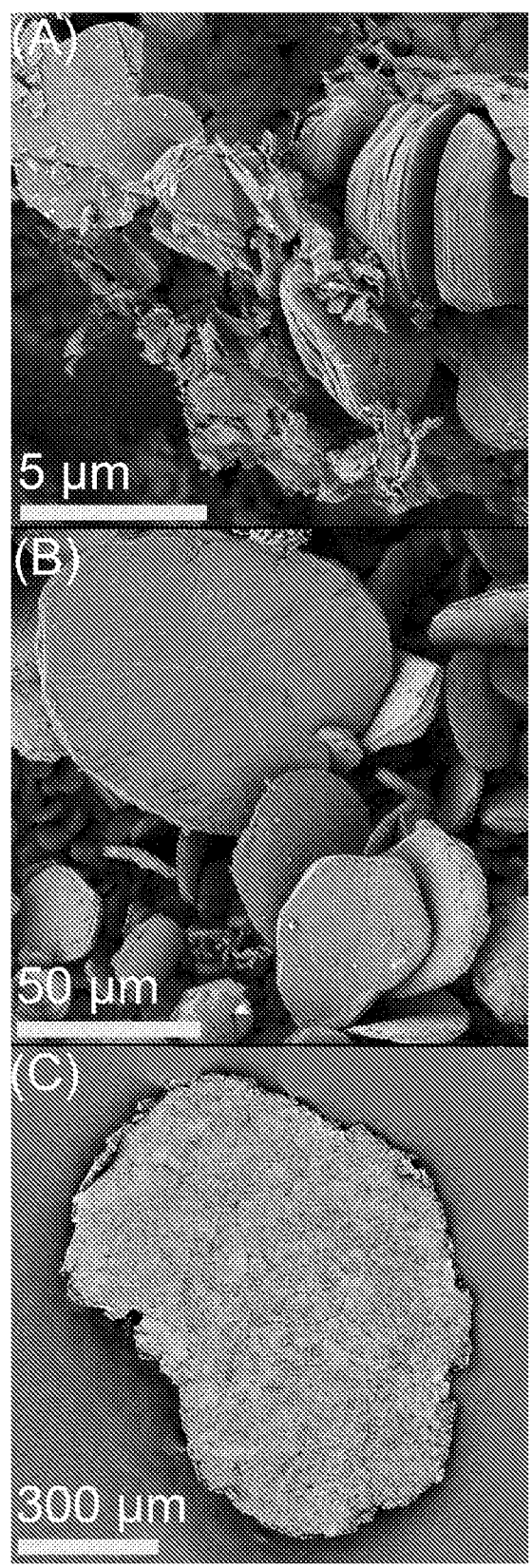
FIG. 25 shows SEM micrographs of graphite formed according to Examples 13 (A), 14 (B) and 15 (C)
Figure 26:
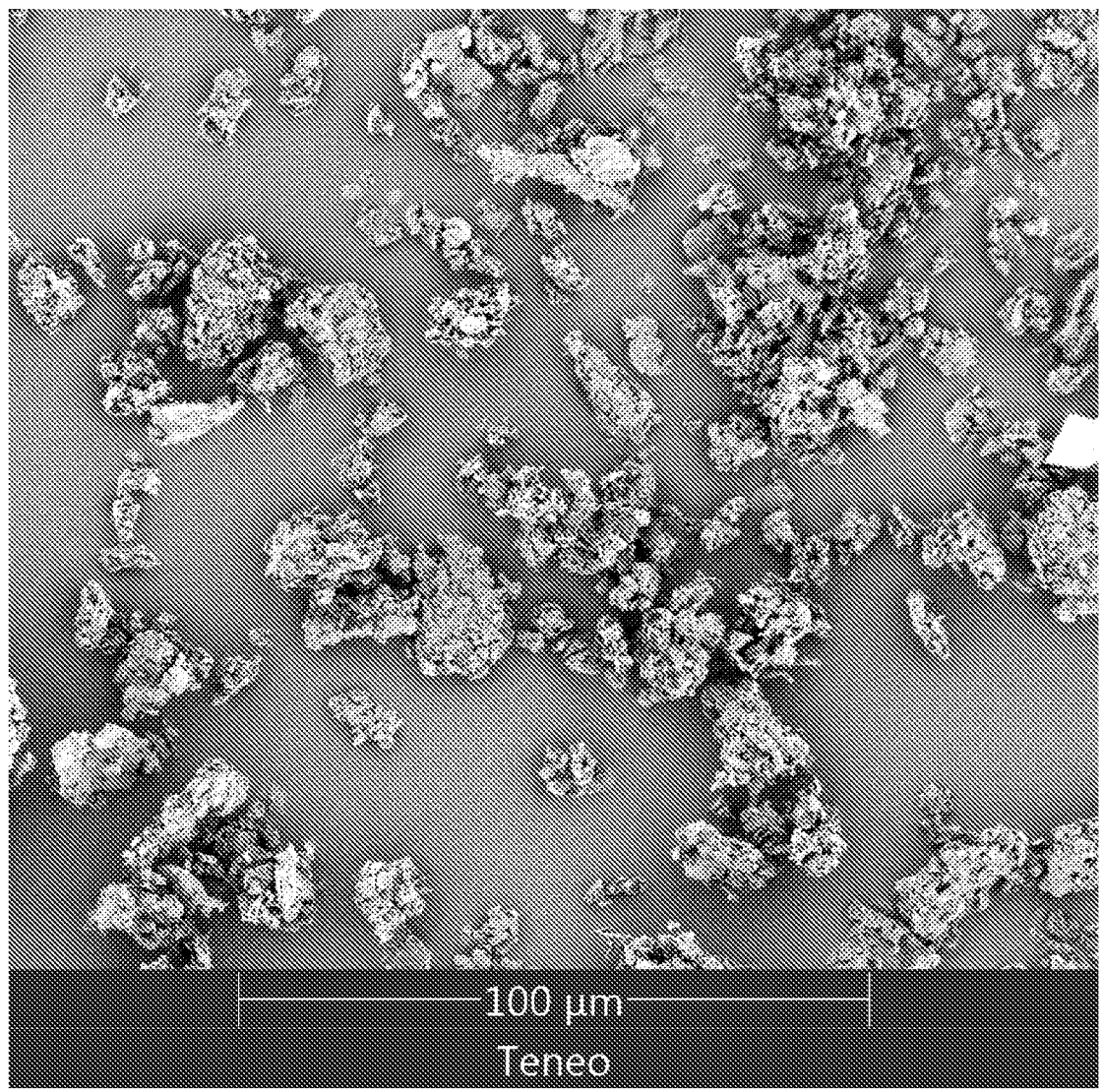
FIG. 26 is another SEM micrograph of graphite formed according to Example 13.

FIG. 25 displays SEM micrographs of graphite formed according to Examples 13 (A), 14 (B) and 15 (C). As can be seen, the size of the flakes is dependent on the size of the metal catalyst particles used, with larger flakes formed from larger catalysts particles. The 0.6 mm steel spheres (Example 14) exhibit flake sizes of ~50-200 μm, a BET surface area of 12.2(3) and a porosity of 0.0576 cm$^3$/g. The 1-2 mm Fe granules (Example 15) exhibit flake sizes of ~0.5-1 mm flakes with a BET surface area of and 8.0(1) m$^2$/g and a porosity of 0.0493 cm$^3$/g. These larger flakes are not tightly packed in agglomerates as found for the smaller graphite (Example 13), reflected both in SEM images and surface areas. The width of the flakes formed appears to be closely related to the surface area of the crystalline domains in the Fe particles, suggesting that they form by dissolution of carbon into the grains and precipitation of sequential graphene layers parallel to the surface. FIG. 26 is another SEM micrograph of the graphite produced in Example 13. As can be seen, the morphology of the graphite produced can be physically described as flake in "potato" shaped agglomerates.

Figure 27:
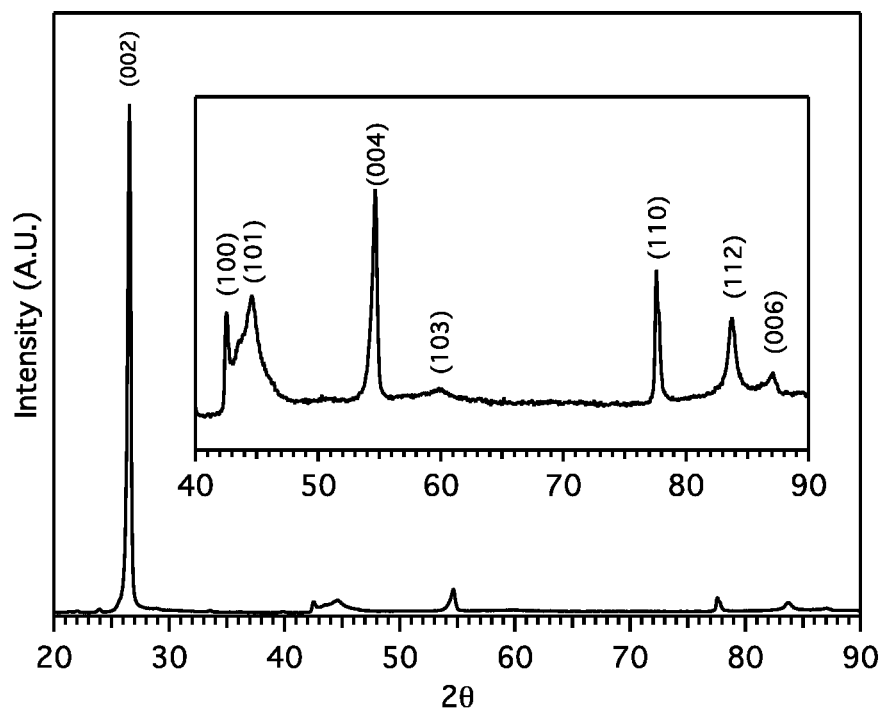
FIG. 27 is the XRD pattern of the graphite formed according to Example 13.

The XRD pattern of the graphite formed according to Example 13 (FIG. 27) is consistent with graphite with no evidence of any other phase. Hexagonal (H-) and rhombohedral (R-) graphite consist of ABAB and ABC stacks of graphene layers, respectively, which are offset so that half of the carbon atoms occupy sites centered on the carbon hexagons of the adjacent layers. H-graphite is the thermodynamically favored structure, however, the enthalpic difference between the phases is small. Thus, while natural graphite is generally found to be (nearly) completely H-graphite, synthetic graphite is generally a mixture of the two structures. The graphite formed according to Example 13 is 75% H- and 25% R-graphite as determined by comparison of the integrated intensities of the respective (101) peaks.

Turbostratic carbon also consists of graphene layers and can have the same 2D crystalline order as graphite, however, random translation and rotation displacements of the layers result in imperfect matching of the adjacent graphene layers, increasing the interlayer spacing. The interlayer spacing of graphite formed in Example 13 is 3.3546(5) Å, determined by fitting its (002) peak, nearly identical to that of high quality Sri Lanka natural lump graphite. This shows a very low degree of turbostratic disorder or equivalently a very high degree of 3D graphitic order, which can be estimated to be >99.3% using the formula $$g=(3.44-d_{002})/(3.44-3.354)$$

Analyzing the (002) peak width with the Scherrer equation finds $L_c$, the average crystallite dimension along the graphene-stacking (c) axis to be 32 nm, in reasonable agreement with SEM observations. The average width in the graphene planes ($L_a$) of the crystallites can be similarly estimated from the (100) peak width to be 77 nm.

Figure 28:
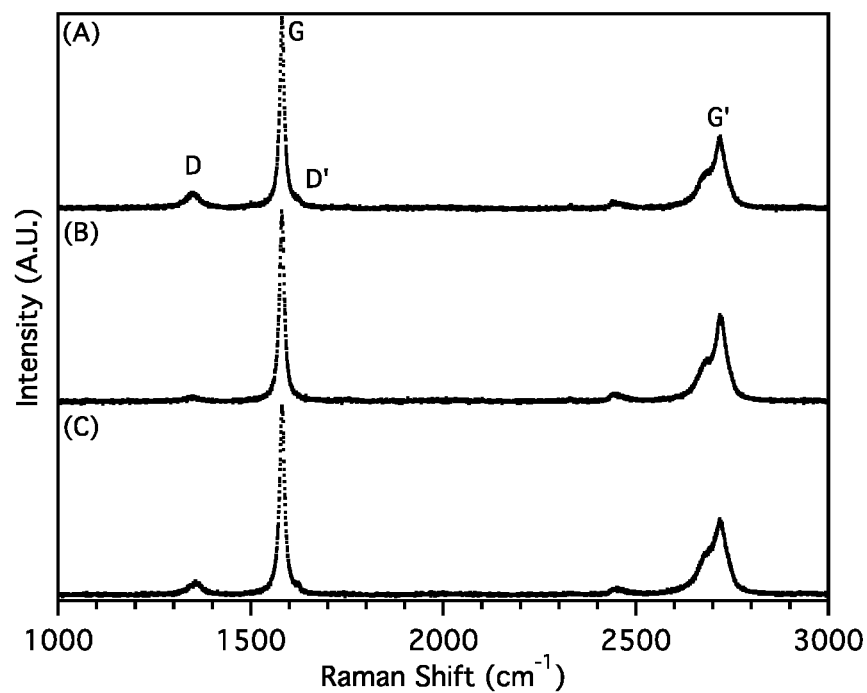
FIG. 28 displays Raman spectra of a commercially available synthetic graphite (SFG-6, A), the 0.5-1 mm graphite flakes formed in Example 15 (13) and the ~5 µm wide graphite plates formed in Example 13 (C)

Raman spectra of SFG-6 (A), the 0.5-1 mm graphite flakes formed in Example 15 (B) and the ~5 μm wide graphite plates formed in Example 13 (C) are shown in FIG. 28. The D-band (~1350 cm$^{-1}$) and D'-band (~1620 cm$^{-1}$) arise from disorder (including graphene plane edges) while the G-band at ~1580 cm$^{-1}$ is an allowed transition of the sp$^2$ carbon network of the graphene layers. The ratio of the intensities of the D and G bands, $I_D/I_G$, is a measure of the degree of order, allowing the calculation of the average distance between defects in the graphene planes (La). The $I_D/I_G$ ratio of the Example 13 graphite (0.15) is less than that of SFG-6 (0.22), with corresponding $L_a$ values of 128 and 87 nm respectively, indicating that the Example 13 graphite has a higher degree of in plane order. The very low $I_D/I_G$ ratio (0.04) of Example 15 graphite spectra and the absence of the D' band, seen as shoulders on the G bands of Example 13 graphite and SFG-6, indicates a very high degree of order, with a $L_a$ value of 481 nm. The very much larger value is probably at least in part due to the much larger flake size, minimizing the contribution of crystallite edges to the spectra.

Figure 29:
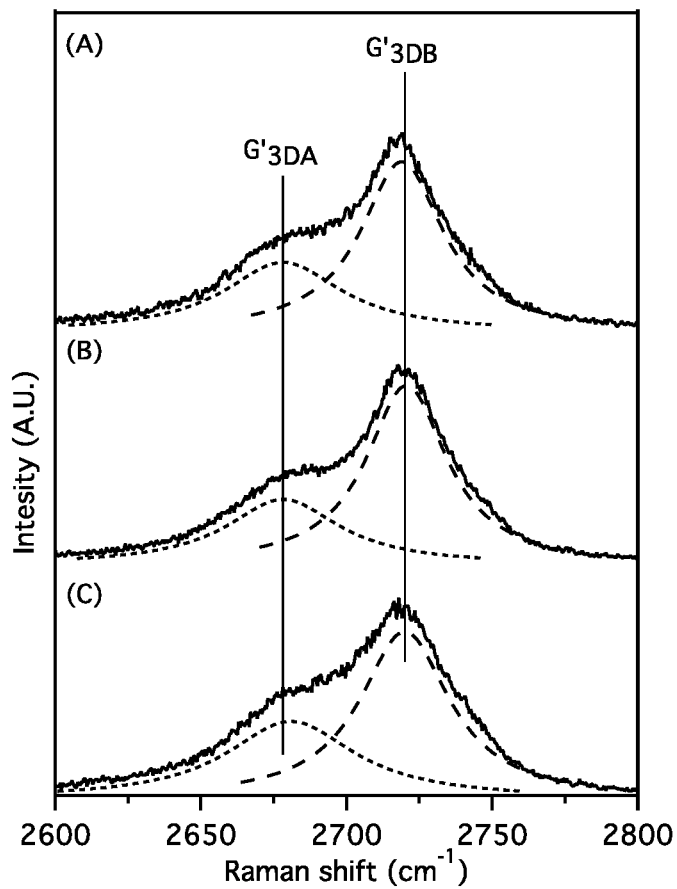
FIG. 29 displays deconvoluted Raman spectra of a commercially available synthetic graphite (SFG-6, A), the 0.5-1 mm graphite flakes formed in Example 15 (B) and the ~5 µm wide graphite plates formed in Example 13 (C)

FIG. 29 displays Raman spectra of SFG-6 (A), the 0.5-1 mm graphite flakes formed in Example 15 (B) and the ~5 µm wide graphite plates formed in Example 13 (C). The Raman spectra show the G' bands (solid lines) for each graphite material and their deconvolution into $G'_{3DA}$ and $G'_{3DB}$ bands (dashed lines). The degree of turbostratic structure can be found by deconvolution of the G' (sometimes referred to as the 2D) band. The presence of a $G'_{2D}$ band is indicative of turbostratic disorder. However, the G' bands of each of these materials could be well fit with two peaks, $G'_{3DA}$ and $G'_{3DB}$, with no evidence of a $G'_{2D}$ band. This indicates that the materials all have very low turbostratic disorder, in agreement with XRD results.

Figure 30:
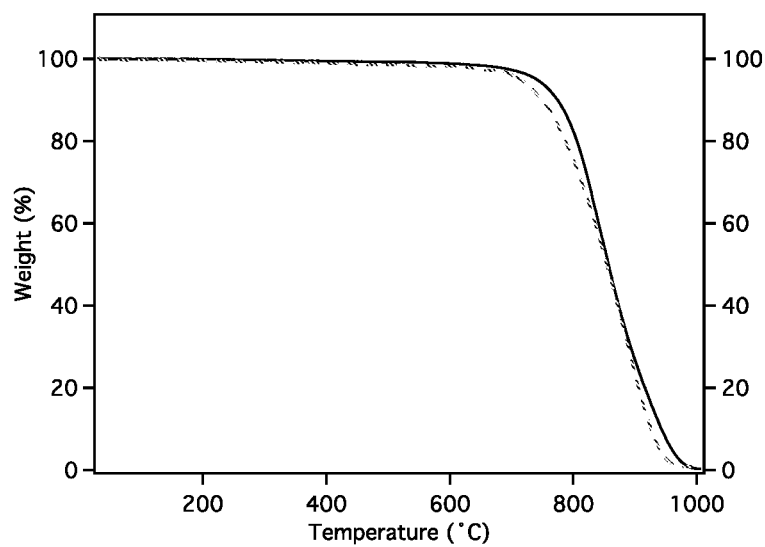
FIG. 30 shows TGA thermograms for graphite (solid line) formed according to a method of the present disclosure (Example 13) and a commercially available synthetic graphite (SFG-6, dashed line)

Example 13 graphite is nearly 100% carbon. The onset of mass loss in TGA thermograms for the graphite formed in Example 13 is 770° C. (solid line), slightly higher than SFG-6 (dashed line), with 100% mass loss (FIG. 30). Residual ash content is 0.02(2) %, somewhat lower than SFG-6 (0.07%). Elemental analysis by Glow Discharge Mass Spectrometry (GDMS) indicates 99.95% graphite purity with a total of 526 ppm of impurity elements above the detection limits (FIG. 31).

Figure 32:
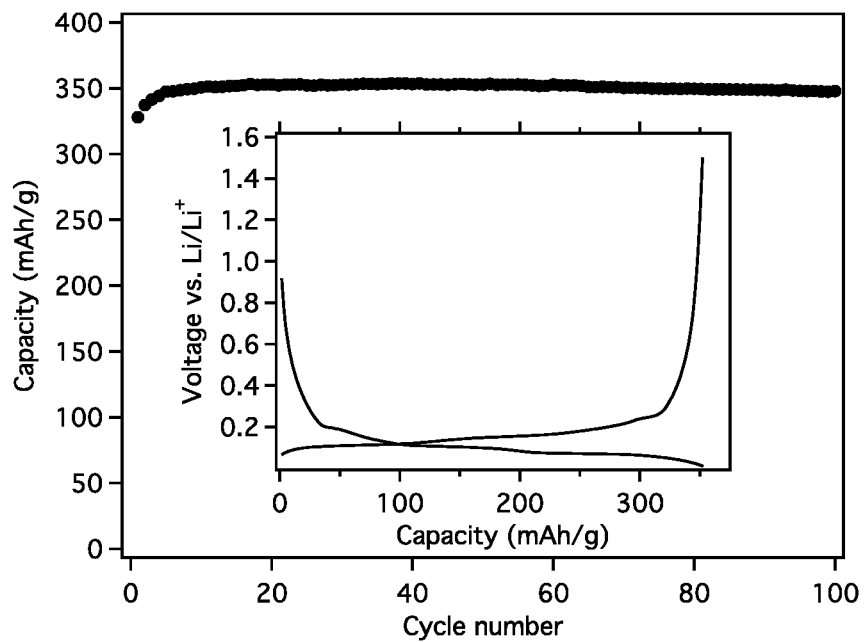
FIG. 32 shows the charge capacity over multiple cycles and the charge/discharge profile of the graphite produced in Example 13.

The purity of the graphite formed in Example 13 is comparable to high (battery) grade (FIG. 31) commercial synthetic graphite but notably with notably low levels of S, Si, Zr and W and high Na, Cl and Fe content. In fact, 79% of the impurities found in the graphite of Example 13 are Na, Cl, and Fe, elements that could likely be further reduced by improved purification techniques. Low impurity levels are particularly important for high value applications including carbon raisers, EDM electrodes, carbon brushes, and batteries. The very low level of S in the graphite of Example 13 is particularly significant as its presence is highly undesirable due to its corrosive effects. As shown if FIG. 32, the gravimetric capacity of an anode made of the graphite from Example 13 demonstrates excellent Li-ion capacity (353 mA/g), comparable to that of commercial Li-ion battery grade graphite, with only a 1% capacity loss over 100 charge/discharge cycles at a C/2 rate. The inset of FIG. 32 shows the charge/discharge profile of the graphite of Example 13. Again, it is nearly identical to commercial graphite.

The total product yield of the graphite formed in Example 13 after purification was 84 wt % of the bio-char mass. The charred biomass was found to consist of 87.74% C, 2.82% H, 0.29% N and 4.68% 0; thus, 96.6% of the C in the biochar was converted to graphite. This very high yield means that while simple dissolution of C into liquid Fe and its precipitation upon cooling could initiate its growth, it probably can't account for the bulk of the graphite formation. The mass of graphite synthesized is 33.7% of the combined graphite and Fe mass in final reaction mixture, while the solubility of C in liquid Fe is only ~5% interstitial and 6.7% as the metastable phase $Fe_3C$, ~10% of the C converted. C saturated Fe can exist in equilibrium with graphite, thus, the graphite crystals could have grown from liquid Fe that maintained supersaturation through ongoing dissolution of C and precipitation of graphite. Alternatively, crystallization of graphite by precipitation as the Fe cools could provide seeds that grow by additional C from the char.

Figure 33:
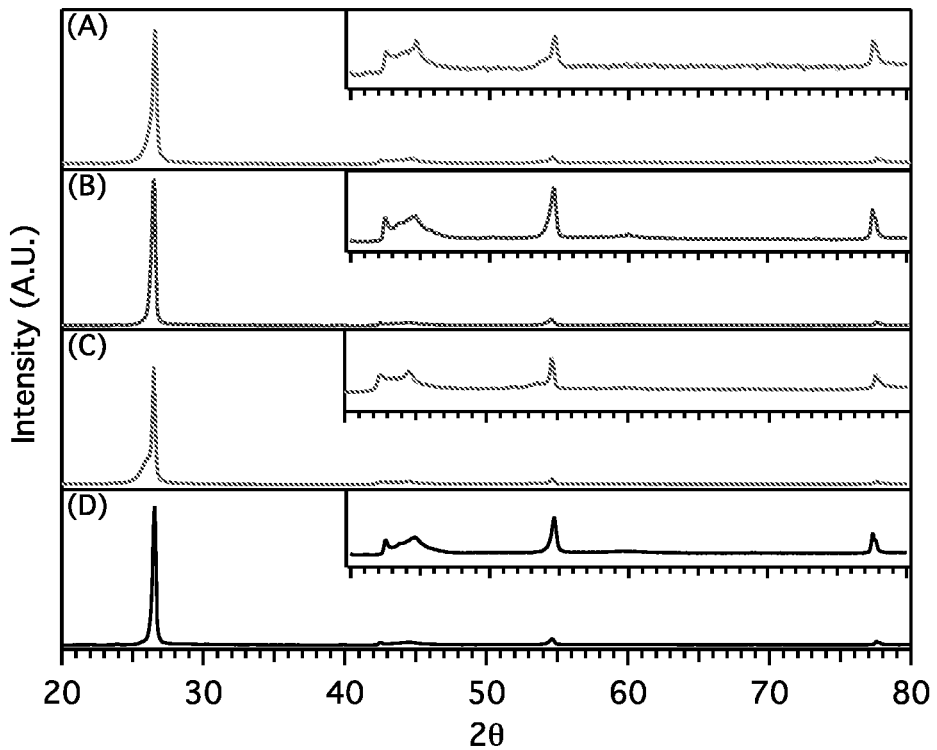
FIG. 33 shows XRD profiles of graphite formed from iron and lignin (A), wood flour (B), corn cob (C) and cellulose (D) in accordance with various aspects of the present disclosure.

Results that are similar to those described above can be achieve with any number of biomass starting materials. FIG. 33 shows XRD profiles of graphite formed by methods in accordance with various aspects of the present disclosure from iron and lignin (A), wood flour (B), corn cob (C) and cellulose (D). The insets in FIG. 33 are expanded views of the 40-90 degrees 2θ regions of the profiles to more clearly show low intensity reflections. The synthesis of graphite has been confirmed from two different sawdust sources and corncob, as well as individual biomass components lignin and cellulose. It should be noted that in contrast to the photocatalytic process presented here, conventional heating of these non-graphitizable carbonaceous materials in the presence of Fe catalyst does not produce flake graphite. Laser pyrolysis of biochar results in extremely rapid heating (~$10^3$-$10^{4o}$ C. s$^{-1}$), generating reactive intermediates, including radical and molecular species, a process that appears to be general to a wide variety of biomass. Without being bound to any particular theory, it is believed that the process proceeds by absorption of these intermediates from the decomposing biochar into/onto the metal catalyst followed by its precipitation/growth as graphite, a process that should be widely applicable to available biomass: materials including agricultural, industrial/municipal waste or energy crops as well as other graphitizable and non-graphitizable carbonaceous materials including artificial and (other) natural polymers, peat, coal, pitch, coke, carbon blacks, activated carbons, mesophase carbons and charcoal.

Example 16

Lignite coal (15 g, minimegeology.com) was ground to a fine powder in a hardened steel cup (80 mL, Fritsch GmbH) with 9 balls (hardened steel, 1 cm diameter) by mechanical milling at 300 RPM for 30 min with a Fritsch Pulverisette 6. The lignite powder was then sieved to –100 mesh and 4 g was mixed with 3 g of iron powder (<10 µm, 99%, Alfa Aesar) in a hardened steel cup (80 mL, Fritsch GmbH) with 6 balls (hardened steel, 1 cm diameter) by mechanical milling at 300 RPM for 30 min with a Fritsch Pulverisette 6. The resulting powder was pressed (10.89 ton, Carver 3851 benchtop laboratory press) to form a 20 mm diameter pellet. A $^{21}/_{64}$" hole was then drilled in the center of the pellet with a drill press and heated under $N_2$ gas (30 mL/min) from room temperature to 800° C. at 30° C./min. After cooling, the pellet was skewered on a ¼" diameter stainless steel rod which was then placed vertically into a stainless steel 4-way cross, feed-through in the top flange equipped with an Ultra-Torr™ vacuum fitting (Swagelok) and secured to a stepper motor (STM-23, Applied Motion Products). The chamber was evacuated chamber to $10^{-3}$ torr and then maintained at 0.5 torr with flowing He. The pellet was then irradiated through an anti-reflective coated ZnSe window (Design Research Optics) by a 2 mm diameter 10.4 µm laser beam (Firestar t60, Synrad Inc., 95% power) while rotating at a linear velocity of 1.63 mm/s (1.2 rev/min) for one full rotation.

The raw product was suspended in $HNO_3$ (40 ml, ACS Grade, 68-70%) and purified by microwave digestion, heating from room temperature to 210° C. in 10 min and held for an additional 30 min using an XP-1500+ Teflon vessel and MARS 5 Digestion Microwave System (CEM Corp.). After cooling to room temperature, the mixture was diluted with deionized water and the solid product collected by vacuum filtration (1 µm polyester, GVS LifeSciences). The product was then washed with additional deionized water until a neutral pH was obtained, rinsed with 1 M NaOH (>97% Fisher Scientific) followed by deionized water neutralization, rinsed with a 10 v/v % HCl solution followed by deionized water neutralization and finally dried under vacuum.

Figure 34:
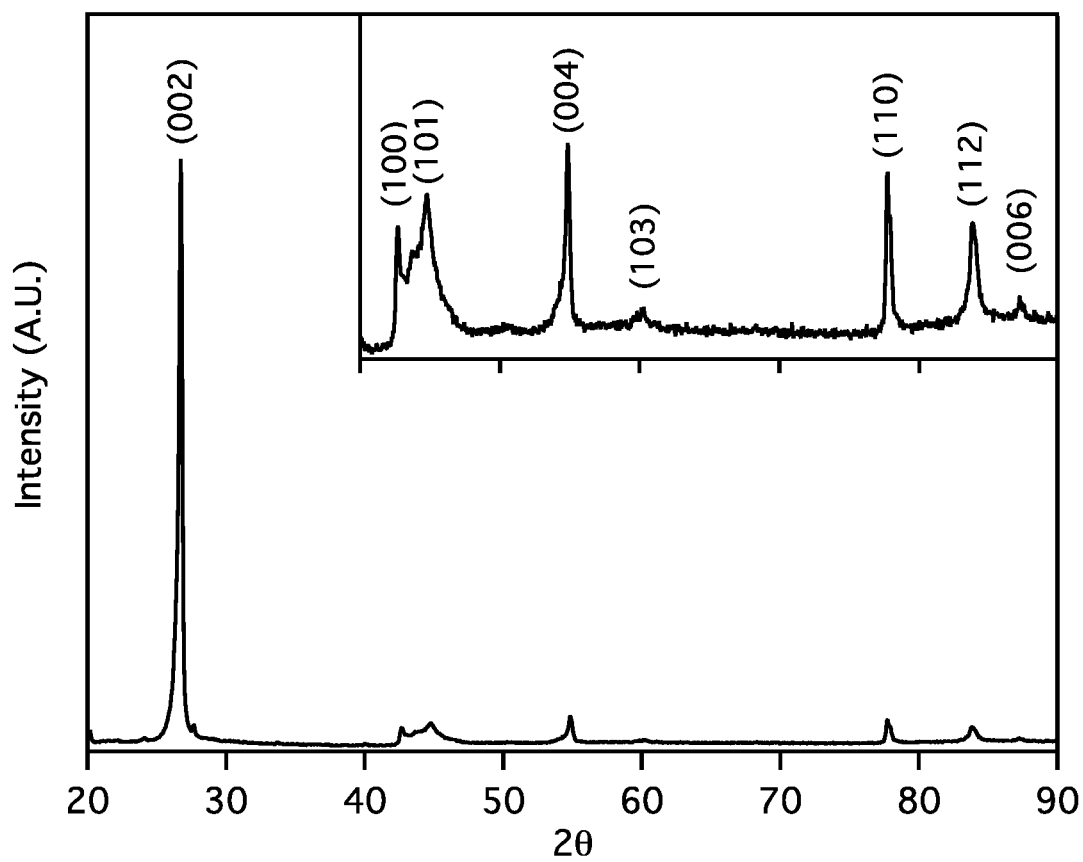
FIG. 34 is a PXRD profile of graphite (d-spacing 0.3354 nm) produced in Example 16.

FIG. 34 is a PXRD profile of graphite (d-spacing 0.3354 nm) produced in Example 16. The inset of FIG. 34 is an expanded view of the 40-90 degrees 2θ region of the profile to more clearly show low intensity reflections. As shown in the figure and inset, the produced graphite exhibits reflections with corresponding Miller indices of (002), (100), (101), (004), (103), (110), (112) and (006) indicative of crystalline graphite.

Figure 35:
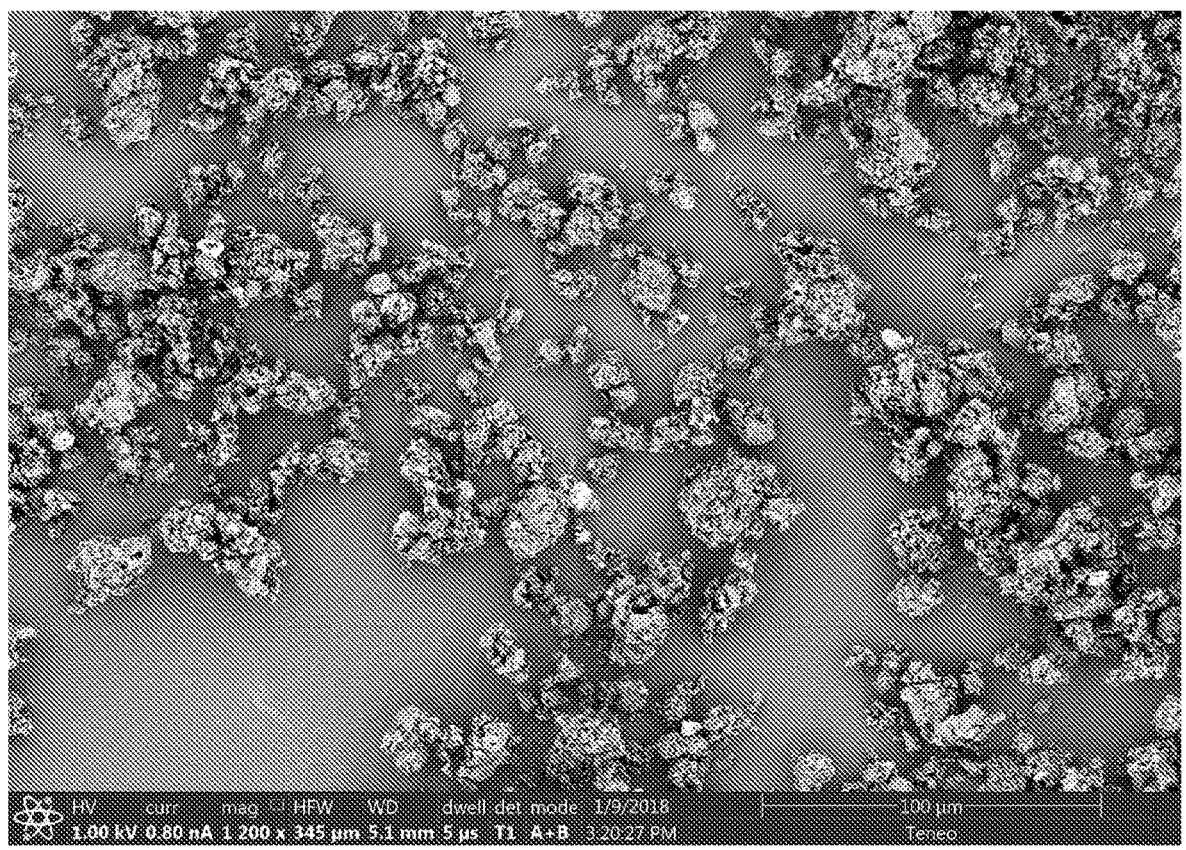
FIG. 35 displays an SEM micrograph of graphite formed according to Example 16.

FIG. 35 is an SEM micrograph of the graphite produced in Example 16. As can be seen, the morphology of the graphite produced can be physically described as flake in "potato" shaped agglomerates.

Example 17

Hardwood Sawdust (7.5 g, CrossRoad Sales LLC) and <10 μm Fe powder spherical 99.9+% metals basis (2.5 g, Alfa Aesar, product 00170 Lot G19X048) was loaded into a hardened steel cup (80 mL, Fritsch GmbH) with nine balls (hardened steel, 1 cm diameter, Fritsch GmbH) and milled at 300 rpm for 10 minutes using a planetary mill (Pulverisette 6, Fritsch GmbH). The resulting powder was pressed (4.45 tons, Carver 3851 benchtop laboratory press) to form 20 mm diameter pellets and a $^{21}/_{64}$" hole was then drilled in the center of each pellet with a drill press. The pellets were skewered on a ¼" mm diameter stainless steel rod which was then placed vertically into a stainless steel 4-way cross, fed through the top flange equipped with an Ultra-Torr™ vacuum fitting (Swagelok) and secured to a stepper motor (STM 23S-3AN, Applied Motion Products). The chamber was evacuated to $10^{-3}$ torr and then maintained at 0.5 torr with flowing inert gas. Each pellet was then irradiated through an anti-reflective coated ZnSe window (Design Research Optics) by a 2 mm diameter 10.4 μm laser beam (Firestar t60, Synrad Inc., 95% power) while rotating at a linear velocity of 1.63 mm/s (1.2 rev/min) for one full rotation. Finally, the material exposed to the laser was removed by cutting and the resulting powder was removed by cutting and the resulting powder was lightly ground by hand in an agate mortar and pestle.

The raw product was heated to 600° C. at a rate of 20° C./min and held at 600° C. for a period of 1 hour. The raw product was then treated by microwave digestion, heating from room temperature to 210° C. in 10 min and held for an additional 50 min in nitric acid (ACS grade, 68-70% $HNO_3$) (XP-1500+ Teflon vessel, MARS 5 Digestion Microwave System, CEM Corp.). After cooling to room temperature, the mixture was diluted with deionized water and the product collected by vacuum filtration (1 μm polyester, GVS Life-Sciences). The product was then washed with additional deionized water until a neutral pH was obtained, rinsed with 10 v/v % hydrochloric acid solution, rinsed with 1M NaOH (>97%, Fisher Scientific) followed by deionized water neutralization, rinsed with 10 v/v % HCl solution followed by deionized water neutralization and finally dried under vacuum.

Figure 36:
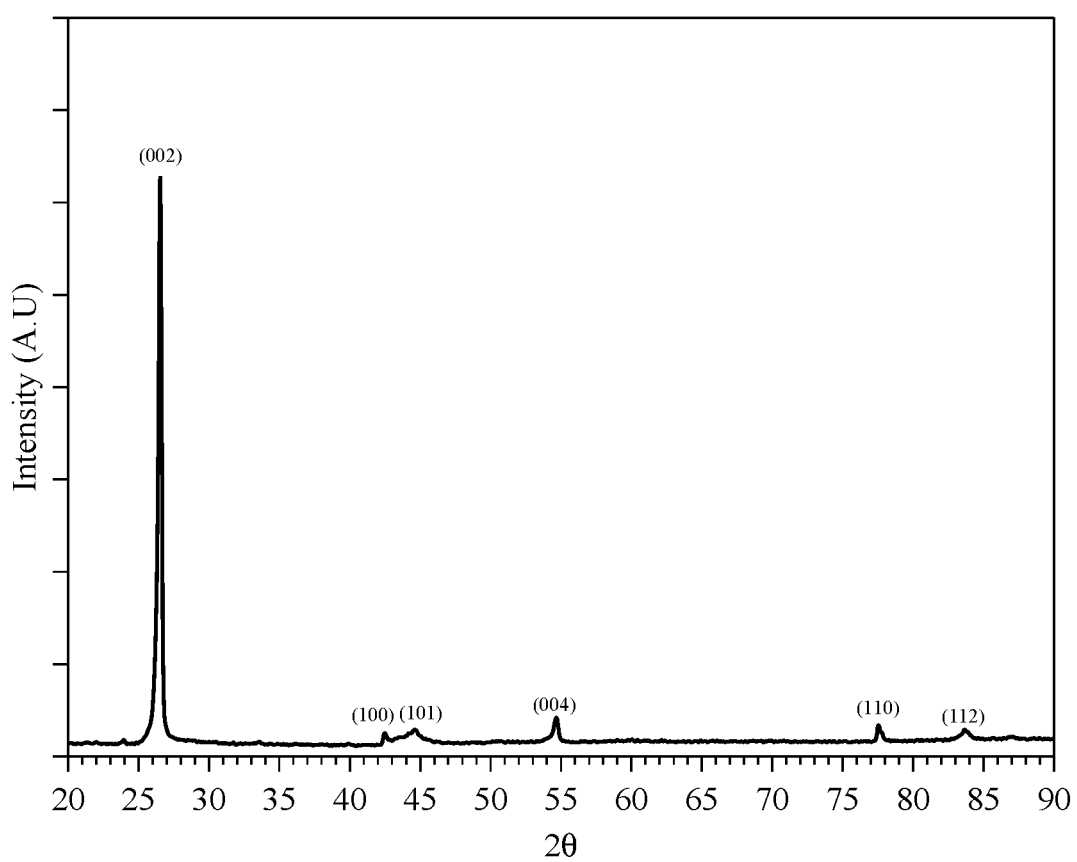
FIG. 36 displays a PXRD profile of graphite (d-spacing 0.33545 nm) produced in Example 17.

FIG. 36 is a PXRD profile of graphite (d-spacing 0.3354 nm) produced in Example 17. As shown, the produced graphite exhibits reflections with corresponding Miller indices of (002), (100), (101), and (004) indicative of crystalline graphite.

STATEMENTS OF THE DISCLOSURE

Statements of the Disclosure Include:

Statement 1: A method for producing flake graphite, the method comprising mixing a carbon-containing feedstock with a catalyst to form a feedstock/catalyst mixture; and subjecting the mixture to irradiation with a laser to convert the feedstock into flake graphite in the presence of the catalyst, wherein the feedstock is a biomass, a carbonaceous material or a combination thereof; and the catalyst is an elemental metal, an alloy, or a combination thereof.

Statement 2: A method according to Statement 1, further comprising converting the feedstock/catalyst mixture to a powdered form prior to being subjected to irradiation with the laser.

Statement 3: A method according to Statement 1 or 2, wherein the produced flake graphite is in the form of potato shaped agglomerates.

Statement 4: A method according to any one of Statements 1-3, wherein the elemental metal is any one of iron, cobalt and nickel.

Statement 5: A method according to any one of Statements 1-4, wherein the alloy is a steel.

Statement 6: A method according to any one of Statements 1-5, wherein the biomass comprises one or more of lignin, lignocellulose, microcrystalline cellulose, wood flour, sawdust, a dehydrated agricultural product, dehydrated food waste, dehydrated livestock feces, miscanthus, switchgrass, hemp, poplar, willow, sorghum, sugarcane, bamboo, agave, alfalfa, a grain, algae, and oil palm.

Statement 7: A method according to any one of Statements 1-6, wherein the carbonaceous material comprises one or more of an artificial polymer, a natural polymer, a plastic, peat, coal, pitch, coke, a carbon black, an activated carbon, a mesophase carbon, a char and charcoal.

Statement 8: A method according to any one of Statements 1-7, wherein the feedstock/catalyst mixture has a feedstock to catalyst ratio ranging from about 4:3 to about 4:1 by weight.

Statement 9: A method according to any one of Statements 1-8, wherein the laser is immobile.

Statement 10: A method according to any one of Statements 1-8, wherein the laser is configured to move.

Statement 11: A method according to any one of Statements 1-10, further comprising forming the mixture into a solid form prior to subjecting to laser irradiation.

Statement 12: A method according to Statement 11, further comprising rotating or rastering the solid form while subjecting the solid form to the laser irradiation.

Statement 13: A method according to any one of Statements 1-10, further comprising forming the mixture into a sheet or a layer prior to subjecting to laser irradiation.

Statement 14: A method according to Statement 13, further comprising rastering the sheet or the layer while subjecting the sheet or the layer to the laser irradiation.

Statement 15: A flake graphite produced by a method according to any one of Statements 1-14.

Statement 16: An anode electrode, the anode electrode comprising flake graphite produced by a method according to any one of Statements 1-14.

Statement 17: A lithium ion battery comprising an anode electrode according to Statement 16.

Statement 18: A method for producing flake graphite, the method comprising mixing a carbon-containing feedstock with a catalyst to form a feedstock/catalyst mixture; subjecting the mixture to pyrolysis to convert the mixture to a feedstock/catalyst-containing char; and subjecting the char to irradiation with a laser to convert the feedstock into flake graphite in the presence of the catalyst, wherein the feedstock is a biomass, a carbonaceous material, or a combination thereof; and the catalyst is an elemental metal, an alloy, or a combination thereof.

Statement 19: A method according to Statement 18, further comprising converting the feedstock/catalyst mixture to a powdered form prior to being subjected to irradiation with the laser.

Statement 20: A method according to Statement 18 or 19, wherein the produced flake graphite is in the form of potato shaped agglomerates.

Statement 21: A method according to any one of Statements 18-20, wherein the elemental metal is any one of iron, cobalt and nickel.

Statement 22: A method according to any one of Statements 18-21, wherein the alloy is a steel.

Statement 23: A method according to any one of Statements 18-22, wherein the biomass comprises one or more of lignin, lignocellulose, microcrystalline cellulose, wood flour, sawdust, a dehydrated agricultural product, dehydrated food waste, dehydrated livestock feces, miscanthus, switchgrass, hemp, poplar, willow, sorghum, sugarcane, bamboo, agave, alfalfa, a grain, algae and oil palm.

Statement 24: A method according to any one of Statements 18-23, wherein the carbonaceous material comprises one or more of an artificial polymer, a natural polymer, a plastic, peat, coal, pitch, coke, a carbon black, an activated carbon, a mesophase carbon, and charcoal.

Statement 25: A method according to any one of Statements 18-24, wherein the feedstock/catalyst mixture has a feedstock to catalyst ratio ranging from about 4:3 to about 4:1 by weight.

Statement 26: A method according to any one of Statements 18-25, wherein the laser is immobile.

Statement 27: A method according to any one of Statements 18-25, wherein the laser is configured to move.

Statement 28: A method according to any one of Statements 18-26, further comprising forming the feedstock/catalyst mixture into a solid form prior to subjecting to pyrolysis.

Statement 29: A method according to Statement 28, further comprising rotating or rastering the solid form char while subjecting the solid form char to the laser irradiation.

Statement 30: A method according to any one of Statements 17-26, further comprising forming the feedstock/catalyst mixture into a sheet or a layer prior to subjecting to pyrolysis.

Statement 31: A method according to Statement 30, further comprising rastering the char sheet or the char layer while subjecting the char sheet or the char layer to the laser irradiation.

Statement 32: A flake graphite produced by a method according to any one of Statements 18-31.

Statement 33: An anode electrode, the anode electrode comprising flake graphite produced by a method according to any one of Statements 18-31.

Statement 34: A lithium ion battery comprising an anode electrode according to Statement 33.

Statement 35: A method for producing flake graphite, the method comprising coating a surface of a catalyst with a carbon-containing feedstock to form a feedstock/catalyst composite material; and subjecting the feedstock/catalyst composite material to irradiation with a laser to convert the feedstock into flake graphite in the presence of the catalyst, wherein the feedstock is a biomass, a carbonaceous material, or a combination thereof and the catalyst is an elemental metal, an alloy, or a combination thereof.

Statement 36: A method according to Statement 35, wherein the produced flake graphite is in the form of potato shaped agglomerates.

Statement 37: A method according to Statement 35 or 36, wherein the elemental metal is any one of iron, cobalt and nickel.

Statement 38: A method according to any one of Statements 35-37, wherein the alloy is a steel.

Statement 39: A method according to any one of Statements 35-38, wherein the biomass comprises one or more of lignin, lignocellulose, microcrystalline cellulose, wood flour, sawdust, a dehydrated agricultural product, dehydrated food waste, dehydrated livestock feces, miscanthus, switchgrass, hemp, poplar, willow, sorghum, sugarcane, bamboo, agave, alfalfa, a grain, algae and oil palm.

Statement 40: A method according to any one of Statements 35-39, wherein the carbonaceous material comprises one or more of an artificial polymer, a natural polymer, a plastic, peat, coal, pitch, coke, a carbon black, an activated carbon, a mesophase carbon, and charcoal.

Statement 41: A method according to any one of Statements 35-40, wherein the carbon-containing feedstock is coated on the catalyst as a slurry.

Statement 42: A method according to any one of Statements 35-40, wherein the carbon-containing feedstock is spray coated or extrusion coated on the catalyst.

Statement 43: A method according to any one of Statements 35-40, wherein the carbon-containing feedstock is coated on the catalyst as a powder.

Statement 44: A method according to any one of Statements 35-43, wherein the laser is immobile.

Statement 45: A method according to any one of Statements 35-43, wherein the laser is configured to move.

Statement 46: A method according to any one of Statements 35-45, further comprising rotating and/or rastering the feedstock/catalyst composite material while subjecting the feedstock/catalyst composite material to the laser irradiation.

Statement 47: A flake graphite produced by a method according to any one of Statements 35-46.

Statement 48: An anode electrode, the anode electrode comprising flake graphite produced by a method according to any one of Statements 35-46.

Statement 49: A lithium ion battery comprising an anode electrode according to Statement 48.

Statement 50: A method for producing flake graphite, the method comprising coating a surface of a catalyst with a carbon-containing feedstock to form a feedstock/catalyst composite material; subjecting the feedstock/catalyst composite material to pyrolysis to convert the mixture or the powdered form thereof to a feedstock/catalyst-containing char; and subjecting the char to irradiation with a laser to convert the feedstock into flake graphite in the presence of the catalyst, wherein the feedstock is a biomass, a carbonaceous material, or a combination thereof; and the catalyst is an elemental metal, an alloy, or a combination thereof.

Statement 51: A method according to Statement 50, wherein the produced flake graphite is in the form of potato shaped agglomerates.

Statement 52: A method according to Statement 50 or 51, wherein the elemental metal is any one of iron, cobalt and nickel.

Statement 53: A method according to any one of Statements 50-52, wherein the alloy is a steel.

Statement 54: A method according to any one of Statements 50-53, wherein the biomass comprises one or more of lignin, lignocellulose, microcrystalline cellulose, wood flour, sawdust, a dehydrated agricultural product, dehydrated food waste, dehydrated livestock feces, miscanthus, switchgrass, hemp, poplar, willow, sorghum, sugarcane, bamboo, agave, alfalfa, a grain, algae, and oil palm.

Statement 55: A method according to any one of Statements 50-54, wherein the carbonaceous material comprises one or more of an artificial polymer, a natural polymer, a plastic, peat, coal, pitch, coke, a carbon black, an activated carbon, a mesophase carbon, and charcoal.

Statement 56: A method according to any one of Statements 50-55, wherein the carbon-containing feedstock is coated on catalyst as a slurry.

Statement 57: A method according to any one of Statements 50-55, wherein the carbon-containing feedstock is spray coated or extrusion coated on the catalyst.

Statement 58: A method according to any one of Statements 50-55, wherein the carbon-containing feedstock is coated on the catalyst as a powder.

Statement 59: A method according to any one of Statements 50-58, wherein the laser is immobile.

Statement 60: A method according to any one of Statements 50-58, wherein the laser is configured to move.

Statement 61: A method according to any one of Statements 50-60, further comprising rotating and/or rastering the char while subjecting the char to the laser irradiation.

Statement 62: A flake graphite produced by a method according to any one of Statements 50-61.

Statement 63: An anode electrode, the anode electrode comprising flake graphite produced by a method according to any one of Statements 60-61.

Statement 64: A lithium ion battery comprising an anode electrode according to Statement 63.

Although the present invention and its objects, features and advantages have been described in detail, other embodiments are encompassed by the invention. Finally, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A method for producing graphite, the method comprising:
   mixing a carbon-containing feedstock with a catalyst to form a feedstock/catalyst mixture; and
   subjecting the mixture to irradiation with a laser to convert the feedstock into graphite in the presence of the catalyst, wherein
      the feedstock is a biomass, a carbonaceous material, or a combination thereof; and
      the catalyst is an elemental metal, an alloy, or a combination thereof.

2. The method of claim 1, further comprising converting the feedstock/catalyst mixture to a powdered form prior to being subjected to irradiation with the laser.

3. The method of claim 1, wherein the produced graphite is in the form of agglomerates.

4. The method of claim 1, wherein the elemental metal is any one of iron, cobalt and nickel.

5. The method of claim 1, wherein the alloy is a steel.

6. The method of claim 1, wherein the biomass comprises one or more of lignin, lignocellulose, microcrystalline cellulose, wood flour, sawdust, a dehydrated agricultural product, dehydrated food waste, dehydrated livestock feces, miscanthus, switchgrass, hemp, poplar, willow, sorghum, sugarcane, bamboo, agave, alfalfa, a grain; algae, and oil palm.

7. The method of claim 1, wherein the carbonaceous material comprises one or more of an artificial polymer, a natural polymer, a plastic, peat, coal, pitch, coke, a carbon black, an activated carbon, a mesophase carbon, and charcoal.

8. The method of claim 1, wherein the feedstock/catalyst mixture has a feedstock to catalyst ratio ranging from about 4:3 to about 4:1 by weight.

9. The method of claim 1, wherein the laser is immobile and the method further comprises:
   forming the mixture into a solid form prior to subjecting to laser irradiation; and
   rotating or rastering the solid form while subjecting the solid form to the laser irradiation.

10. The method of claim 1, wherein the laser is immobile and the method further comprises:
    forming the mixture into a sheet or a layer prior to subjecting to laser irradiation; and
    rastering the sheet or the layer while subjecting the sheet or the layer to the laser irradiation.

11. A method for producing graphite, the method comprising:
    mixing a carbon-containing feedstock with a catalyst to form a feedstock/catalyst mixture;
    subjecting the mixture to pyrolysis to convert the mixture to a feedstock/catalyst-containing char; and
    subjecting the char to irradiation with a laser to convert the feedstock into graphite in the presence of the catalyst, wherein
       the feedstock is a biomass, a carbonaceous material, or a combination thereof; and
       the catalyst is an elemental metal, an alloy, or a combination thereof.

12. The method of claim 11, further comprising converting the feedstock/catalyst mixture to a powdered form prior to being subjected to irradiation with the laser.

13. The method of claim 11, wherein the produced graphite is in the form of agglomerates.

14. The method of claim 11, wherein the elemental metal is any one of iron, cobalt and nickel.

15. The method of claim 11, wherein the alloy is a steel.

16. The method of claim 11, wherein the biomass comprises one or more of lignin, lignocellulose, microcrystalline cellulose, wood flour, sawdust, a dehydrated agricultural product, dehydrated food waste, dehydrated livestock feces, miscanthus, switchgrass, hemp, poplar, willow, sorghum, sugarcane, bamboo, agave, alfalfa, a grain, algae, and oil palm.

17. The method of claim 11, wherein the carbonaceous material comprises one or more of an artificial polymer, a natural polymer, a plastic, peat, coal, pitch, coke, a carbon black, an activated carbon, a mesophase carbon, and charcoal.

18. The method of claim 11, wherein the feedstock/catalyst mixture has a feedstock to catalyst ratio ranging from about 4:3 to about 4:1 by weight.

19. The method of claim 11, wherein the laser is immobile and the method further comprises:
    forming the mixture into a solid form prior to subjecting to pyrolysis; and
    rotating or rastering the solid form char while subjecting the solid form char to the laser irradiation.

20. The method of claim 11, wherein the laser is immobile and the method further comprises:
    forming the mixture into a sheet or a layer prior to subjecting to pyrolysis; and rastering the char sheet or the char layer while subjecting the char sheet or the char layer to the laser irradiation.

* * * * *